US012764218B2

(12) United States Patent
Carey et al.

(10) Patent No.: US 12,764,218 B2
(45) Date of Patent: Oct. 13, 2026

(54) PROXIMITY INTELLIGENCE™: THE CONVERGENCE OF ARTIFICIAL INTELLIGENCE, MINDSET AND LOCATION SERVICES

(71) Applicant: Airwave World, LLC, Forestville, CA (US)

(72) Inventors: Barbara Carey, Forestville, CA (US); Padam Bahadur Thapa, Butwal (NP)

(73) Assignee: AIRWAVE WORLD, LLC, Forestville, CA (US)

( * ) Notice: Subject to any disclaimer, the term of this patent is extended or adjusted under 35 U.S.C. 154(b) by 331 days.

(21) Appl. No.: 18/412,106

(22) Filed: Jan. 12, 2024

(65) Prior Publication Data

US 2024/0163361 A1 May 16, 2024

Related U.S. Application Data

(63) Continuation-in-part of application No. 17/355,003, filed on Jun. 22, 2021, now Pat. No. 11,910,270.

(60) Provisional application No. 63/044,084, filed on Jun. 25, 2020.

(51) Int. Cl.

| | |
|---|---|
| ***H04M 1/72412*** | (2021.01) |
| ***H04M 1/72457*** | (2021.01) |
| ***H04W 4/021*** | (2018.01) |
| ***H04W 4/08*** | (2009.01) |
| ***H04W 4/21*** | (2018.01) |
| *H04W 84/06* | (2009.01) |

(52) U.S. Cl.

CPC ... *H04M 1/72412* (2021.01); *H04M 1/72457* (2021.01); *H04W 4/021* (2013.01); *H04W 4/08* (2013.01); *H04W 4/21* (2018.02); *H04W 84/06* (2013.01)

(58) Field of Classification Search

CPC ......... H04M 1/72412; H04M 1/72457; H04W 4/21; H04W 4/021; H04W 4/08

See application file for complete search history.

(56) References Cited

U.S. PATENT DOCUMENTS

| | | | | |
|---|---|---|---|---|
| 9,055,390 | B2 * | 6/2015 | Lor | H04W 8/005 |
| 9,215,286 | B1 * | 12/2015 | Schilit | H04L 67/306 |
| 11,910,270 | B2 | 2/2024 | Carey | |
| 2013/0108071 | A1 | 5/2013 | Huang | |
| 2017/0257329 | A1 * | 9/2017 | Tetreault | G06F 40/253 |
| 2018/0198755 | A1 * | 7/2018 | Domangue | H04W 4/021 |
| 2019/0166195 | A1 * | 5/2019 | Lochan | H04L 67/104 |
| 2020/0008251 | A1 | 1/2020 | Cheung | |
| 2021/0056536 | A1 * | 2/2021 | Carter | G06Q 20/065 |
| 2021/0092550 | A1 | 3/2021 | Ganesan | |
| 2021/0409899 | A1 | 12/2021 | Carey | |
| 2023/0334525 | A1 * | 10/2023 | Wright | G06Q 30/0269 |

* cited by examiner

*Primary Examiner* — Erika A Washington

(74) *Attorney, Agent, or Firm* — Haverstock & Owens, A Law Corporation

(57) ABSTRACT

To prevent the spread of Covid-19 and other contagious diseases, a touchless handshake is able to be implemented using mobile devices. The touchless handshake is able to be performed by sending a signal from one device to another (or to multiple devices) which triggers the device to vibrate to simulate a handshake. Additionally, mobile devices are able to be used to send and/or display a wave/spin.

20 Claims, 61 Drawing Sheets

Fig. 4
AIRSHAKE
Hi
AIRSHAKE
Good
Bye

Fig. 41
Companies
Cancel
All Tech Luxury Consumer Platforms Non-
These companies have set up waves for the safety of their employees.
IBM
Set Up My Company
Companies
Cancel
All Tech Luxury Consumer Platforms Non-
Set Up My Company

Fig. 65
Matches
Nearby
Favorites
Mutual
Businesses
HOT DEAL
Deals
Get Introduced!
My Mindset

PROXIMITY INTELLIGENCE™: THE CONVERGENCE OF ARTIFICIAL INTELLIGENCE, MINDSET AND LOCATION SERVICES

CROSS-REFERENCE TO RELATED APPLICATION(S)

This application is a continuation-in-part application of co-pending U.S. patent application Ser. No. 17/355,003, filed on Jun. 22, 2021, and titled, "METHOD OF AND DEVICE FOR PERFORMING A TOUCHLESS HANDSHAKE BETWEEN TWO OR MORE MOBILE DEVICE USERS," which claims priority of U.S. Provisional Patent Application No. 63/044,084, filed on Jun. 25, 2020, and titled "METHOD OF AND DEVICE FOR PERFORMING A TOUCHLESS HANDSHAKE BETWEEN TWO OR MORE MOBILE DEVICE USERS," which are both hereby incorporated by reference in their entireties for all purposes.

FIELD OF THE INVENTION

The present invention relates to touchless communication. More specifically, the present invention relates to performing a touchless handshake.

BACKGROUND OF THE INVENTION

To reduce the spread of contagious diseases such as Covid-19, people have been told to avoid close contact with others such as hugging and hand shaking. Some people have promoted first bumps, elbow taps and foot taps as alternative greetings. However, these still require people to come relatively close to each other (e.g., within 6 feet).

SUMMARY OF THE INVENTION

A touchless handshake utilizing mobile devices is described herein. Users are able to send a touchless handshake via their mobile devices, where the device of the receiving user performs an action to simulate a handshake such as vibrating or vibrating in a specific pattern. Additionally, in an alternative embodiment, mobile devices are able to be used to send and/or display a wave/spin.

DETAILED DESCRIPTION OF THE PREFERRED EMBODIMENT

Figure 1:
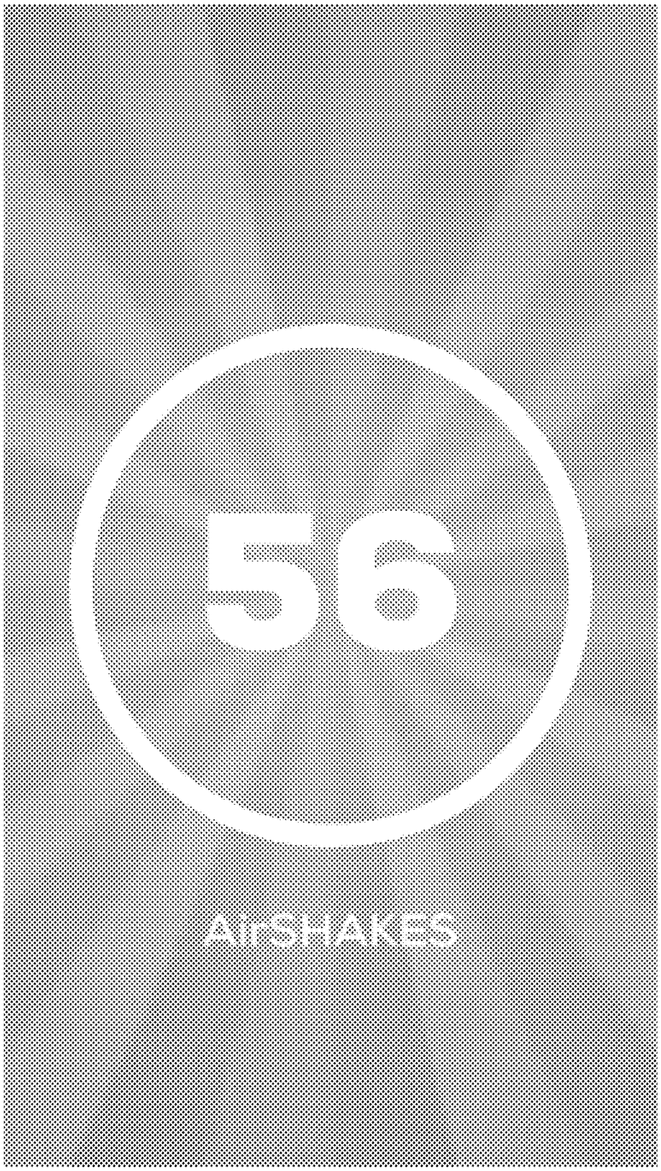
FIG. 1 shows an exemplary screenshot indicating the number of handshakes that have been consummated according to some embodiments.

A touchless connection between two or more mobile phone users that replaces the traditional handshake is described herein. The touchless connection enables users to embrace without physical contact so as to prevent the spread of contagious diseases such as Covid-19. A handshake app enables users to consummate a handshake with user feedback, e.g., sound, visual, vibration such as kinetic motion using haptic technology. In some embodiments, a smart screen saver includes the handshake capabilities. In other words, the handshake app is able to run as a background application. In some embodiments, a handshake is associated with a company (e.g., Google). The company-associated handshake displays a mark or other indicator related to the company.

In alternative embodiments, a user is able to perform a virtual wave/spin at another user. The virtual wave/spin includes the user performing a waving motion or other motion with the mobile device. The mobile device detects the waving motion (e.g., using accelerometers detecting a specific motion/movement). The virtual wave/spin is able to display designs that another user is able to see from a distance, e.g., spiral design. In some embodiments, the wave/spin is also sent to another device. In some embodiments, the wave/spin or handshakes include varying levels of fees/costs. For example, a wave/spin is able to be free for up to 10 seconds, but there is a fee for a wave/spin lasting longer than 10 seconds.

In some embodiments, a handshake or wave/spin is able to be sent by a first user to a second user but then not shared by the second user. In some embodiments, the handshake or wave/spin is accessible via a link, and the link is specially coded so it works one time on a single person's device. This will motivate the person receiving the link to not share it because it works only once.

Devices are able to find nearby users to perform a touchless handshake. For example, devices are able to use WiFi, Near Field Communications (NFC), Bluetooth, low energy Bluetooth, GPS, RFID, or any other implementation to locate other devices within a specified range (e.g., 20 feet). In some embodiments, social networking is utilized to determine which devices are available for the handshake. For example, although five devices may be within the specified distance for sending a handshake, only one of the devices is owned by a contact of the user, so that device is highlighted or selected automatically to receive the handshake or handshake request.

In some embodiments, an ultrasonic implementation or other audio implementation is utilized for the detection of and/or communication with other devices. The sound is unrecognizable to the human ear. Machine learning is able to be used to better recognize the sound. In some embodiments, the knowledge base is used in the app code, but not in the app. Distinctive sounds are able to be utilized for different features/feedback such as an entrance/welcome sound, exit/goodbye sound, and so on. Depending on the implementation, the detectable sound is able to be modified by the user or on the backend.

In some embodiments, a QR code or other recognizable symbol is able to be used to initiate a handshake. The QR code is detected from a distance, and then a handshake is sent between the devices.

In some embodiments, a group handshake is implemented. The group handshake enables performing multiple handshakes at a time. A user is able to select multiple users to send a single handshake, or the user is able to select different handshakes to send to the multiple users.

In some embodiments, contact information (e.g., phone number, email address, social networking information) is exchanged during a handshake. For example, in addition to performing a vibration implementation, contact information for each of the users involved in the handshake is exchanged with the other user or users.

In some embodiments, a video or image is displayed on the mobile device before, during or after the handshake. For example, a video or animated GIF displaying a handshaking hand is displayed on the device such that if the user holds the device with the screen facing away from the user's palm, then the user will see a hand to better replicate a handshake.

In some embodiments, a user is able to generate an event for other users to sign up to shake hands. In addition to exchanging contact information, website links, product information and/or any other information is able to be exchanged.

In some embodiments, a user is able to carve out or block another user from receiving a handshake or aspects of a handshake. For example, a user may not want to share her contact information when performing a handshake, so the user sets privacy settings to block/prevent sharing specific information when performing a handshake. In some embodiments, the user is able to designate classifications of sharing information. For example, if the person on the other end of the handshake is a contact or a contact of a contact based on social networking, the user's email address is able to be shared, but for people the user has no social networking connections with, no personal information is shared.

In some embodiments, in addition to handshakes, other personal greetings are able to be implemented such as a hug, a kiss, a first bump, and others. Each of the greetings is able to have specific characteristics such as certain sounds, visual implementations, and/or other characteristics.

Wearable devices such a bracelets, necklaces, watches or an attachment to a phone such as a "tile" are able to make a connection of a handshake and/or exchange information.

In some embodiments, the user is able to generate a visual/audible "greeting" message in the app such as by using custom ringtones and sound recognition thereof.

User feedback is able to include analytics that give the app owner feedback on how many handshakes the user has initiated and/or received.

Any type of sharing is able to be implemented such as sharing the application, sharing waves/spins, and/or any other information.

In some embodiments, advertising is included/implemented with the handshake application. For example, before or after a user receives a handshake, an advertisement is presented to the user. In another example, before or after the user generates or sends a handshake, an advertisement is presented to the user. Similarly, any other application (e.g., a wave/spin application) is able to include advertisements.

In some embodiments, users are able to purchase various clipart such as logos (e.g., Denver Broncos logo) to include with the handshake. The purchase is able to take place in the app or via a marketplace. The marketplace is also able to be used to sell waves/spins and commission designers to make and sell the waves/spins.

In some embodiments, a backend system is able to push designs to users. The backend system is also able to push notifications and updates to users.

In some embodiments, pre-set designs are able to be utilized for handshakes and/or waves/spins. The pre-set designs are able to be categorized. An exemplary category is "celebrate" which includes Christmas, Hanukkah, St. Patrick's day, Happy Birthday, and others.

In an exemplary implementation of the wave/spin app, a user opens an app, and the app is in listening mode. The user waves the phone to another user who also has the app. The other user's phone has the app open in the background or opens the app to receive the wave.

In an exemplary implementation of the handshake app, a user shakes a mobile device, and the mobile device detects the shaking motion which signals the app to deploy a distinctive sound. When the sound is deployed, the other user's mobile device vibrates to signal a handshake, and at the same time, the other user's app deploys the same sound or a different sound. The other mobile device (e.g., the first user's mobile device) generates a vibration to signal the handshake. After a handshake, each user is able to receive an alert. The alert is able to include any type of information.

In another exemplary implementation, a user taps a logo of an app, an the app goes into a "wiggle" mode. After the user shakes the device, the user receives feedback on the number of shakes that were consummated.

In some embodiments, the mobile device waits for the user to have the phone in their hand before vibrating, since it is not really a handshake if the device is in the user's pocket.

The process is able to take place in milliseconds, microseconds or nanoseconds, depending on the implementation.

FIG. 1 shows an exemplary screenshot indicating the number of handshakes that have been consummated according to some embodiments. After a user sends a handshake to another user, the user's device eventually receives an acknowledgment that the handshake was received and/or a responding handshake was received. The acknowledgment and/or response are recorded and tracked.

Figure 2:
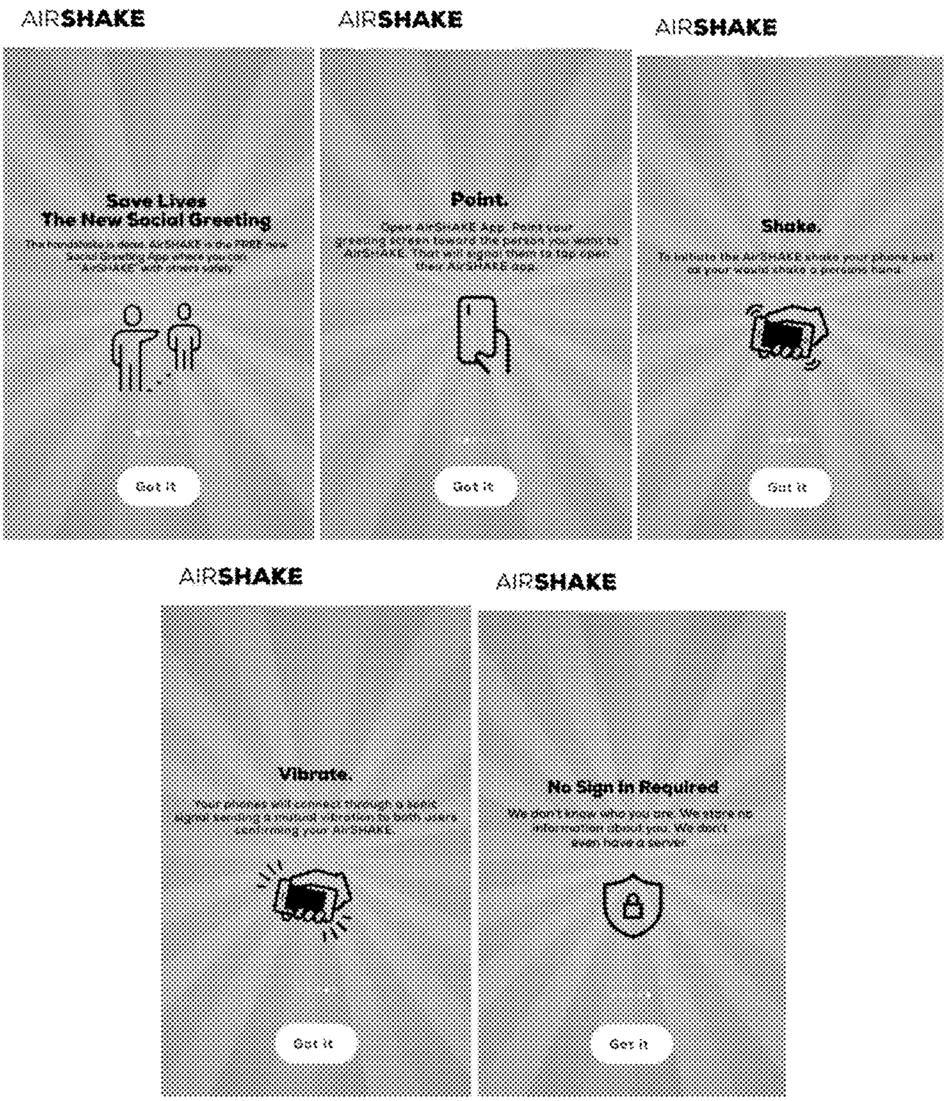
FIG. 2 shows exemplary screenshots of welcome screens of the handshake app according to some embodiments.

FIG. 2 shows exemplary screenshots of welcome screens of the handshake app according to some embodiments. As shown in the screenshots, in some implementations, a user points a greeting screen toward a person to send a touchless handshake, which signals the other user to open her handshake app. The users then shake their respective devices similar to a handshake (or any other type of motion). The devices will connect wirelessly (e.g., via a sonic or ultrasonic signal) and send a mutual vibration to both users confirming the touchless handshake. In some embodiments, user information is kept secret via privacy structures such that 3 rd parties do not receive private information.

In some embodiments, there are non-paid users and paid users. For example, a free version implements a 10 second delay or handshakes or waves are limited to 10 seconds. Other limitations are able to be implemented for a free version.

Figure 3:
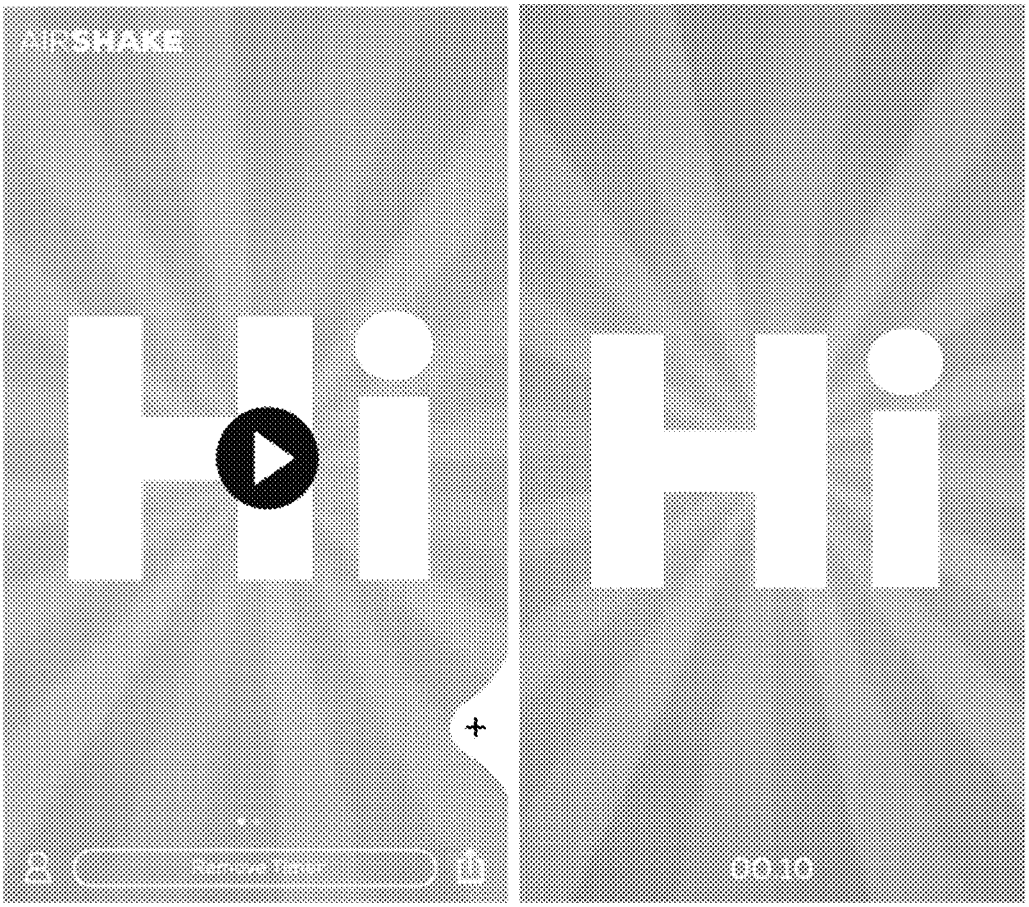
FIG. 3 shows an exemplary screenshot of a home frame/screen according to some embodiments.

FIG. 3 shows an exemplary screenshot of a home frame/screen according to some embodiments. The solid tab "plus" icon at the lower right is used to the Generate a new handshake or wave flow. A profile button on the bottom left transitions to a user's profile. A share button on the bottom right invites contacts, sends a wave to contacts and shares the app. A user is able to remove the timer by paying a fee or performing another action.

Figure 4:
FIG. 4 shows an exemplary screenshot of additional frames/screens according to some embodiments.

FIG. 4 shows an exemplary screenshot of additional frames/screens according to some embodiments. For example, generate a handshake or wave with "save" is able to be in the upper right. The tab to return home is able to be in the lower left. In another example, a back arrow at the top left is able to be used. The user input is able to be configured in any manner for a user to navigate the different options, menus, and/or features.

Figure 5:
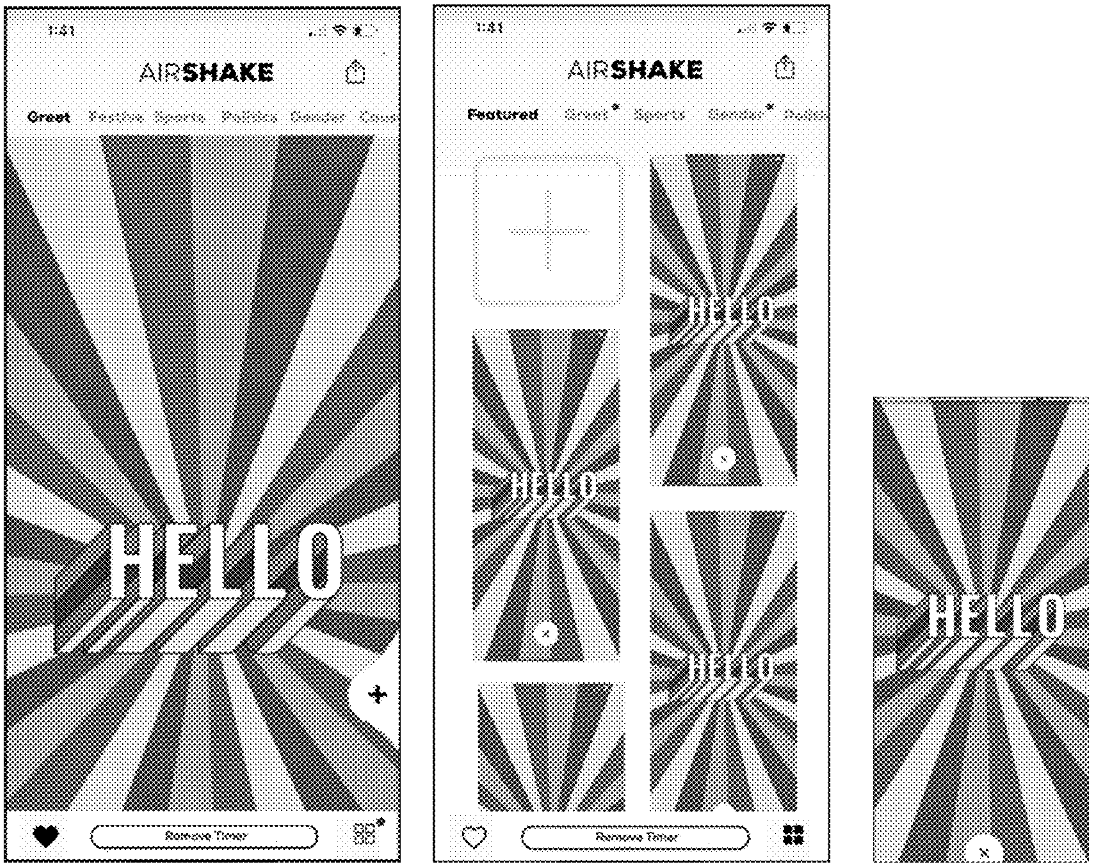
FIG. 5 shows exemplary alternative screenshots of a home frame/screen according to some embodiments.

FIG. 5 shows exemplary alternative screenshots of a home frame/screen according to some embodiments.

In some embodiments, a view mode has auto play. As described herein, for the non-paid user, there is timer. The timer is able to act like a watermark so the user wants to remove it. Also people wave their "wave" or "spin" toward others so the user might want to remove the watermark if it is very visible. Instead of numbers counting down, the numbers are able to shrink.

Figure 6:
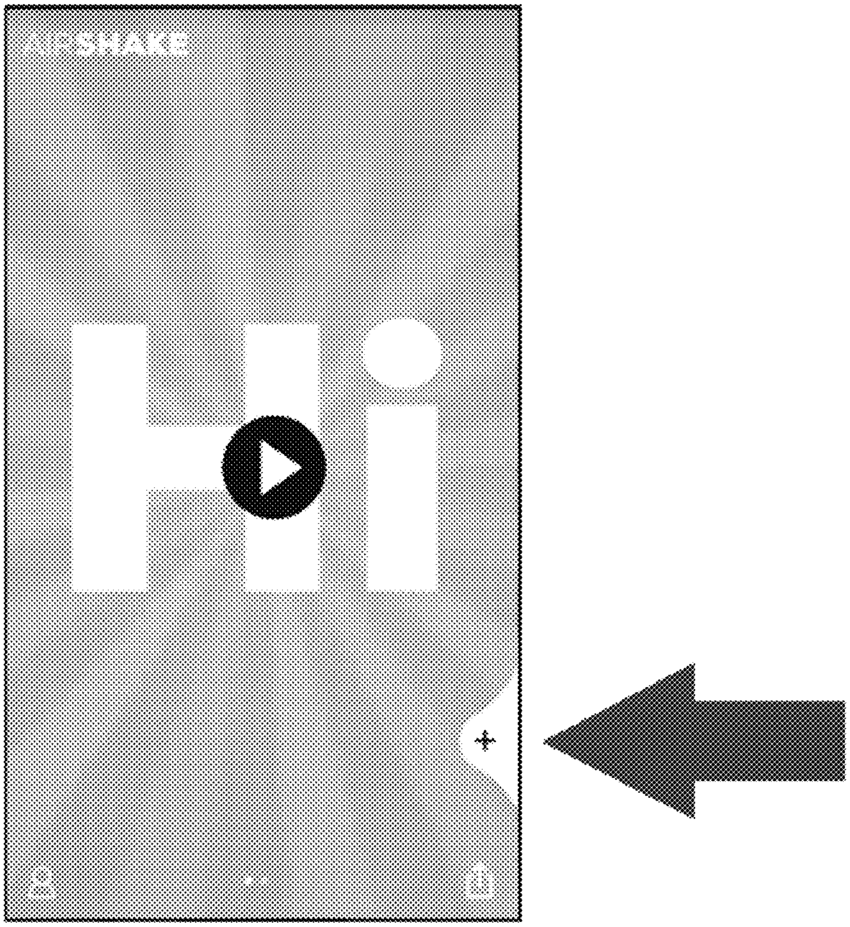
FIG. 6 shows an exemplary screenshot for generating a wave/spin according to some embodiments.

FIG. 6 shows an exemplary screenshot for generating a wave/spin according to some embodiments. The user adds a color by selecting the Plus Circle icon, and that adds a color on the Spin Pin. Then, the user selects the color Circle Dot and the Color Scrub comes up and covers the upper tools. This makes for a clean view while selecting color.

The color dot the user selects will have a black circle around it. The inner circle is slightly smaller to see white around the color. The user selects a down arrow to collapse the color scrub. The user is able to perform a long press on a color dot to rearrange colors. Crop is grayed out when there is no image on the canvas.

Figure 7:
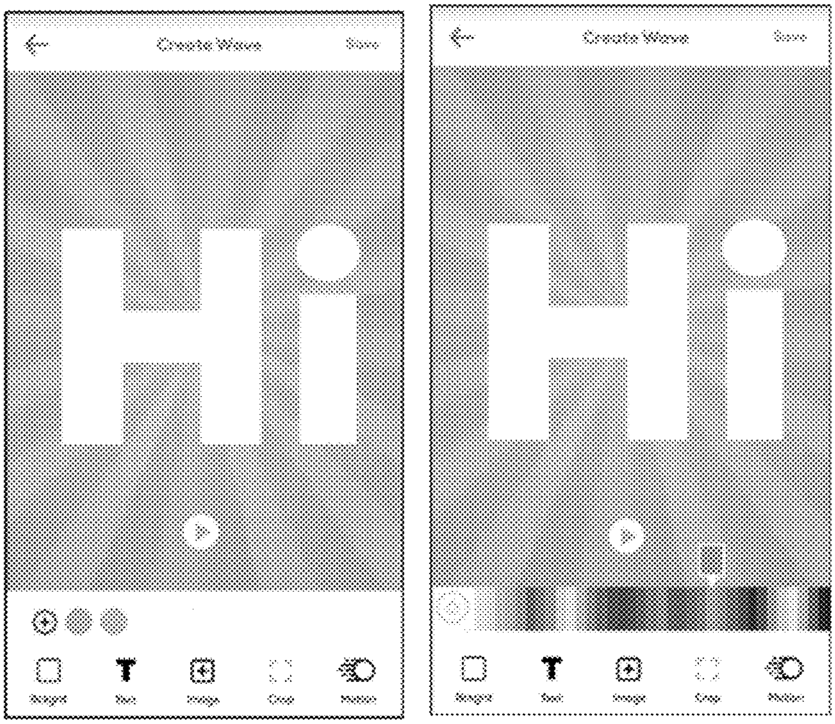
FIG. 7 shows exemplary screenshots of the color editor according to some embodiments.

FIG. 7 shows exemplary screenshots of the color editor according to some embodiments. The left screenshot is without the color dropper, and the right screenshot is with the color dropper. The Plus mark with the white circle background on the color dot appears when the user selects the drop icon. The white circle background is important because it calls out to the user that they tap it to apply the color.

Figure 8:
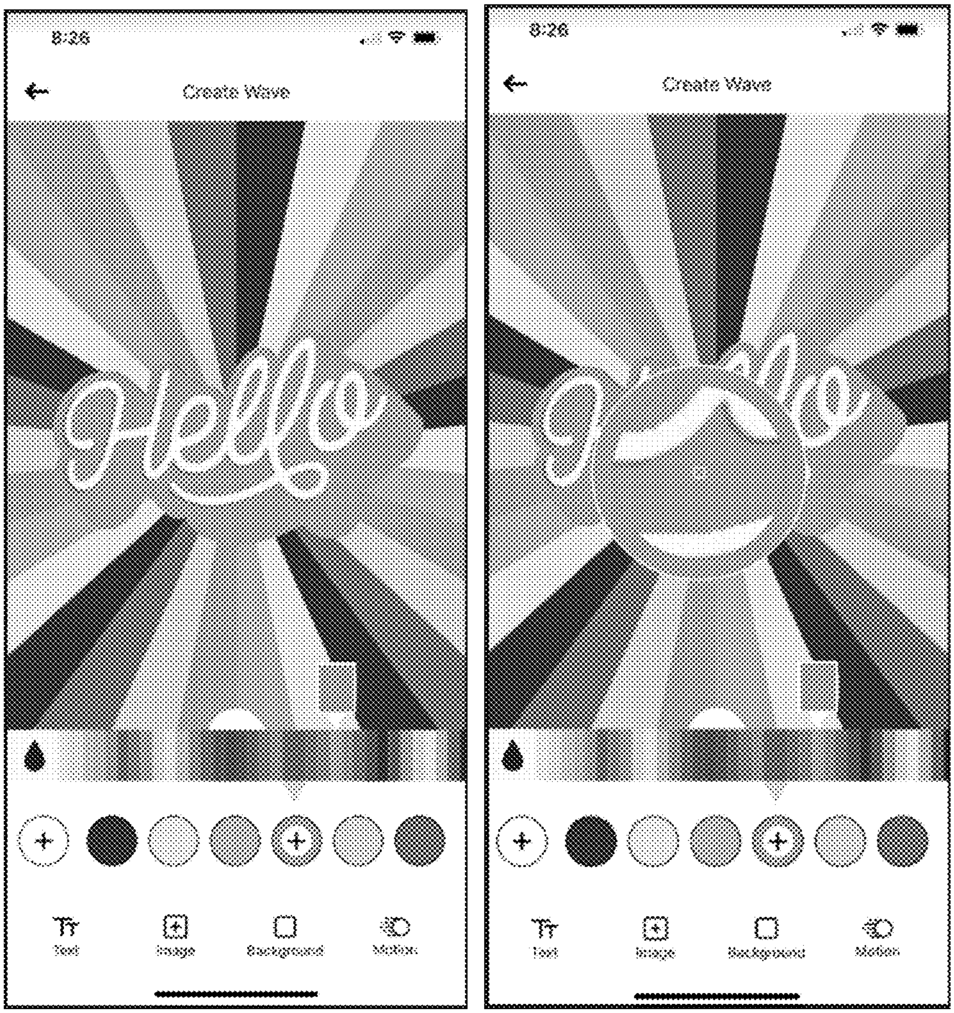
FIG. 8 shows exemplary screenshots of a wave color editor according to some embodiments.

FIG. 8 shows exemplary screenshots of a wave/spin color editor according to some embodiments. In addition to changing the art in the wave/spin, a user is able to change the background, for example, the color or pattern of the background.

Figure 9:
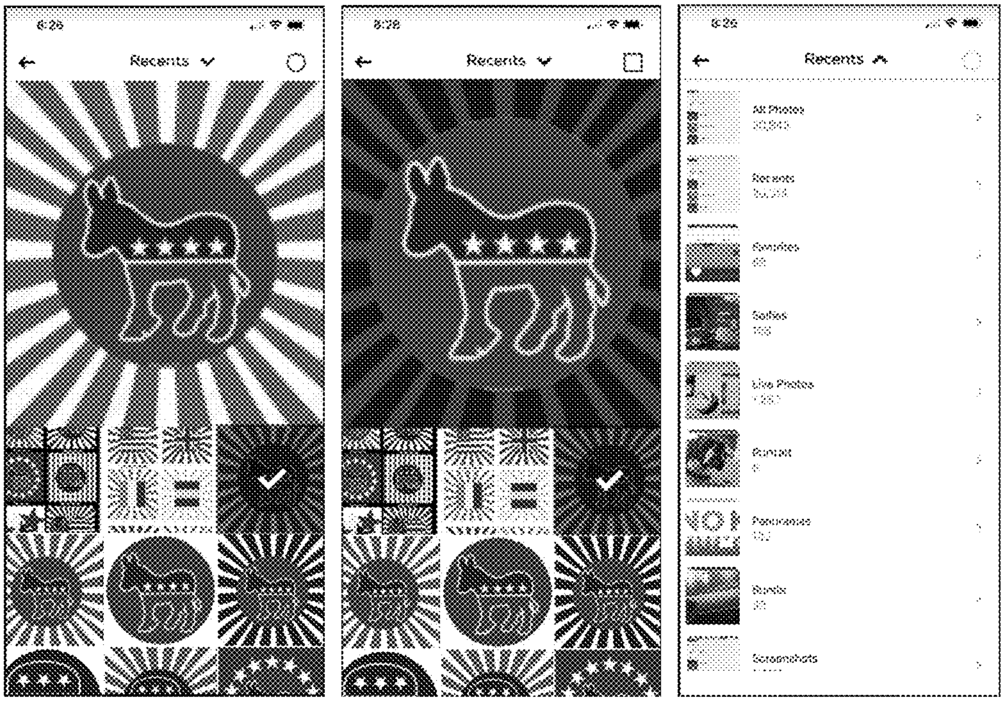
FIG. 9 shows exemplary screenshots for adding an image according to some embodiments.

FIG. 9 shows exemplary screenshots for adding an image according to some embodiments. Additionally, there are crop tools to crop images such as a circle or square crop tool.

When a user selects the image icon after the user already has an image then the current image is viewed in the Add Image Selector, and the user is able to remove it by tapping on the trashcan icon. When the image is removed, the user sees an empty image box or circle and is able to add another image if she chooses.

Figure 10:
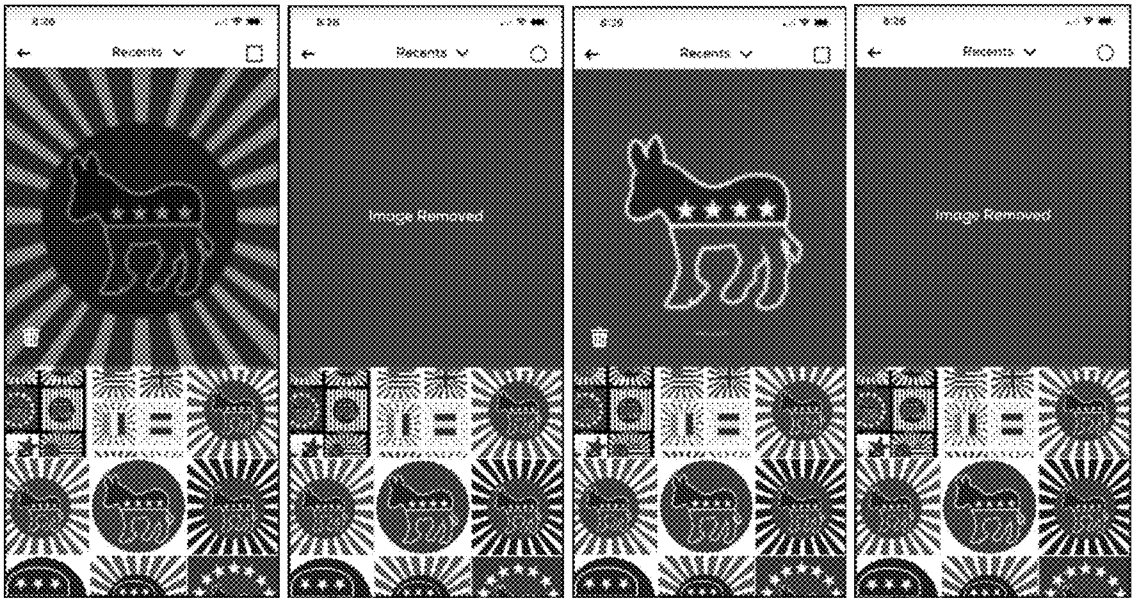
FIG. 10 shows exemplary screenshots for adding/cropping/removing an image according to some embodiments.

FIG. 10 shows exemplary screenshots for adding/cropping/removing an image according to some embodiments. The left image shows a square image. In the center left image, the square image has been removed. The circle crop icon is the default view after the image is removed. In the center right image, a circle image is shown. The right image shows after the circle image has been removed.

The app is able to include a motion tool. There are two types of motion: Spin and Color Flash (Flash). Spin causes a spinning motion. Flash is when the element is coded to flash the color spectrum with the Wave movement.

Figure 11:
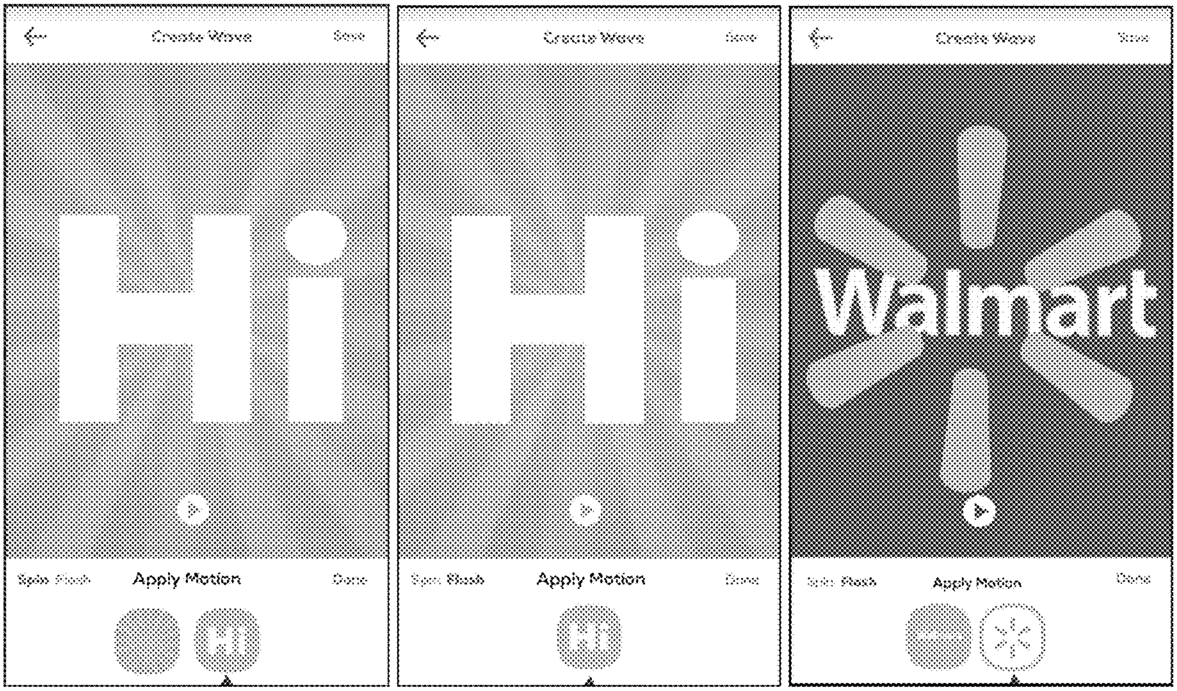
FIG. 11 shows exemplary screenshots of applying motion to a wave/spin according to some embodiments.

FIG. 11 shows exemplary screenshots of applying motion to a wave/spin according to some embodiments. The left image shows the user is in Spin mode and is able to apply spin motion to the selected layer. In Spin mode, there could be up to 3 chubby thumbnails: Background, Image or Text. In Flash mode, there are only up to 2 chubby thumbnails: Text or Image PNG (clear background). Although 2 and 3 thumbnails are described herein, other numbers of thumbnails are able to be utilized.

In the middle image, the user is in Flash mode. Only Text and Clear transparency image are viewable in Flash mode. This example shows just text viewable.

In the right image, there is an example in Flash mode with both Text and an Image PNG (clear background) for the user to apply Apple Flash on their selection.

The page layout is able to be any layout. For example the text/links are able to be text or images and are able to be placed in any location.

In some embodiments, users are able to add images as a layer on top of a pinwheel or solid background.

The app is able to include a background tool. When a user transitions from a spiral background to a solid background there are no color dots. The user sees the color scrub. In some embodiments, a default includes a solid background with color Flash word of "Hello."

Figure 12:
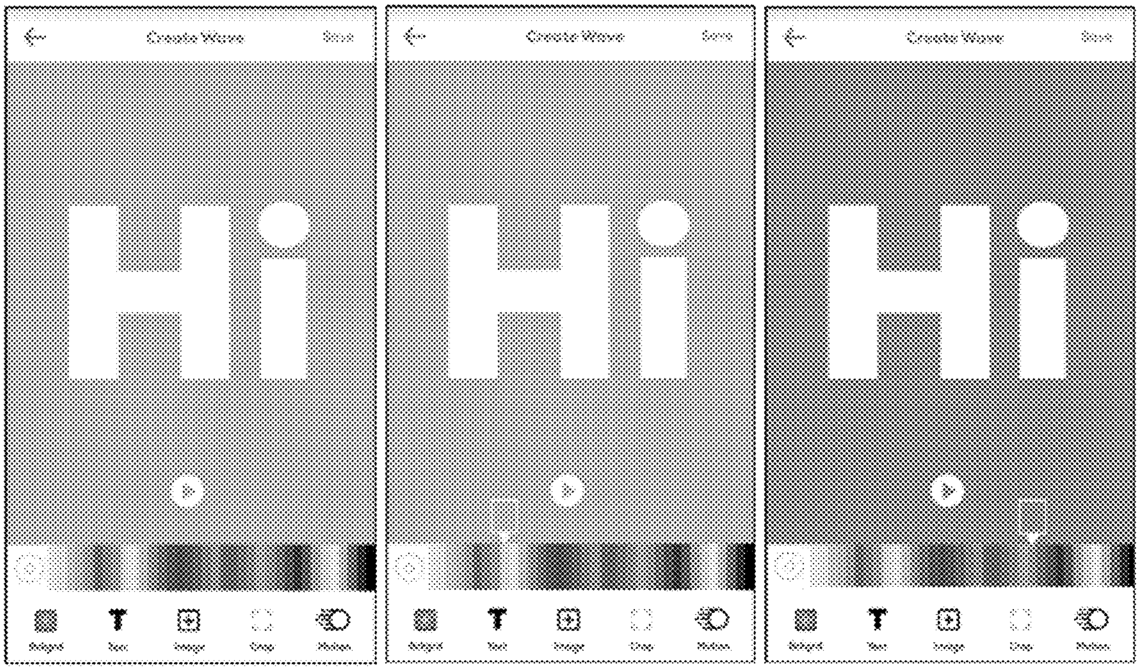
FIG. 12 shows exemplary screenshots of changing colors according to some embodiments.

FIG. 12 shows exemplary screenshots of changing colors according to some embodiments. The left image shows an example of a transition where the first spiral color is shown as a solid background. The middle image shows an example that when a user touches the color scrub, the color window appears. The right image shows an example that when a user slides her finger on the color scrub, the color window and the background (or pin of pinwheel in the case of Spin mode) change to the selected or touched color dynamically as the finger slides across back and forth on color scrub.

The color dropper becomes inactive if there is no image on the canvas.

Figure 13:
FIG. 13 shows an exemplary screenshot of an active color dropper according to some embodiments.

FIG. 13 shows an active Color Dropper according to some embodiments. This is also useful when in Spin mode, and the user wants to match pins. This is also very useful when the image has multiple colors that the user is trying to match color exactly.

The app is able to include a text editor. The minus icon sets the text as a "spinner" or "static." The text in terms of motion is defaulted to the setting the user has in the main editor.

Figure 14:
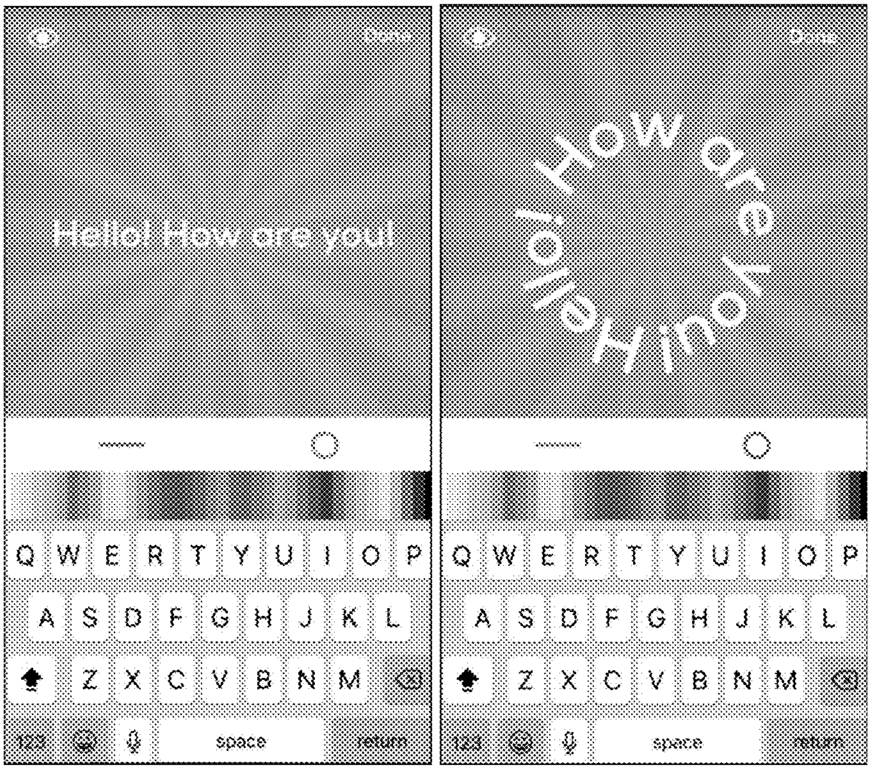
FIG. 14 shows an exemplary screenshot of a circle implementation according to some embodiments.

The circle icon sets the text as a jumbo billboard. FIG. 14 shows an exemplary screenshot of a circle implementation according to some embodiments.

Figure 15:
FIG. 15 shows an exemplary screenshot showing a color motion (color spectrum circle) and shadow feature according to some embodiments.

FIG. 15 shows an exemplary screenshot showing a color motion (color spectrum circle) and shadow feature according to some embodiments. Any variety of text or image effects are able to be applied.

Figure 16:
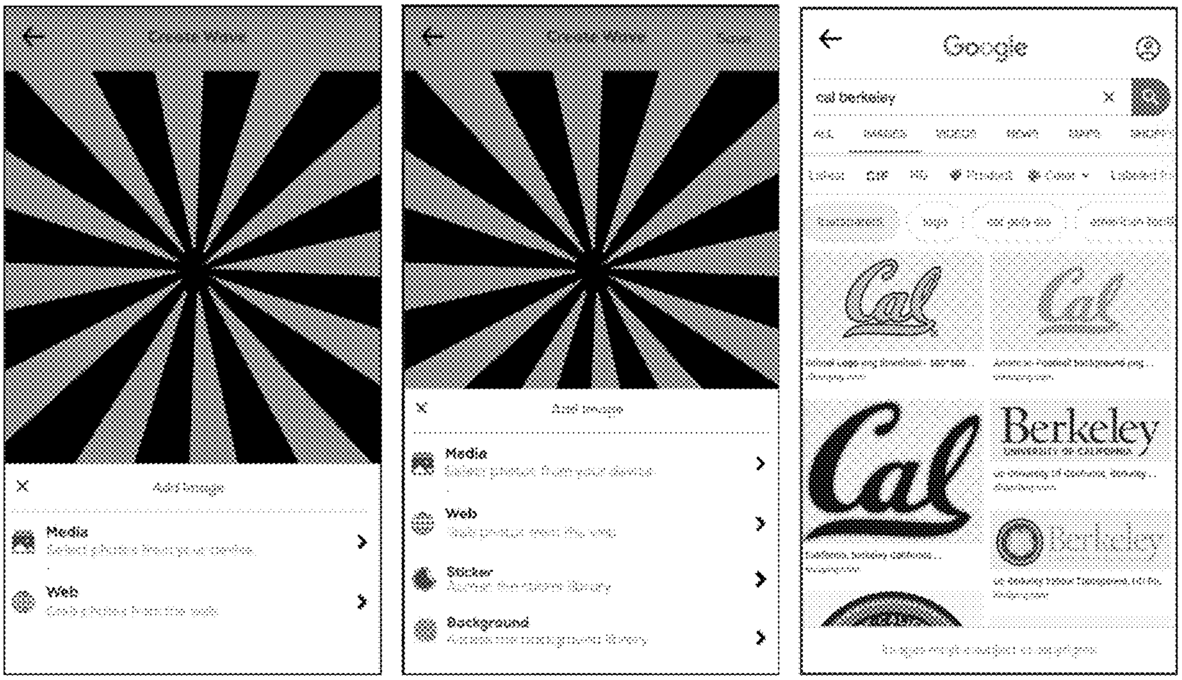
FIG. 16 shows exemplary screenshots for adding an image to an editor of the app according to some embodiments.

FIG. 16 shows exemplary screenshots for adding an image to an editor of the app according to some embodiments. The image is able to be added from the Internet, a local source (e.g., the mobile device's memory storage) or another source.

Figure 17:
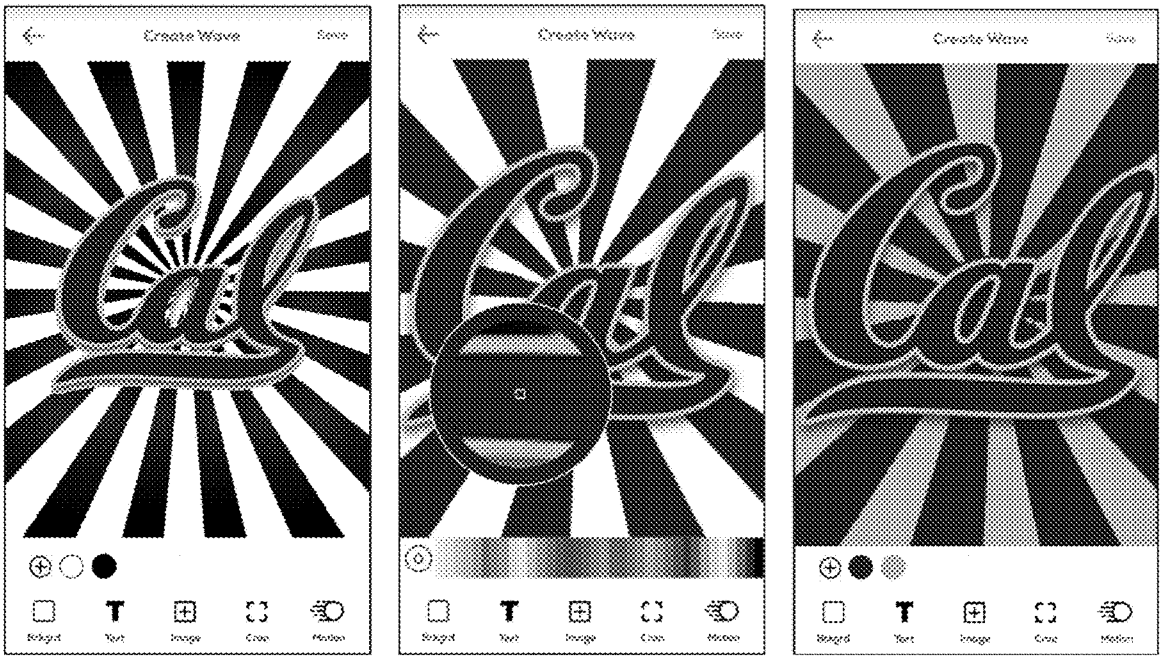
FIG. 17 shows exemplary screenshots of utilizing a color dropper according to some embodiments.

FIG. 17 shows exemplary screenshots of utilizing a color dropper according to some embodiments. Unlike the circle crop app, the user does not see the +grey screen. When the user selects the crop button (only active when there is an image in editor) the crop system opens to the square crop shape. The user is able to select the circle icon to toggle to circle crop.

Figure 18:
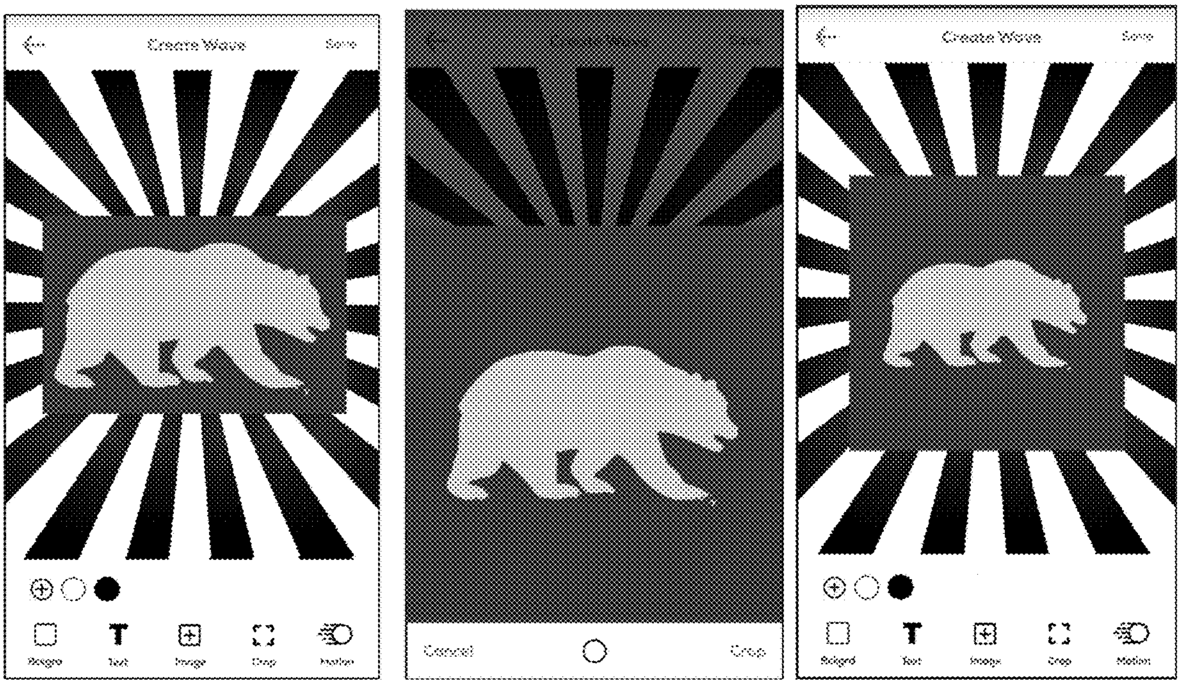
FIG. 18 shows exemplary screenshots of the square crop according to some embodiments.

FIG. 18 shows exemplary screenshots of the square crop according to some embodiments. The left image shows before the image is cropped. The middle image shows the square crop tool. The user is able to toggle to the circle crop mode at the bottom center. The right images shows after the square crop was applied.

Figure 19:
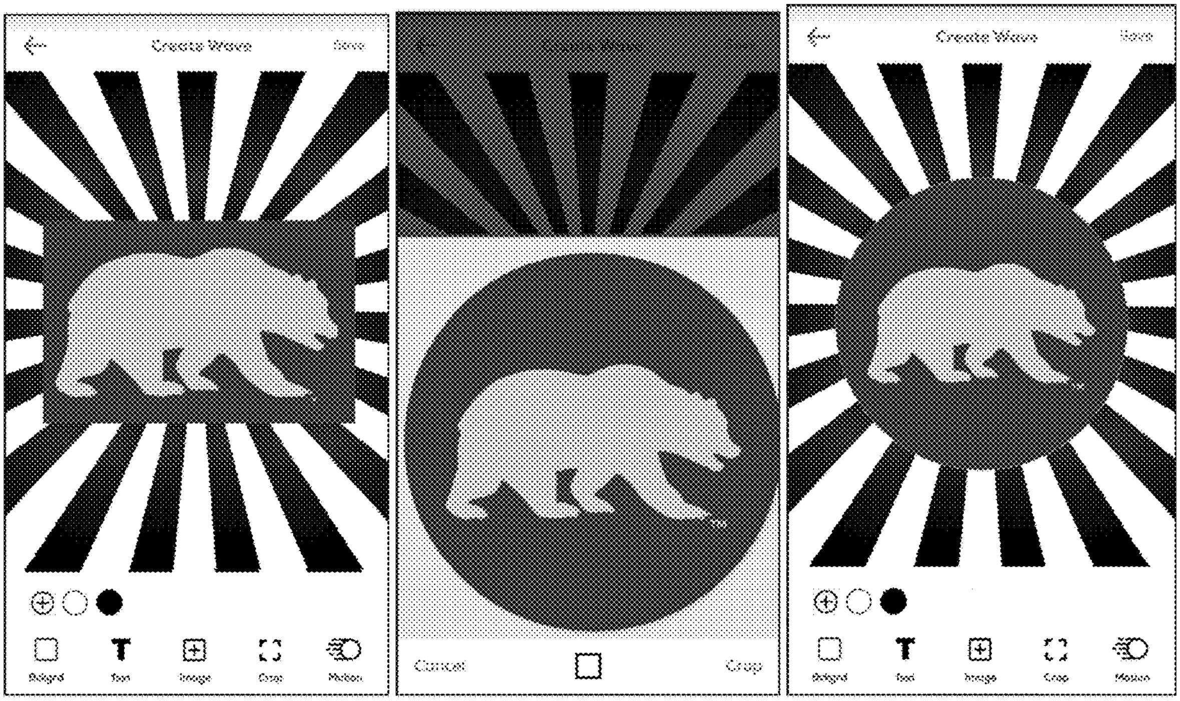
FIG. 19 shows exemplary screenshots of the circle crop according to some embodiments.

FIG. 19 shows exemplary screenshots of the circle crop according to some embodiments. The left image is before the image is cropped. The middle image shows the circle crop tool. The user is able to toggle to the square crop mode at the bottom center. The right images shows after the circle crop was applied.

Figure 20:
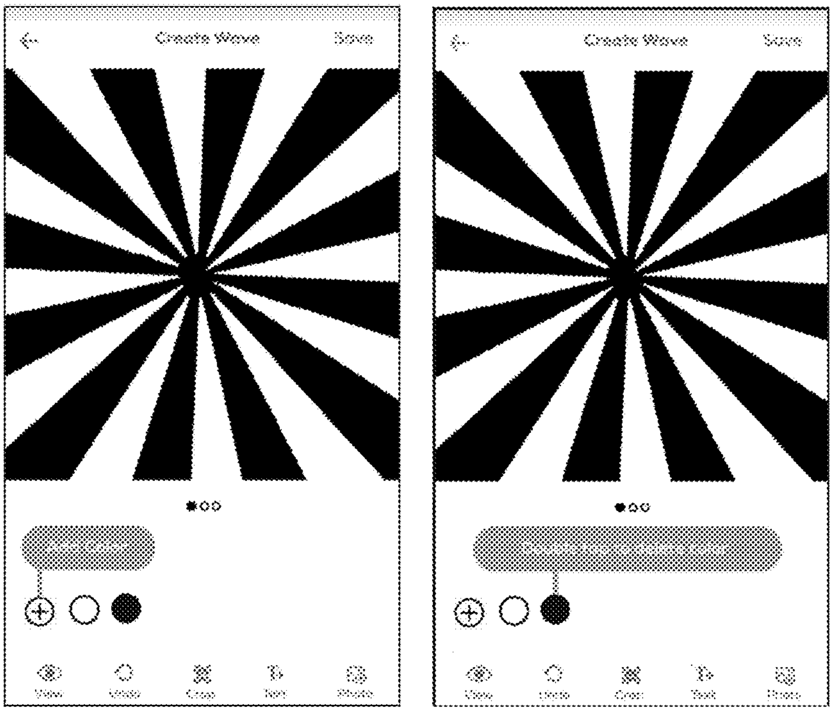
FIGS. 20 and 21 show exemplary screenshots of instruction frames according to some embodiments.
Figure 21:
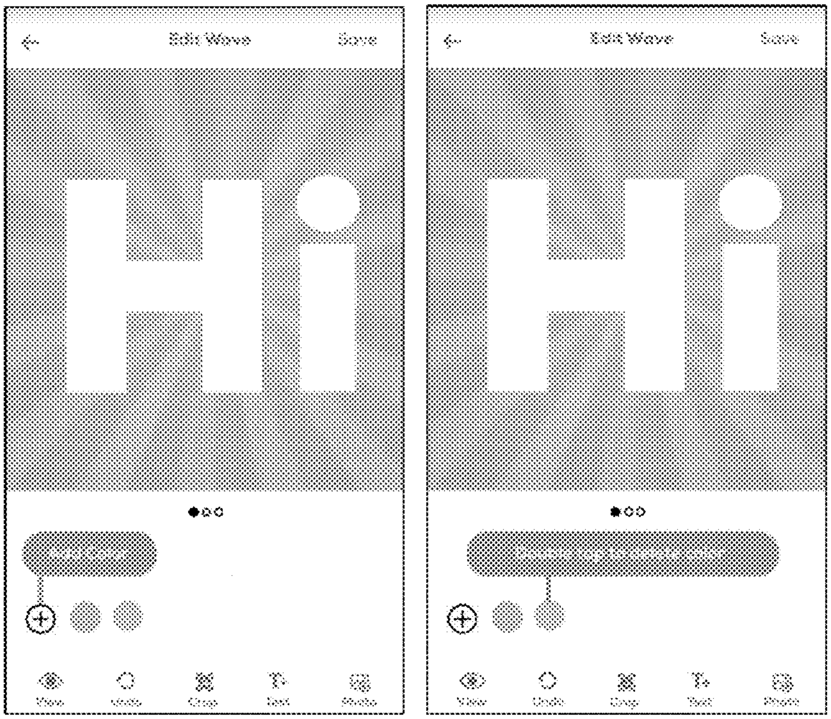

FIGS. 20 and 21 show exemplary screenshots of instruction frames according to some embodiments. The frames are able to be for previously designed waves/spins (e.g., waves being edited) or for a fresh new wave.

Figure 22:
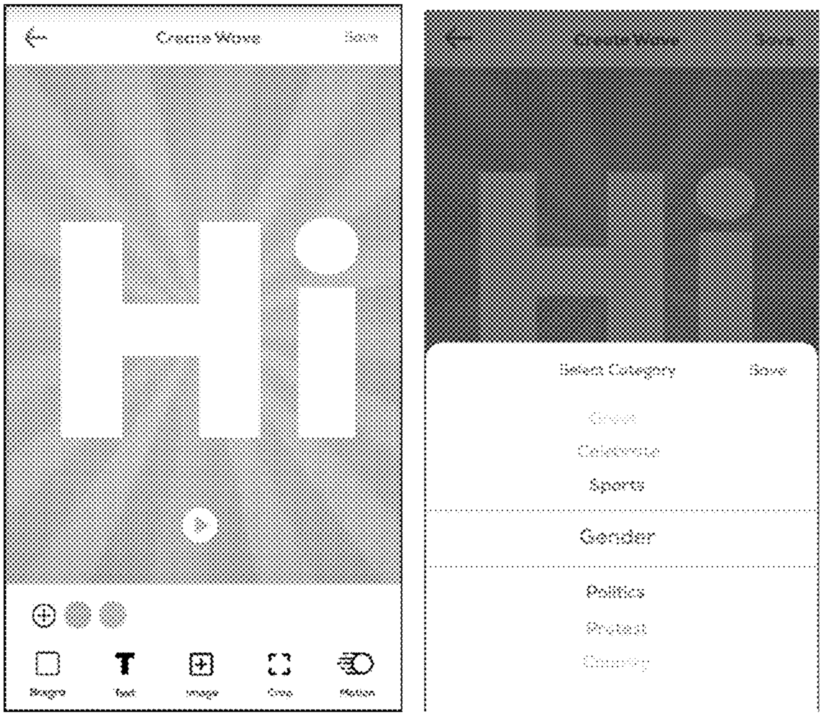
FIG. 22 shows exemplary screenshots of saving a wave/spin to a profile according to some embodiments.
Figure 23:
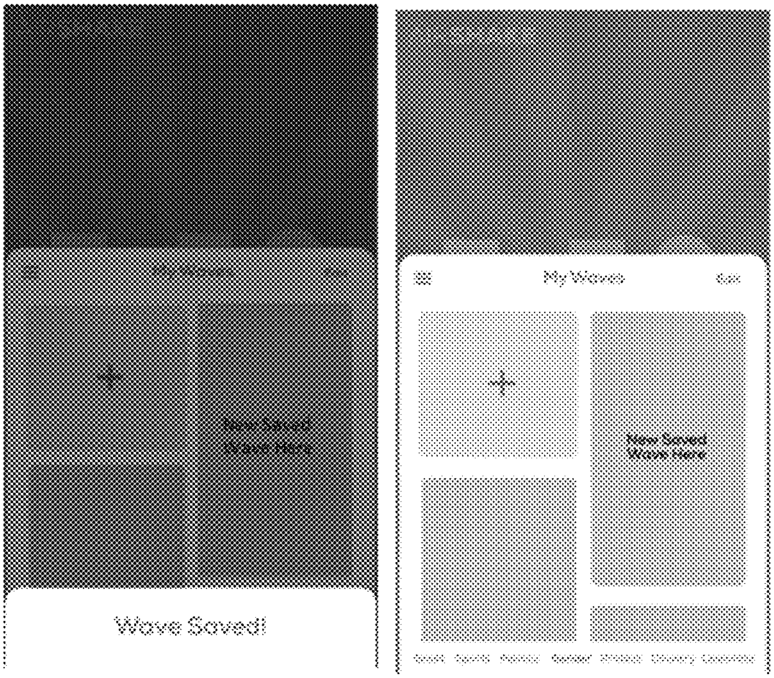
FIGS. 23-29 show exemplary screenshots of saved waves/spins according to some embodiments.
Figure 24:
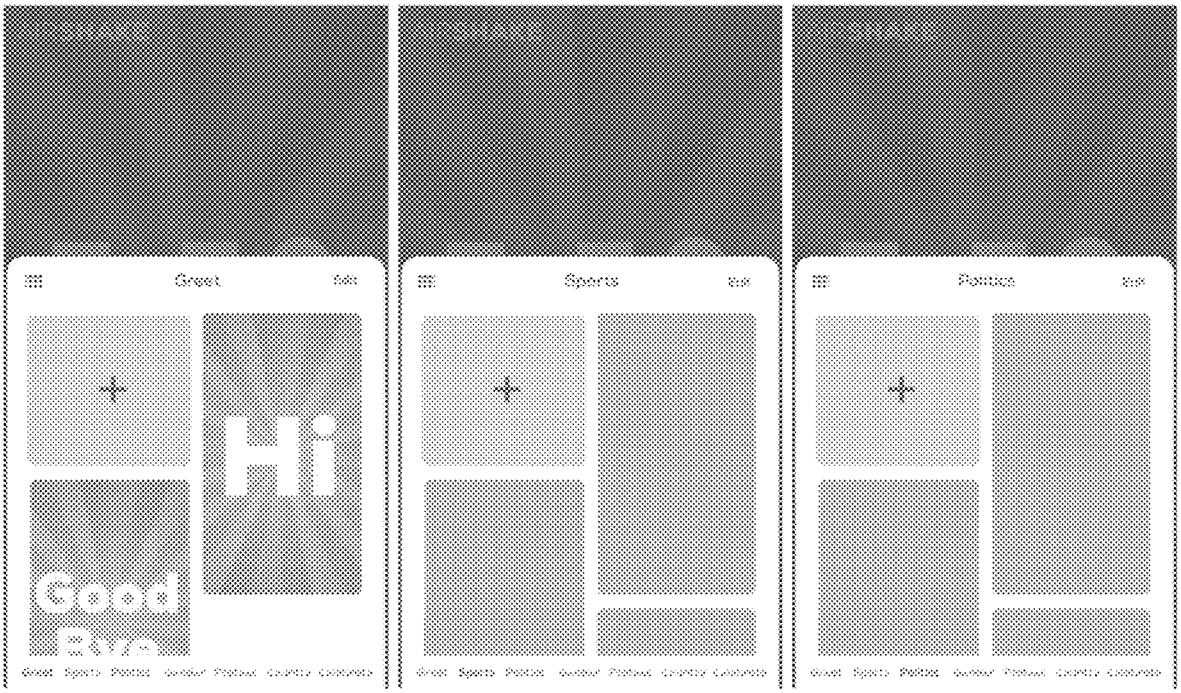
Figure 25:
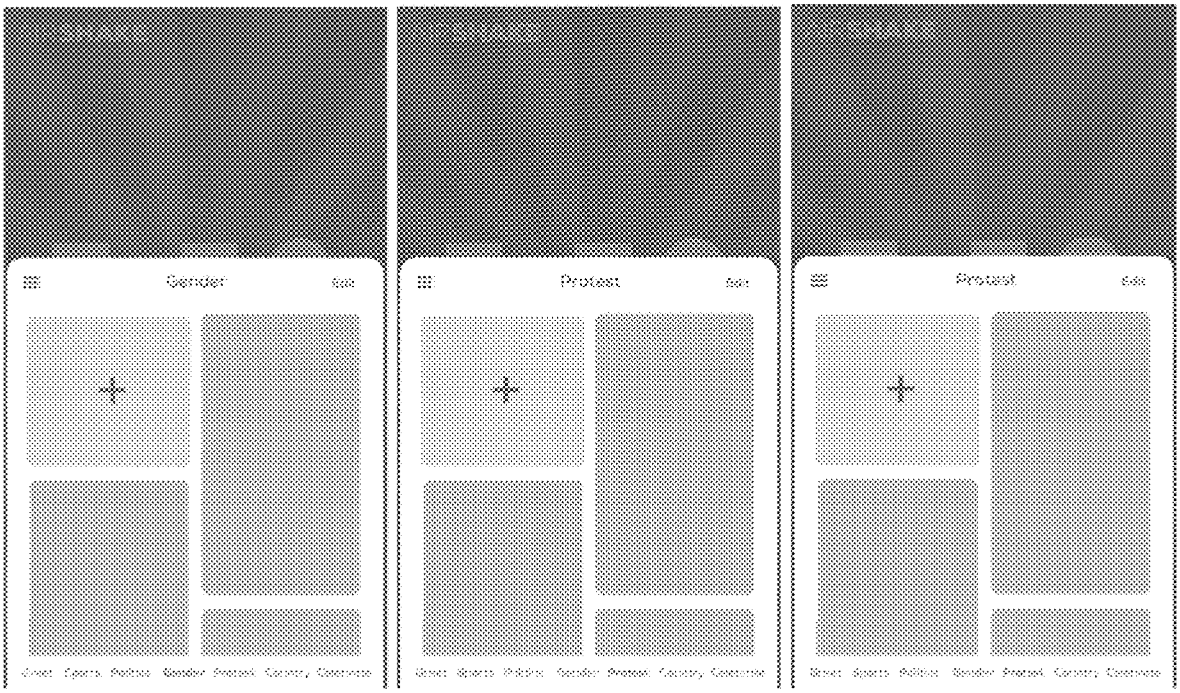
Figure 26:
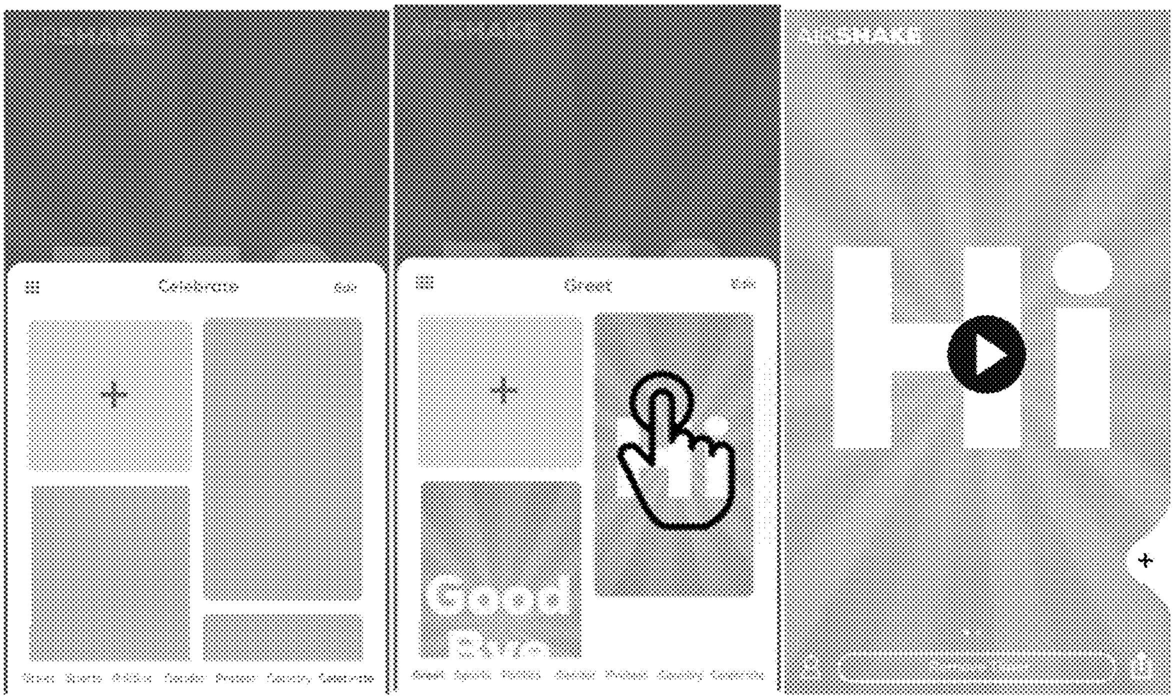
Figure 27:
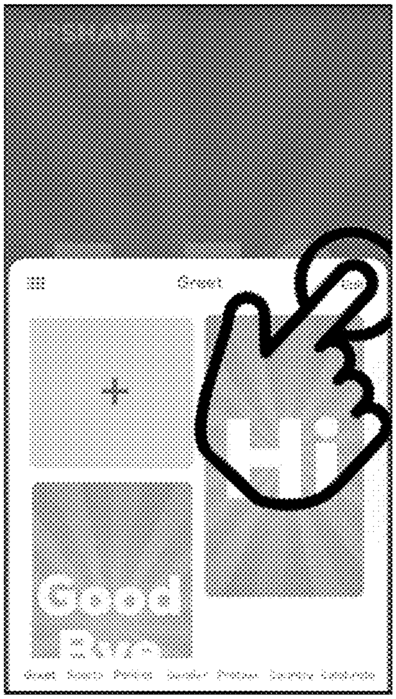
Figure 28:
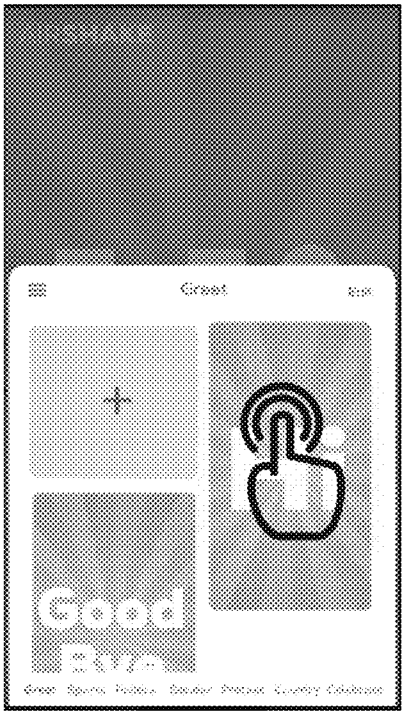
Figure 29:
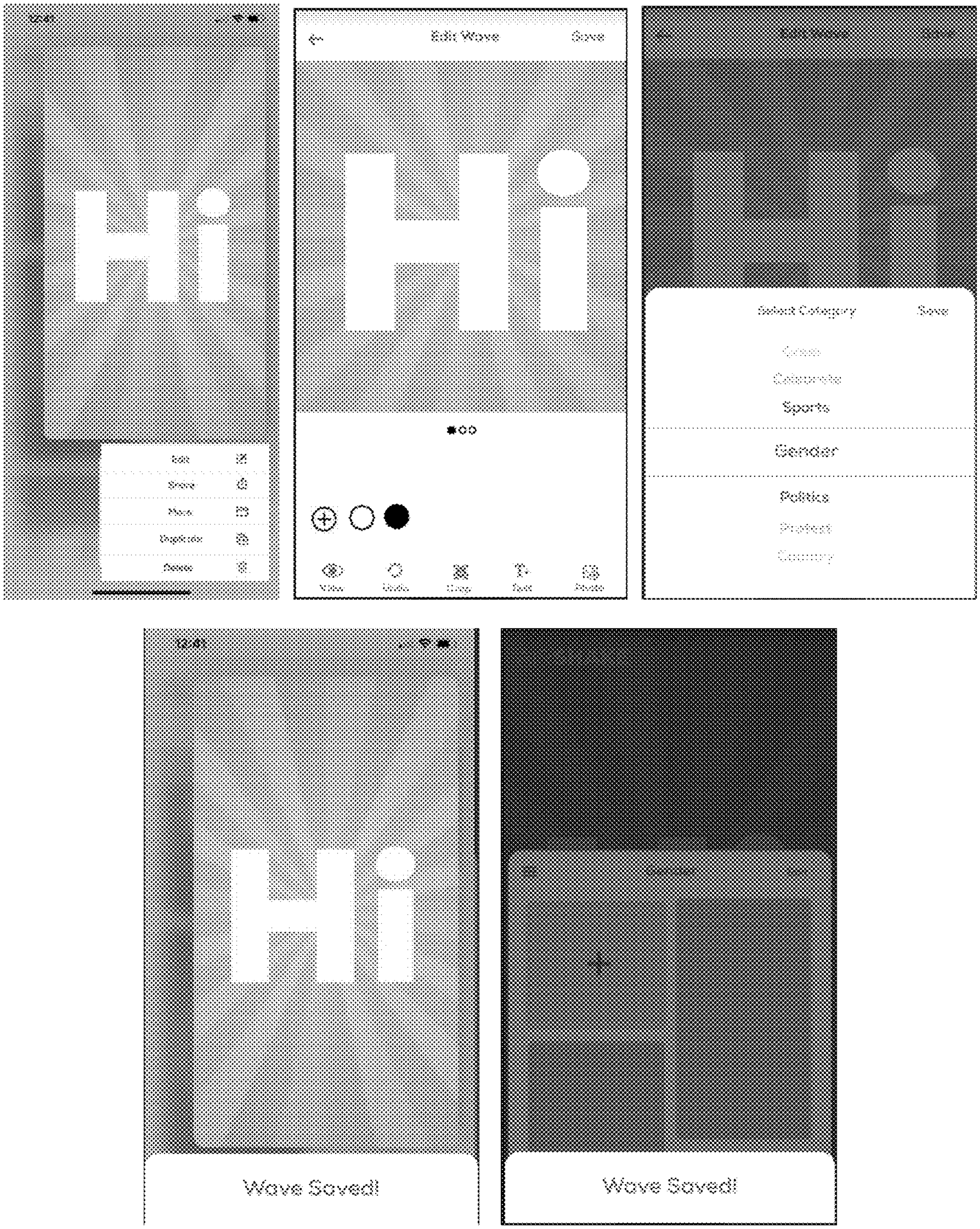

FIG. 22 shows exemplary screenshots of saving a wave/spin to a profile according to some embodiments. The wave/spin is saved to a profile by selecting a category and selecting the save button.

FIGS. 23-29 show exemplary screenshots of saved waves/spins according to some embodiments. In some embodiments, the waves/spins are saved in categories in a profile. If a user selects a wave/spin from these categories, the app simply opens the wave/spin. A user is also able to select "edit" to edit a wave/spin. In the Figures, blank thumbnails are used to hold position, but these are able to be replaced with Pre-Set waves. A long press on a profile wave/spin is able to be used to trigger editing a wave/spin.

Figure 30:
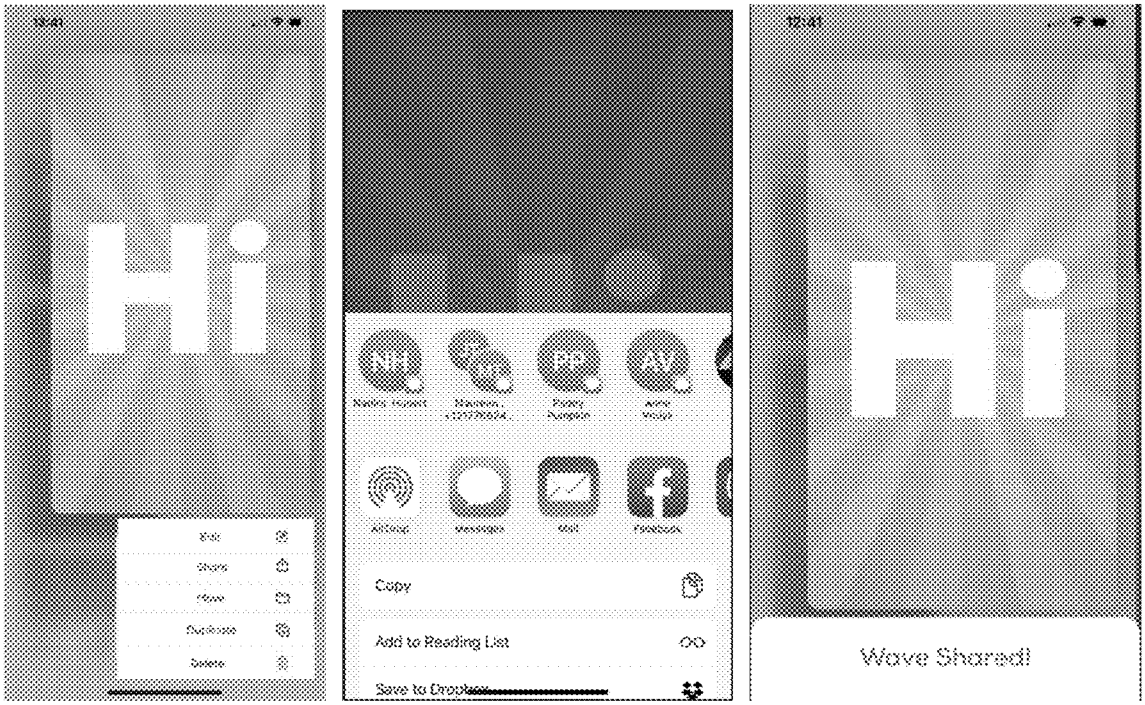
FIG. 30 shows an exemplary screenshot of sharing a wave/spin according to some embodiments.

FIG. 30 shows an exemplary screenshot of sharing a wave/spin according to some embodiments. A wave/spin is able to be shared via any social network, email, messaging or any other implementation.

Figure 31:
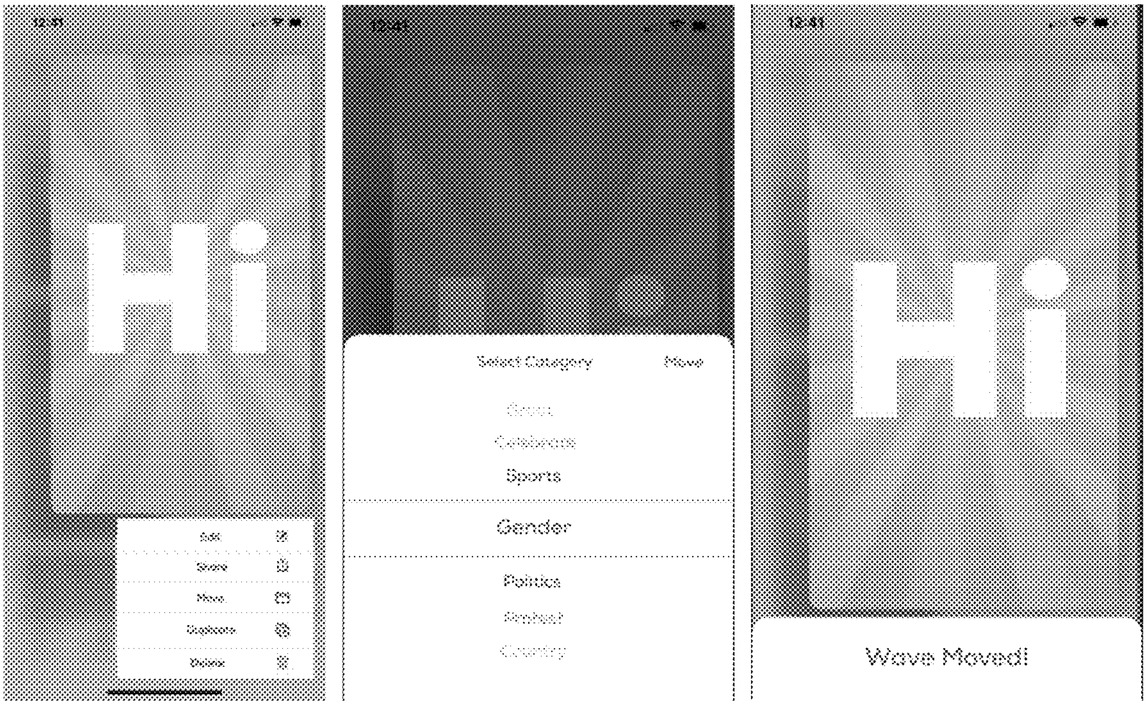
FIG. 31 shows an exemplary screenshot of moving a wave/spin according to some embodiments.

FIG. 31 shows an exemplary screenshot of moving a wave/spin according to some embodiments. The wave/spin is able to be moved from one category to another category.

Figure 32:
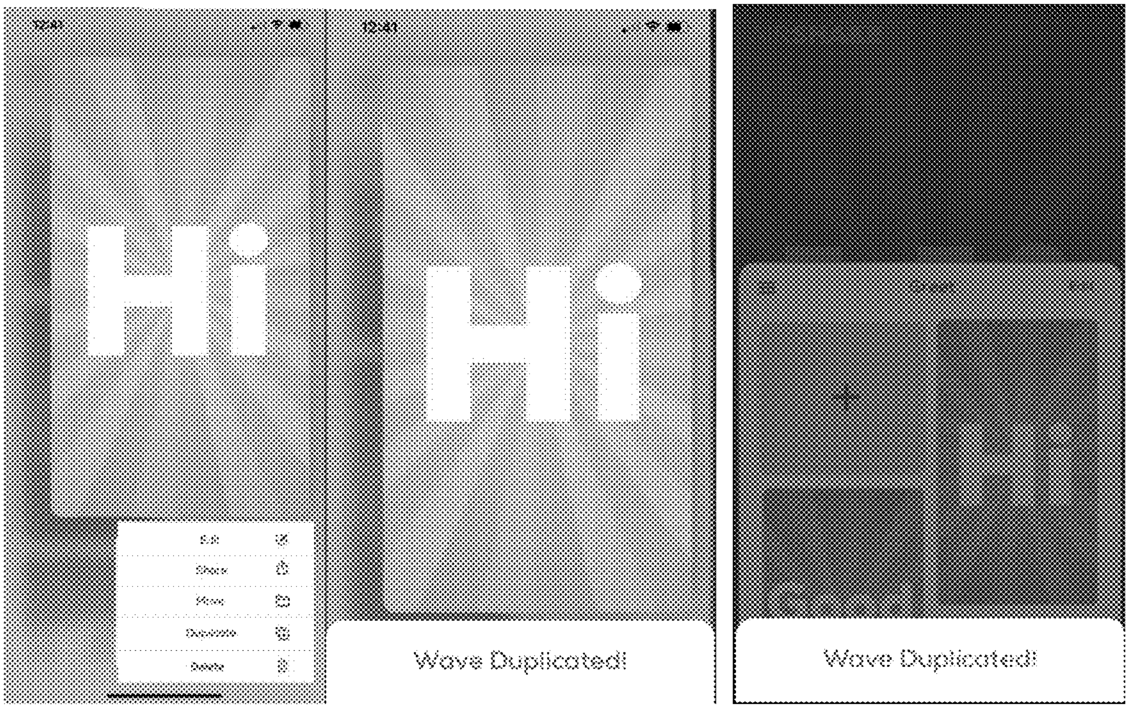
FIG. 32 shows an exemplary screenshot of duplicating a wave/spin according to some embodiments.

FIG. 32 shows an exemplary screenshot of duplicating a wave/spin according to some embodiments. Duplicating a wave/spin enables a user to keep a wave/spin and then modify the duplicated wave/spin.

Figure 33:
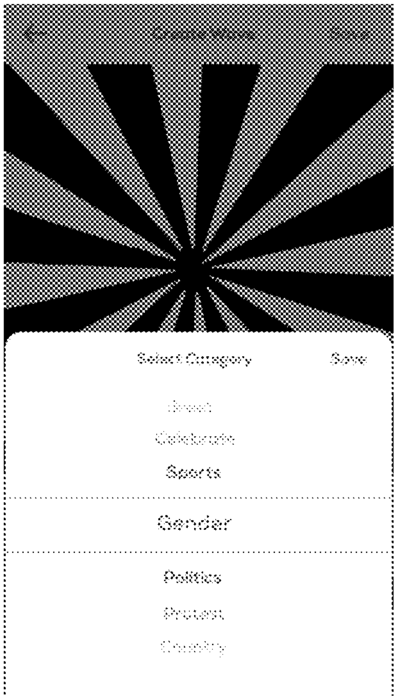
FIG. 33 shows an exemplary screenshot of selecting a category according to some embodiments.

FIG. 33 shows an exemplary screenshot of selecting a category according to some embodiments. Categorizing waves/spins enables users to find their waves faster.

Figure 34:
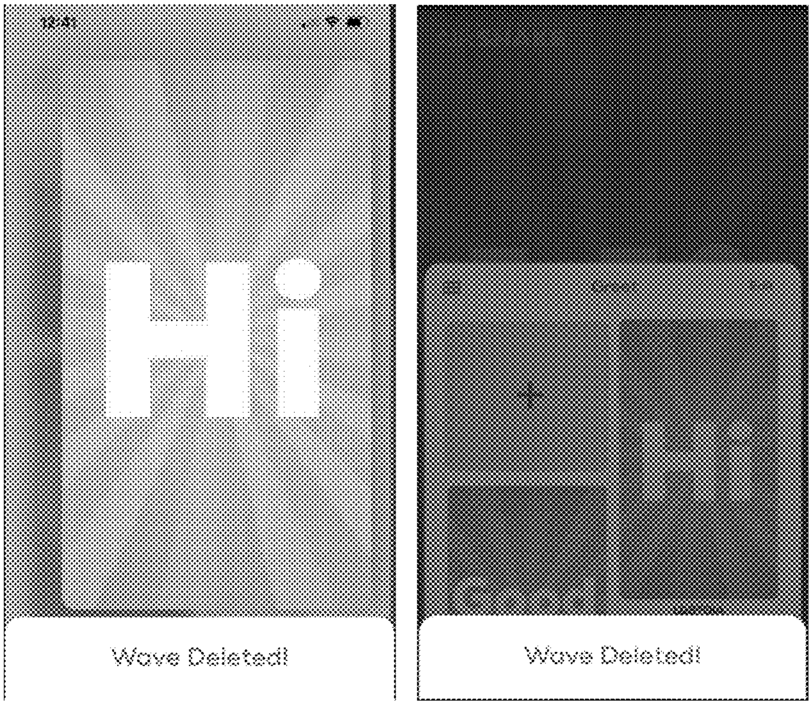
FIG. 34 shows an exemplary screenshot of deleting a wave/spin according to some embodiments.

FIG. 34 shows an exemplary screenshot of deleting a wave/spin according to some embodiments.

Figure 35:
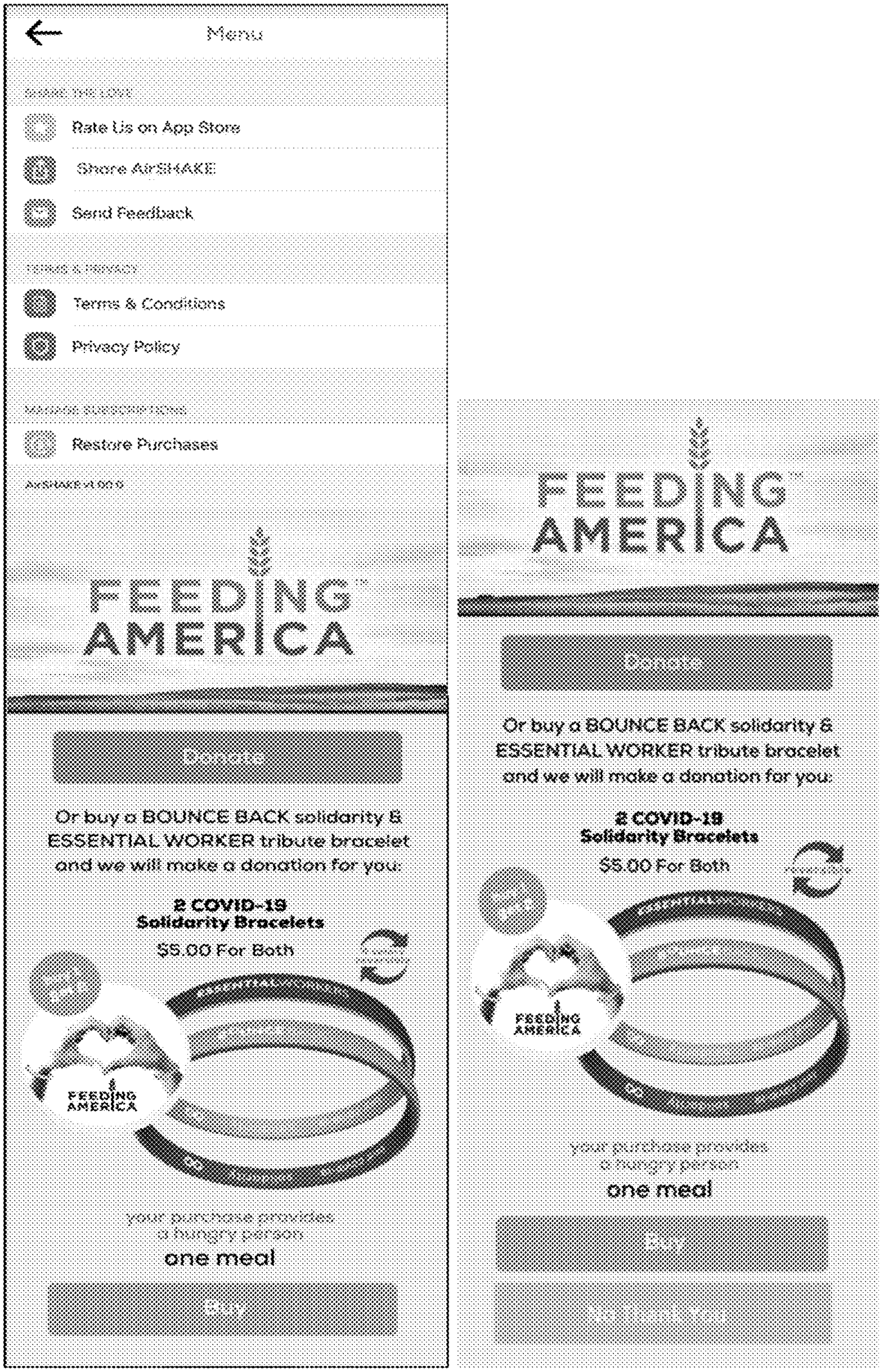
FIG. 35 shows an exemplary screenshot to donate according to some embodiments.

FIG. 35 shows an exemplary screenshot to donate according to some embodiments.

Figure 36:
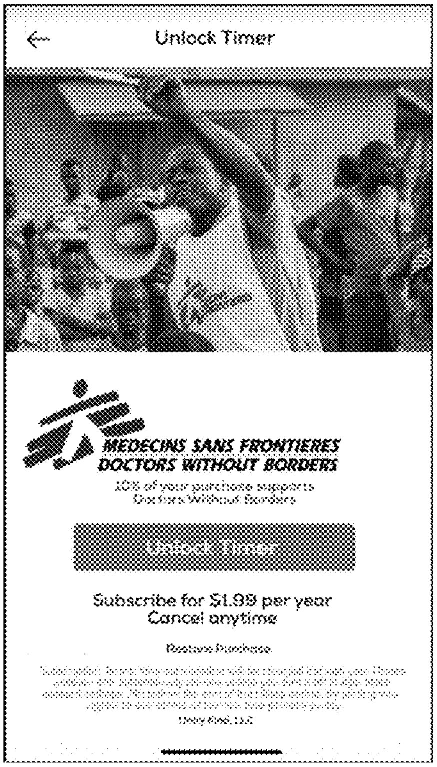
FIG. 36 shows an exemplary screenshot of a timer unlock of a wave/spin according to some embodiments.

FIG. 36 shows an exemplary screenshot of a timer unlock of a wave/spin according to some embodiments. As described herein, a timer is able to be utilized for a free service which is able to be unlocked by paying a fee.

In some embodiments, a pop-up advertisement is able to appear during a wave/spin. Any type of advertisement is able to be included. The advertisement is able to appear before the wave/spin, as part of the wave/spin, as a background of the wave/spin, and/or after the wave/spin.

Figure 37:
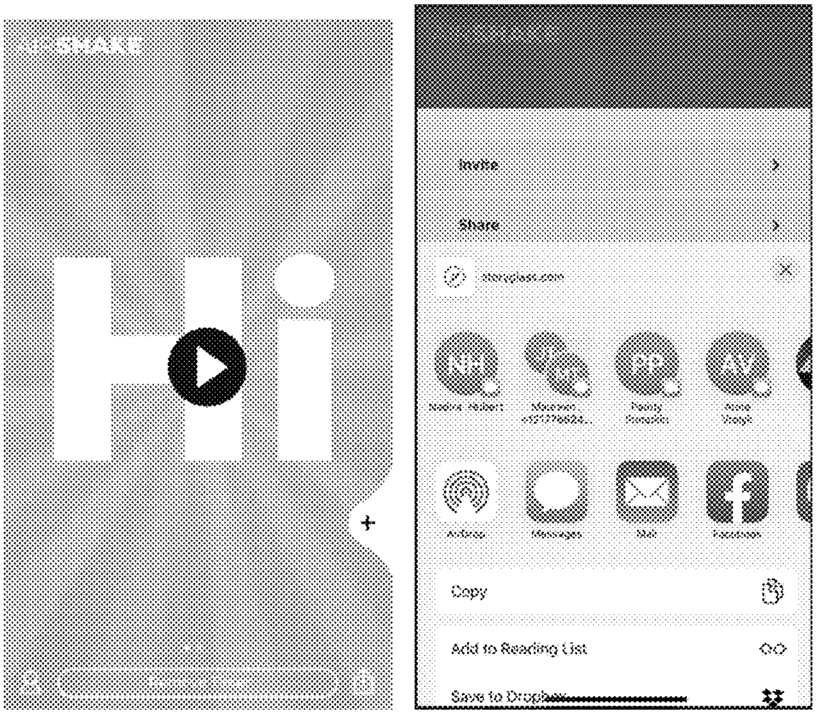
FIG. 37 shows an exemplary screenshot of sharing a wave/spin according to some embodiments.

FIG. 37 shows an exemplary screenshot of sharing a wave/spin according to some embodiments.

Figure 38:
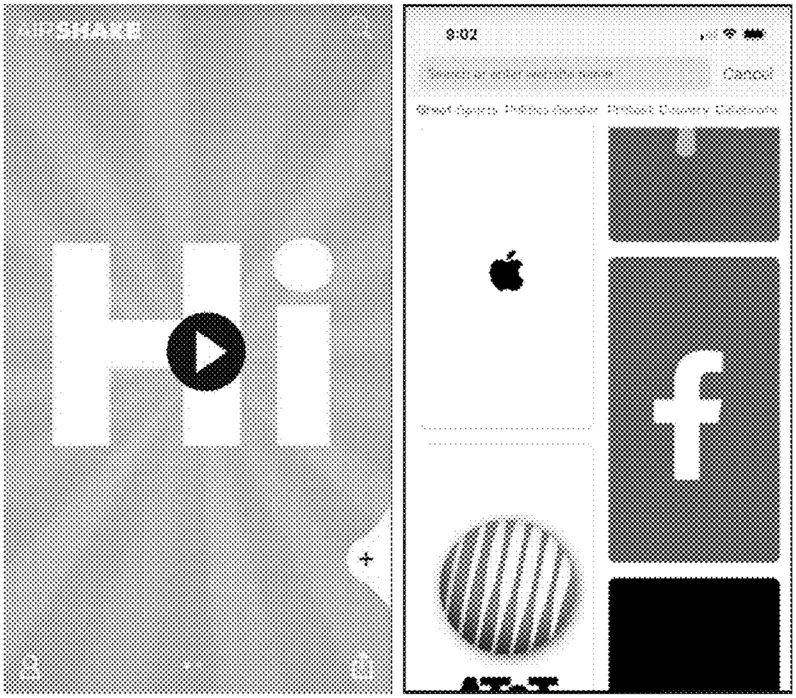
FIG. 38 shows an exemplary screenshot of a search according to some embodiments.

FIG. 38 shows an exemplary screenshot of a search according to some embodiments. The app is able to include a search feature. The search feature is able to be used to search titles of waves/spins, based on a creation date of a wave/spin, using an image search, and/or for text within a wave/spin. Similarly, the app is able to include business logos when providing a wave/spin. By utilizing a company logo, a businessperson is able to indicate where she works. A person's background of the wave/spin is able to be their business card including a logo and contact information.

Figure 39:
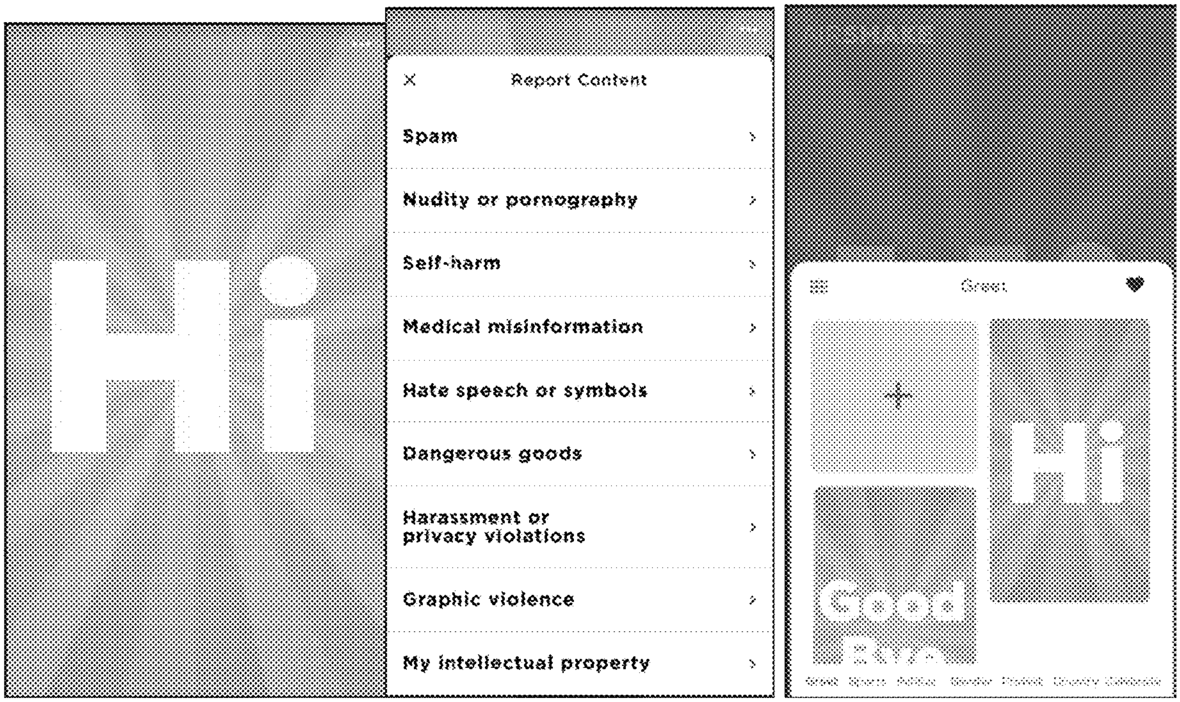
FIG. 39 shows an exemplary screenshot of reporting inappropriate content according to some embodiments.

FIG. 39 shows an exemplary screenshot of reporting inappropriate content according to some embodiments. Any type of content is able to be flagged and reported. Specific categories of inappropriate content are able to be selected and utilized.

Figure 40:
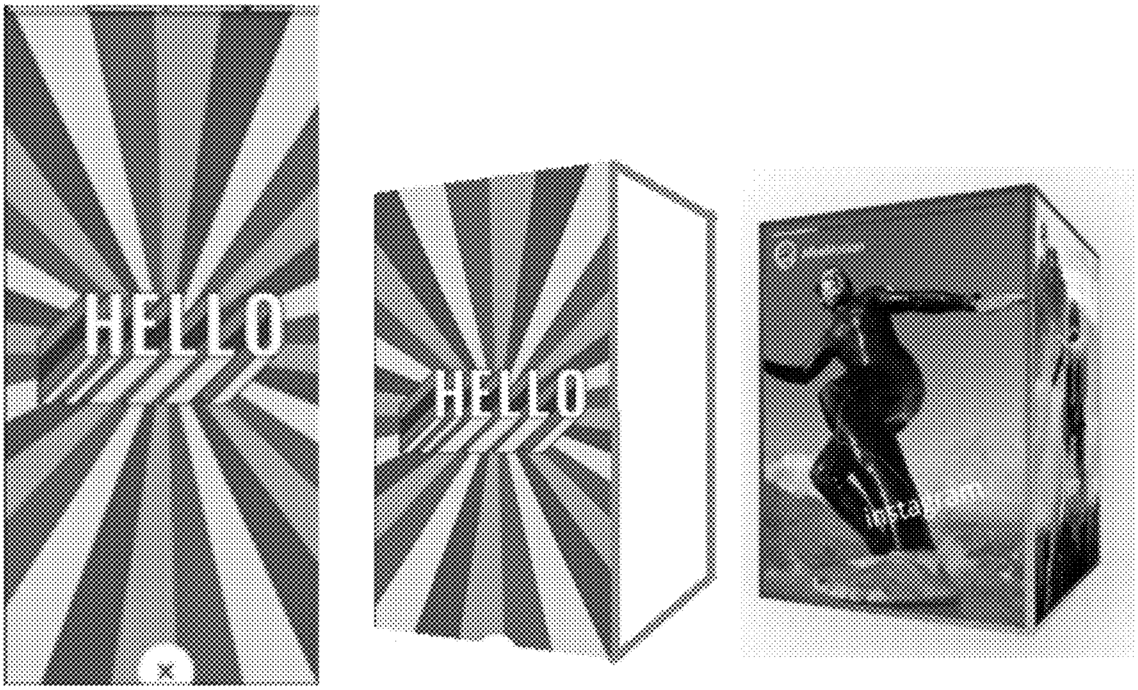
FIG. 40 shows an exemplary screenshot of a 3D implementation according to some embodiments.

FIG. 40 shows an exemplary screenshot of 3D implementation according to some embodiments. A wave/spin or handshake is able to be implemented in a 3D orientation where the text and/or graphics are able to rotate in multiple directions.

Figure 41:
FIG. 41 shows an exemplary screenshot of company logos as waves/spins according to some embodiments.

FIG. 41 shows an exemplary screenshot of company logos as waves/spins according to some embodiments. Companies are able to set up waves/spins for their employees. In some embodiments, only an employee of a company is able to use the company wave/spin. For example, a user is able to tap on a company logo and enter a company email. The user will then receive an email for verification.

Figure 42:
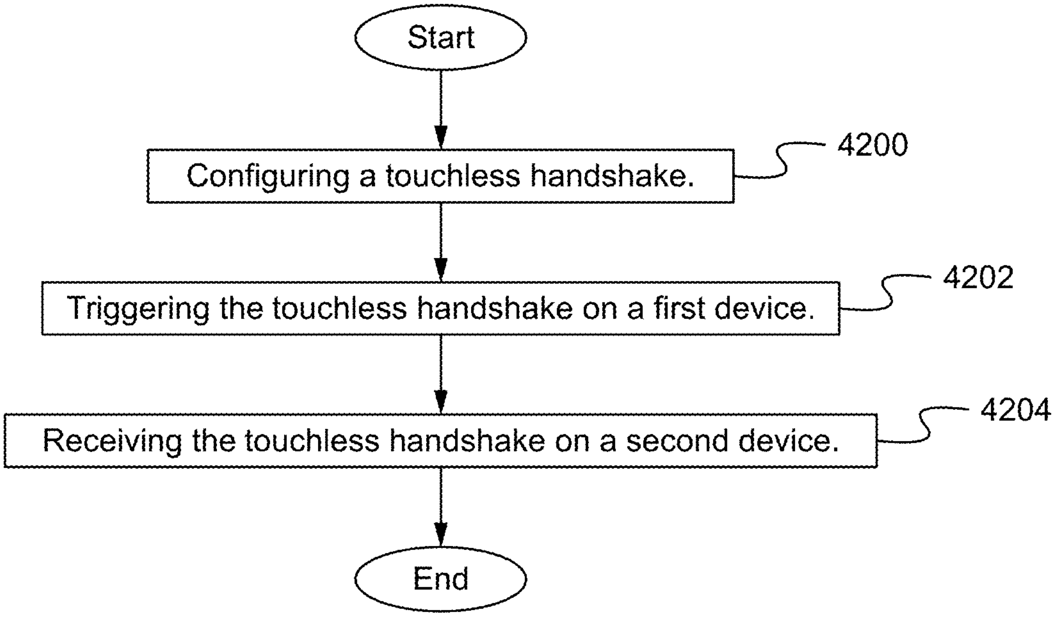
FIG. 42 shows a flowchart of a method of implementing a touchless handshake according to some embodiments.

FIG. 42 shows a flowchart of a method of implementing a touchless handshake according to some embodiments. In the step 4200, a touchless handshake is configured. Configuring the touchless handshake is able to include any information such as how long the touchless handshake lasts, how the touchless handshake is displayed (e.g., just vibrations, a specific vibration pattern, images/video/audio included), and/or any other configuration information. In the step 4202, the touchless handshake is triggered on a first device. Triggering the touchless handshake is able to be performed in any manner. For example, the touchless handshake is able to be triggered by the user holding the mobile device in a specified orientation, and moving the mobile device in a specific pattern (e.g., up and down similar to a handshake motion). In some embodiments, before the user performs the motion, a signal is sent to another device (e.g., the second device), so that the user of the second device positions her mobile device in her hand. The signal is able to be any wireless signal (e.g., ultrasonic), and the second device is able to provide an indication that a touchless handshake is forthcoming. In the step 4204, the touchless handshake is received on the second device. As described herein, the touchless handshake is a wireless signal from the first device which causes an effect on the second wireless device (e.g., vibrations). In some embodiments, fewer or additional steps are implemented. For example, confirmation of the handshake is provided to one or both devices involved in the touchless handshake. In some embodiments, the order of the steps is modified. A similar implementation is able to be performed for a wave/spin or other virtual/touchless interaction.

Figure 43:
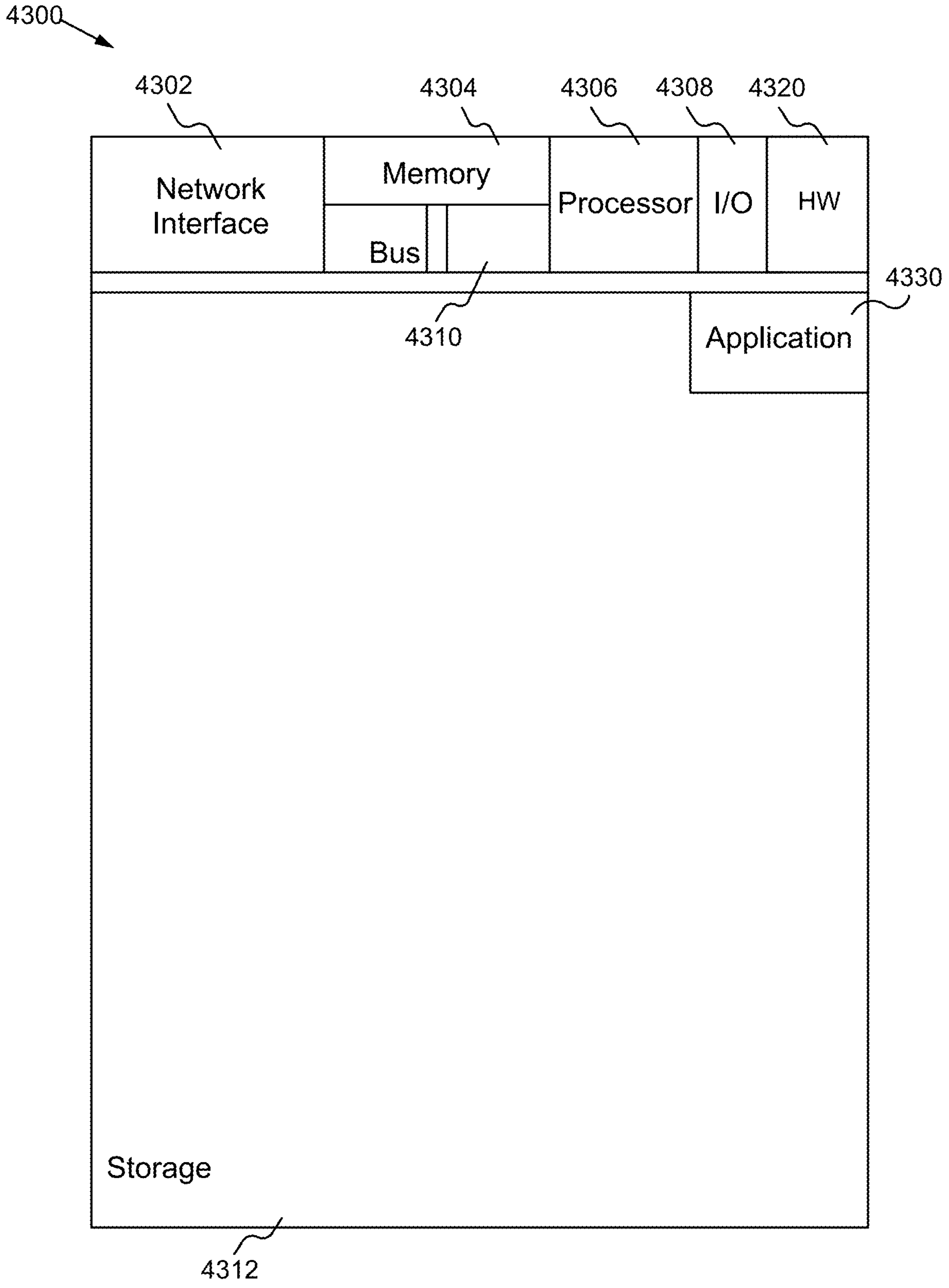
FIG. 43 shows a block diagram of an exemplary computing device configured to implement the touchless handshake method according to some embodiments.

FIG. 43 shows a block diagram of an exemplary computing device configured to implement the touchless handshake method according to some embodiments. The computing device 4300 is able to be used to acquire, store, compute, process, communicate and/or display information such as images and videos, and provide physical manifestations in a receiving device. The computing device 4300 is able to implement any of the touchless handshake aspects. In general, a hardware structure suitable for implementing the computing device 4300 includes a network interface 4302, a memory 4304, a processor 4306, I/O device(s) 4308, a bus 4310 and a storage device 4312. The choice of processor is not critical as long as a suitable processor with sufficient speed is chosen. The memory 4304 is able to be any conventional computer memory known in the art. The storage device 4312 is able to include a hard drive, CDROM, CDRW, DVD, DVDRW, High Definition disc/drive, ultra-HD drive, flash memory card or any other storage device. The computing device 4300 is able to include one or more network interfaces 4302. An example of a network interface includes a network card connected to an Ethernet or other type of LAN. The I/O device(s) 4308 are able to include one or more of the following: keyboard, mouse, monitor, screen, printer, modem, touchscreen, button interface and other devices. Touchless handshake application(s) 4330 used to implement the touchless handshake method are likely to be stored in the storage device 4312 and memory 4304 and processed as applications are typically processed. More or fewer components shown in FIG. 43 are able to be included in the computing device 4300. In some embodiments, touchless handshake hardware 4320 is included. Although the computing device 4300 in FIG. 43 includes applications 4330 and hardware 4320 for the touchless handshake method, the touchless handshake method is able to be implemented on a computing device in hardware, firmware, software or any combination thereof. For example, in some embodiments, the touchless handshake applications 4330 are programmed in a memory and executed using a processor. In another example, in some embodiments, the touchless handshake hardware 4320 is programmed hardware logic including gates specifically designed to implement the touchless handshake method.

In some embodiments, the touchless handshake application(s) 4330 include several applications and/or modules. In some embodiments, modules include one or more submodules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 44:
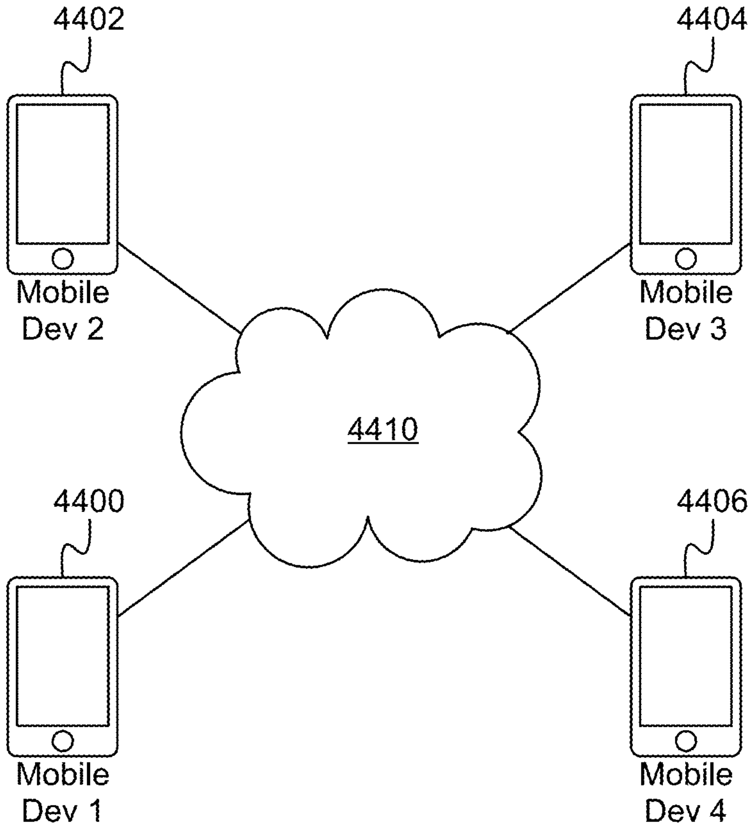
FIG. 44 shows a diagram of a network of devices implementing the touchless handshake method according to some embodiments.

FIG. 44 shows a diagram of a network of devices implementing touchless handshake method according to some embodiments. The network of devices includes a set of mobile devices 4400, 4402, 4404 and 4406. Although four mobile devices are shown, any number of devices are able to be used. A first mobile device 4400 is able to be used to send a handshake or wave/spin to a second mobile device 4402 (or a group of mobile devices). As described herein, the mobile devices are able to communicate using ultrasonic waves or other wireless implementations. The mobile devices are able to communicate via a network 4410 (e.g., the Internet).

A mobile device implementing the touchless handshake is able to include a small motor, where the motor is built partially off-balanced (e.g., using improper weight distribution attached to the motor's shaft/axis). When the motor rotates, the irregular weight causes the phone to vibrate. In some embodiments, the motor is able to be affected by an app in a way that the vibrations are able to be controlled and/or varied so as to produce a pattern. For example, instead of merely vibrating or performing vibrations for 1 second, then turning off for 1 second, and repeating, the vibrations are able to be turned on and off to perform other patterns.

The mobile device is also able to include a device to send and receive ultrasonic signals. The ultrasonic signals are inaudible to humans but are able to be detected by other mobile devices capable of receiving ultrasonic signals.

The mobile device is able to include sensors (e.g., accelerometers, pressure sensors and/or touch sensors such as the touchscreen) to determine the orientation of the mobile device in the user's hand. For example, to best simulate a handshake, a mobile phone should be held in the palm of the user's hand in an orientation length-wise, parallel (e.g., horizontal) to the ground. The accelerometers in the mobile phone are able to determine that the mobile phone is horizontal rather than upright, and the touchscreen is able to determine that the user is gripping the mobile phone as one would grip another hand during a handshake (e.g., thumb on top and other fingers on bottom). Furthering the example, the app is able to receive sensor information that at least one finger is on the side/bottom of the mobile phone, and the mobile phone is in a horizontal orientation. In another example, pressure sensors on the sides of the mobile device are able to detect pressure on each side of the mobile device from the user squeezing the mobile device as one would with a handshake. In some embodiments, the app trains/learns a user's phone handshake by performing tests where the user is prompted to perform a handshake with the phone, and the app records the sensor information during the tests.

To utilize the touchless handshake, user devices are configured to communicate with each other (e.g., by sending an ultrasonic signal) which causes the receiving device to shake similar to a handshake feeling. In some embodiments, additional information is sent. In some embodiments, a wave/spin is implemented instead of a touchless handshake.

In operation, the touchless handshake method enables users to perform a handshake while maintain a social distance to prevent the transmission of contagious illnesses such as Covid-19.

Anything discussed herein regarding a touchless handshake also applies to the wave/spin implementation and/or any other implementation, and vice versa.

In some embodiments, the handshake and wave/spin implementations are separate apps, and in some embodiments, the handshake and wave/spin implementations are in a single app.

The app or apps described herein are able to be preinstalled on a device (e.g., incorporated with a mobile device's operating system and/or installed before shipment of the mobile device), or the app or apps are able to be downloaded and installed via a web page, mobile service such as the App Store or Google Play, or any other online service.

A Proximity Intelligence™ method and system described herein encompasses multiple interconnected features that work in unison, driving a significant advancement in the field of networking. Proximity Intelligence™ is able to be based on proximity or location, but also by matching and grouping people based on personas, mindset, personality type, and many other factors. Proximity Intelligence™ utilizes the convergence of artificial intelligence and location services.

Personal Radar™ scans a user's surroundings, parses the crowd and serves the user suggestions of nearby people that the user would most likely find interesting (e.g., based on similar interests).

Proximity Intelligence™ keeps track of nearby footfall traffic for businesses, which is referred to as Business Radar™. Re-marketing opportunities for local business are available. Businesses are notified when repeat customers are in close proximity. There is no need to manually or physically collect customer lists as this is all performed seamlessly for the business and brings local business marking to a new level. An app is able to keep track of who comes into or near a store/business, which is referred to as a proximity handshake. The store/business is then able to utilize that information for marketing purposes or any other reason. The store/business is also able to offer deals to customers that are currently nearby to encourage the customers to enter the store. A classified marketplace with listings is able to be implemented by the store/business. A user is able to "draw a circle" and use Proximity Intelligence™ to select the visibility for deals. In real time, the app is able to generate different pricing for visibility, within the circle, based on quantity of eyeballs and which eyeballs are exposed to the deals.

The power of collective intelligence from the crowd is harnessed. By integrating the wisdom, knowledge, expertise, and diverse perspectives of individuals within the network, networking capabilities are enhanced, and innovative connections and collaborations are facilitated. The unique spin/wave feature serves as a catalyst, generating a dynamic environment where users can tap into the collective intelligence of the crowd, driving unprecedented networking possibilities. The spin/wave is able to act as a group handshake where many people are able to introduce themselves.

In addition to collective intelligence, user traits are an important element. User traits refer to the personal characteristics, skills, interests, and preferences of individuals within the network. By considering these traits, the method and system facilitate targeted and meaningful connections between users who share common goals, interests, or complementary skills. This personalized approach enhances the networking experience, promoting fruitful collaborations and maximizing the potential for positive change.

The strength of the method and system lies in the synergistic integration of collective intelligence and user traits. These elements work in tandem to generate a transformative networking system. The spin mechanism serves as a visual signal, allowing users within face-to-face distance to identify each other's readiness to engage. This signal prompts users to open their devices and join the dynamic network, where collective intelligence and user traits intertwine to generate an instant mesh network of like-minded individuals. This seamless integration ensures a powerful and effective networking experience that surpasses the capabilities of existing platforms.

Each feature enhances the functionality and usability of the others, culminating in a cohesive networking solution that surpasses the capabilities of existing platforms.

The spin mechanism and the wave mechanism utilize real-time engagement capabilities, which, in turn, are facilitated by the dynamic networking environment and the mesh network expansion. These components form an integrated system, working together to enable the visual signal and generate a dynamic and responsive networking environment.

Efficiently allocating tasks to the most suitable contributors is a key factor behind scalability and effectiveness.

The fusion of collective intelligence and AI lies at the core of the problem-solving approach.

In some embodiments, a spin or wave implementation enables a user to generate a network. In some embodiments, a spin or wave graphic moves to a user's motion and identifies to other people that they are on a designated network. The spin or wave combined with the user's motion or intention signals to others a network is being formed. This can be as simple as holding the phone facing toward a person or people with a graphic indicating the network is being formed. The user does not need to be waving, but the signal is holding the phone upright and still with a graphic indicative of the designated network. Other ways of implementing a spin or wave is by making a special motion with a device.

A unique feature serves as a powerful signal to individuals in the crowd, instantly indicating their presence and availability within the network. The spin acts as a virtual baton, sparking spontaneous connections and facilitating the formation of instant networks. When others open an app (e.g., OpenCrowd), they become a beacon and spontaneous network expansion is generated.

When someone activates their spin on the app, it immediately catches the attention of others in the crowd. The spin serves as a visual cue, signaling that the person is actively engaged and ready to connect. This instant recognition enables individuals with shared interests or goals to identify each other swiftly, fostering a sense of belonging and generating opportunities for collaboration.

The spin on the app allows for the formation of instant, spontaneous networks. When multiple individuals activate their spins simultaneously, it generates a dynamic environment where people can easily find like-minded peers. This serendipitous networking capability opens the door to unexpected connections, enabling individuals to collaborate, exchange ideas and embark on new ventures in real-time.

The spin feature facilitates meaningful interactions by signaling the availability and willingness of individuals to engage with others. It eliminates the barriers that often hinder connections in traditional networking settings, such as introductions or ice-breaking conversations. The spin instantly breaks down these barriers, allowing individuals to jump into conversations or join ongoing discussions with ease.

With the spin on the app, real-time collaboration becomes seamless. It enables individuals to come together in the moment, leveraging each other's strengths and expertise to address challenges, brainstorm ideas, or provide immediate feedback. This spontaneous collaboration can lead to innovative solutions and accelerate the pace of problem-solving.

The spin feature enhances engagement within the app community. By signaling their presence and readiness to connect, individuals actively participate in the collective intelligence of the crowd. This heightened engagement fosters a sense of community and camaraderie, encouraging individuals to contribute their insights, share knowledge, and support one another's endeavors.

The spin feature empowers users with agency over their networking experiences. Individuals have control over when and how they activate their spins, allowing them to manage their interactions and align them with their interests and availability. This sense of control fosters a positive user experience, enabling individuals to engage in networking activities that align with their goals and preferences.

The spin feature on the app serves as a powerful catalyst for instant, spontaneous networks. By providing a visual signal of availability and actively encouraging connections, the spin enables individuals to form meaningful relationships, collaborate in real-time, and unleash the full potential of collective intelligence. It generates a vibrant and dynamic networking environment, where individuals can effortlessly discover like-minded peers, fuel innovation, and drive positive change.

The spin feature goes beyond traditional networking approaches and brings a powerful and transformative element to the concept of connectivity. By introducing a dynamic signaling mechanism that allows users to indicate their readiness to engage in real-time, the spin feature has the potential to generate an instant mesh network, one phone at a time. When individuals are in face-to-face proximity and see someone else's spin, it serves as a powerful signal that they too can open their phones and activate their spin. This cascading effect of spinning generates an immediate and organic network of like-minded individuals, fostering instant connections and collaborations.

The expansion of the mesh network through the spin feature is a truly revolutionary concept. It leverages the power of face-to-face interaction and the ubiquity of smartphones to generate an instant and spontaneous network of connected individuals. The spin feature acts as a visual cue, signaling to others in close proximity that you are ready to engage, prompting them to do the same. This powerful and immediate signal amplifies the potential for meaningful connections and collaboration, breaking down barriers and fostering a dynamic environment where innovation can thrive.

The spin feature is not only unique and distinctive but also addresses a fundamental challenge in networking: the ability to facilitate real-time, location-based connections. By providing individuals with a tangible and intuitive way to express their availability and desire to engage, the spin feature unlocks new possibilities for spontaneous collaborations and serendipitous encounters. It empowers users to seize networking opportunities in the moment, without the need for extensive searches or formal introductions.

The user's spin action can communicate to other phones on the network so the app can parse from this information forming like-minded groups and more. AI is able to be used to generate a network.

A backend system is able to be used to generate a group with a defined boundary and a backend to block boundaries. The groups are able to be sponsored groups. Boundaries for events are able to be set/blocked to sell the virtual "real estate." For example, an "X brand vodka group" at a music festival is able to purchase the virtual "real estate."

The intersection of proximity, intelligence, and state of mind represents a fascinating convergence of human experience and technology. An app is able to harness the power of this intersection by seamlessly integrating proximity-based interactions with advanced artificial intelligence capabilities, all while taking into account the user's location as well as their current state of mind. It is a synergy that allows users to connect not just based on physical proximity but also on the more intricate and transient aspects of their thoughts and feelings. Whether they are seeking professional networking opportunities at a conference, looking for companionship at a music festival, or simply enjoying a leisurely day out, the app's platform adapts intelligently, ensuring that connections are not just convenient but deeply meaningful, reflective of the user's real-time state of mind, and enhancing the overall quality of their interactions.

With a spin app, the user has opted into location services. The user waves the starburst graphic (or another graphic) which rotates in a circle to the user motion. This is a visual signal for those within viewing distance that this person is either starting or is helping to grow a nearby network. In some embodiments, the user's device will send a push notification to everyone who has the app or has the app in the background. The notification alerts these nearby devices that a network is being formed. In some embodiments, non-app users are also alerted that a network is being informed. For example, a message is sent via another social networking app to indicate that a network is being formed on the spin app. This is similar to word of mouth; however, this is a new way because users are spreading the word to strangers. In the app, users are anonymous, but in some implementations, anonymity is not implemented. In a large crowd, it is possible to generate a network in minutes that includes all the people of the large crowd. Those without the app will not be included in the network. Those who ignore or do not see the signal also will not be included.

Artificial intelligence (AI) can be used to divide a crowd into small groups of like-minded people through various methods and techniques. First, data about the crowd is collected, which may include information about their interests, preferences, behaviors, or demographics. This data can be obtained through surveys, social media analysis, or other data sources. AI-based clustering algorithms such as K-means, hierarchical clustering, or DBSCAN are used to group individuals with similar attributes together. These algorithms will partition the crowd into smaller subgroups based on the data collected. If there is textual data such as social media posts or comments, NLP techniques are able to be used to analyze the text and identify common themes or sentiments. Sentiment analysis can help in grouping people who share similar opinions or interests. Machine learning models are trained to predict group membership based on various features. For example, one can build a classification model that assigns individuals to different groups based on their attributes. If there is data representing social connections (e.g., who interacts with whom on social media), social network analysis techniques are able to be applied to identify clusters or communities within the network. People who interact frequently with each other are likely to be like-minded. In dynamic situations, AI can use reinforcement learning to adaptively group individuals based on real-time observations and interactions. This can be useful for managing crowds at events or conferences. User profiles are developed by analyzing historical data and interactions, then recommend or suggest groups that align with each user's interests and preferences, generating smaller, like-minded communities. Feedback is continuously collected, and the grouping algorithms are refined to ensure that the groups accurately represent the evolving interests and opinions of the crowd. When collecting and using personal data, it is important to adhere to privacy regulations and ethical guidelines to protect individuals' information and rights. People's interests and opinions can be multifaceted and may change over time. AI is trained to handle the changes.

What makes the spin unique is that it searches for like-minded matches. User spins and tiles of other like-minded users appear. Part of the search is based on "state of mind." This is the intersection of an algorithm that generates search results based on not only past behavior, but also on current state of mind. For example, if a person is at a business conference, the person probably wants to search the crowd for business people, not for people to date. If the person is going out on the town with her single friends, then dating is in the person's state of mind.

In some embodiments, the user is presented with two (or more) concepts, and they pick the one they prefer. For example, a user asked if she prefers the forest or the beach. Any number of questions are able to be presented to the user. The answers are part of the AI which matches people in the crowd.

People will be able to be met nearby anonymously. A location is able to be drawn on a map to generate a group. Groups can be invite only, request to join, anyone can join and more. Map places are able to be turned into social chat rooms.

Figure 45:
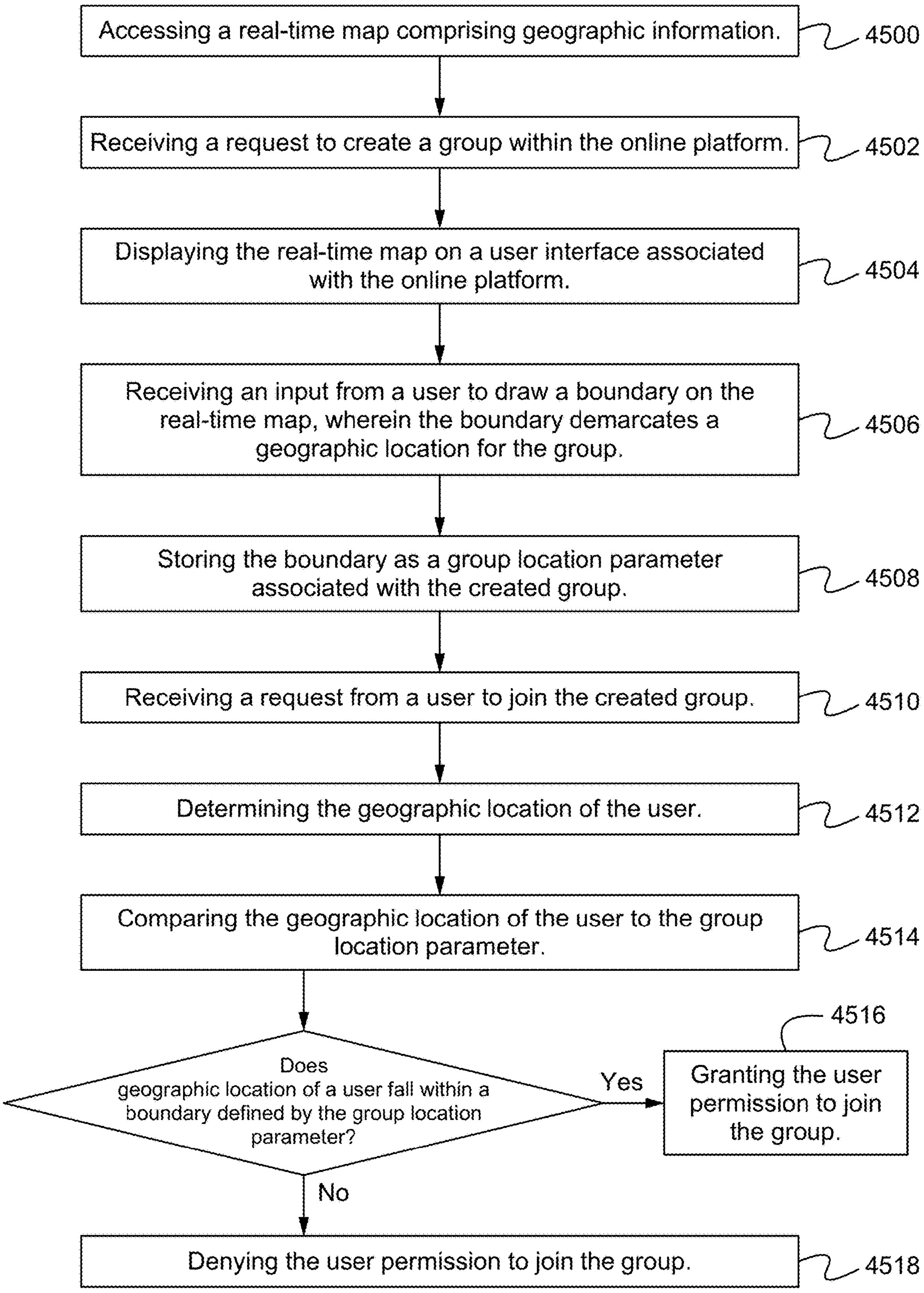
FIG. 45 shows a flowchart of a method of group formation in an online platform according to some embodiments.

FIG. 45 shows a flowchart of a method of group formation in an online platform according to some embodiments. In the step 4500, a real-time map with geographic information is accessed. In the step 4502, a request is received to generate a group within the online platform. Generating the group is able to be performed in any manner such as establishing connections between multiple users by forming a communication link between the users. In the step 4504, the real-time map is displayed on a user interface associated with the online platform. In the step 4506, an input is received from a user to draw a boundary on the real-time map, where the boundary demarcates a geographic location for the group. In the step 4508, the boundary is stored as a group location parameter associated with the generated group. In the step 4510, a request is received from a user to join the generated group. In the step 4512, the geographic location of the user is determined. In the step 4514, the geographic location of the user is compared to the group location parameter. In the step 4516, the user is granted permission to join the group if the geographic location of the user falls within the boundary defined by the group location parameter. Otherwise, the user permission to join the group is denied, in the step 4518. The user is notified when the geographic location of the user falls outside the boundary defined by the group location parameter, and the user permission is denied to join the group. The boundary is a polygon comprising a set of coordinates on the real-time map. The group location parameter further includes a radius value that defines the distance from a central point on the map within which users are allowed to join the group. In some embodiments, fewer or additional steps are implemented. In some embodiments, the order of the steps is modified.

The AI-powered recommendation systems play an important role in matching tasks with the most suitable contributors. An implementation is able to be used to introduce one or more people to other people. After AI matches likeminded people, the users are able to request an app to make an introduction to their matches.

A novel system and method for crowd parsing and group formation are described herein. By leveraging various APIs, such as Ticketmaster, Eventbrite, and Apple Places, combined with user device identification and location data, the app is capable of accurately identifying and mapping the density and type of crowds at different venues and events worldwide. The technology allows for the generation of personalized, like-minded groups within crowds, enabling targeted interactions and opportunities for businesses, including the sale of branded merchandise. Furthermore, the system provides additional features such as crowd-sourced event groups and interest-based groups. The versatility of this invention extends beyond mere social connectivity, as it holds potential for emergency organization and crowd management.

In some embodiments, a method includes parsing groups from events and places with a significant density of people utilizing event APIs, such as Ticketmaster, and places APIs, such as Apple Places, to obtain information regarding events, venues, and crowd density. New groups are generated when a specific density of people is detected at a particular place or event, using the information gathered from the APIs. The group formation capability is extended to various APIs, including those associated with plane flights, for broader crowd parsing applications.

In some embodiments, a method includes forming personalized groups based on shared interests and proximity by parsing crowds into smaller, more personable groups of like-minded individuals using machine learning algorithms. User devices are employed as signals to facilitate group formation and identification within a crowd. Humanized language associated with location and shared interests is incorporated to enhance user experiences.

In some embodiments, a method for ensuring safety and moderation within crowds includes implementing measures to moderate drug and sex trafficking activities within the parsed groups. Safety features and protocols are incorporated to address emergency situations and facilitate instantaneous organization of crowd members.

The app has a user motion-controlled graphic that signals to real people face to face that a network is being generated and formed on an online platform. A method for signaling network participation and facilitating interactions includes introducing a distinct signal, such as a brand icon or other art graphic to indicate network presence, encouraging users to utilize the signal as a means of greeting and establishing network connections, and exploring alternative signaling methods, such as neural link signals, to enhance user interactions, receiving input from a user to activate the distinct signal on the user interface, broadcasting the activated distinct signal to real people in face-to-face interactions, indicating the user's participation in the network, and facilitating the establishment of network connections between users based on the recognition and response to the activated distinct signal. The distinct signal is a brand icon associated with the online platform. The distinct signal is an art graphic expressing a particular point of view, such as support for LGBTQ-F. The neural link signals are utilized to transmit and receive the distinct signal directly to and from the user's brain.

In some embodiments, a method of signaling network participation and facilitating interactions includes introducing a distinct signal, such as an Apple icon, to indicate network presence, encouraging users to utilize the signal as a means of greeting and establishing network connections, and exploring alternative signaling methods, such as neural link signals, to enhance user interactions.

In some embodiments, a method of integrating additional features, including satellite phone communication and file sharing, includes extending the system's capabilities to support communication between satellite phones, including Starlink and Model Pi phones, and enabling efficient file sharing, such as images and audio, among multiple users in a crowd using Bluetooth® technology.

In some embodiments, a method of generating a digital signage and advertising marketplace based on location, includes leveraging location data to develop targeted advertising opportunities within the crowd, introducing a hybrid advertising platform that combines digital signage with Bluetooth® technology, and implementing walking advertiser features that reward users based on crowd size, duration of wave signaling, and phone positioning.

In some embodiments, a method of identifying and locating individuals within the crowd, includes downloading the app, which generates a unique graphic displayed on the phone's viewport, utilizing the unique graphic as a signal to other users within viewing distance, facilitating easy identification within the crowd, and providing search functionalities within the app to locate specific individuals either by the generated signal or appearance.

The user's spin action can communicate with other phones on the network so the app can parse from this information, forming like-minded groups and more.

Figure 46:
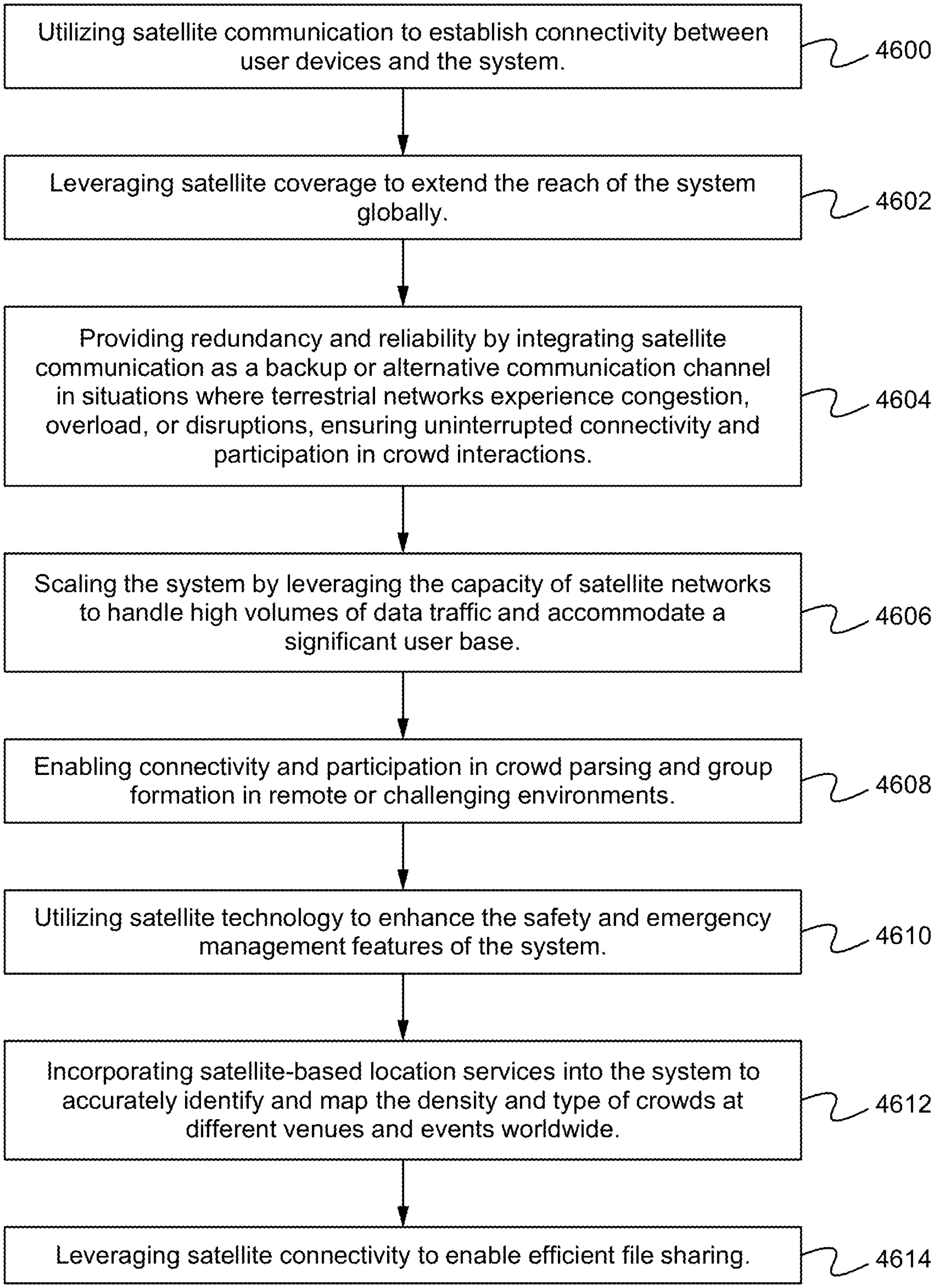
FIG. 46 shows a flowchart of a method of leveraging satellite technology in a system to enhance crowd parsing and group formation according to some embodiments.

FIG. 46 shows a flowchart of a method of leveraging satellite technology in a system to enhance crowd parsing and group formation according to some embodiments. In the step 4600, satellite communication is used to establish connectivity between user devices and the system, enabling participation in crowd parsing and group formation regardless of the availability or reliability of terrestrial networks. In the step 4602, the satellite coverage is leveraged to extend the reach of the system globally, allowing users from different regions and countries to access the system, join groups, and engage in targeted interactions. In the step 4604, redundancy and reliability is provided by integrating satellite communication as a backup or alternative communication channel in situations where terrestrial networks experience congestion, overload, or disruptions, ensuring uninterrupted connectivity and participation in crowd interactions. In the step 4606, the system is scaled by leveraging the capacity of satellite networks to handle high volumes of data traffic and accommodate a significant user base, allowing for seamless operations and performance even during periods of increased user activity or crowded events. In the step 4608, connectivity and participation in crowd parsing and group formation in remote or challenging environments is enabled, such as mountainous regions, open water, or deserts, where terrestrial communication infrastructure may be limited or non-existent, ensuring that users can access the system and benefit from its functionalities in various geographic locations. In the step 4610, satellite technology is utilized to enhance the safety and emergency management features of the system, allowing for instantaneous organization and communication among crowd members during emergency situations in remote or disaster-stricken areas. In the step 4612, satellite-based location services are incorporated into the system to accurately identify and map the density and type of crowds at different venues and events worldwide, providing real-time information for effective crowd management and targeted interactions. In the step 4614, satellite connectivity is leveraged to enable efficient file sharing, such as images and audio, among multiple users in a crowd using Bluetooth technology, enhancing collaboration and information exchange within groups formed through the system. By incorporating satellite technology into the system, the method revolutionizes crowd interactions and group formation by extending the system's reach, ensuring reliable connectivity in various environments, enhancing safety and emergency management capabilities, and providing scalable and efficient communication and collaboration features for users worldwide. In some embodiments, fewer or additional steps are implemented. In some embodiments, the order of the steps is modified.

Figure 47:
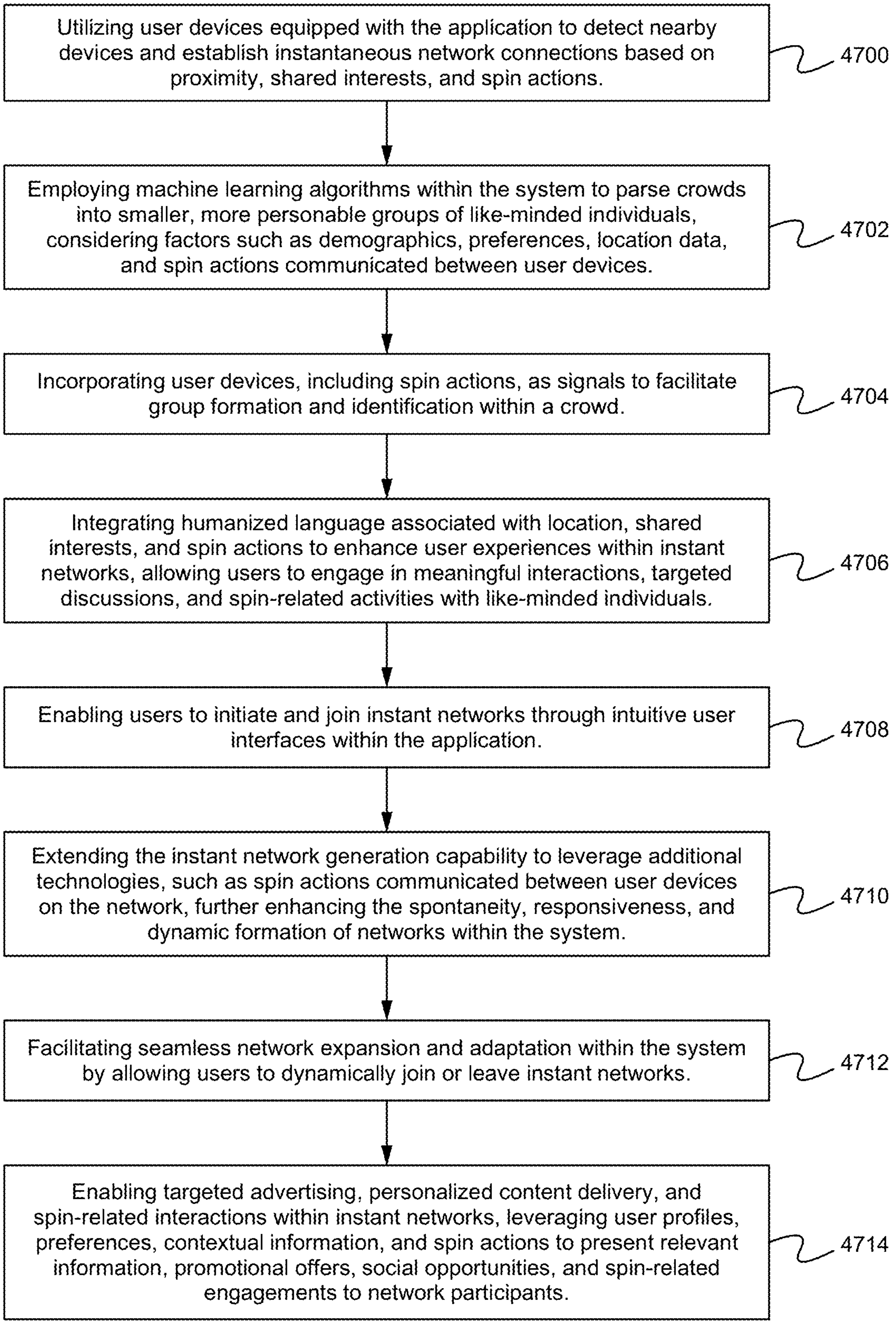
FIG. 47 shows a flowchart of a method of generating instant networks within the system, facilitating spontaneous group formation and targeted interactions, according to some embodiments.

FIG. 47 shows a flowchart of a method of generating instant networks within the system, facilitating spontaneous group formation and targeted interactions, according to some embodiments. In the step 4700, user devices equipped with the application are utilized to detect nearby devices and establish instantaneous network connections based on proximity, shared interests, and spin actions.

In the step 4702, machine learning algorithms are employed within the system to parse crowds into smaller, more personable groups of like-minded individuals, considering factors such as demographics, preferences, location data, and spin actions communicated between user devices.

Artificial intelligence (AI) can be used to divide a crowd into small groups of like-minded people through various methods and techniques. First, data is collected about the crowd, which may include information about their interests, preferences, behaviors, or demographics. This data can be obtained through surveys, social media analysis, or other data sources. AI-based clustering algorithms are used such as K-means, hierarchical clustering, or DBSCAN to group individuals with similar attributes together. These algorithms will partition the crowd into smaller subgroups based on the data collected. If there is textual data like social media posts or comments, NLP techniques can be used to analyze the text and identify common themes or sentiments. Sentiment analysis can help in grouping people who share similar opinions or interests. Machine learning models are trained to predict group membership based on various features. For example, you can build a classification model that assigns individuals to different groups based on their attributes. If there is data representing social connections (e.g., who interacts with whom on social media), social network analysis techniques can be applied to identify clusters or communities within the network. People who interact frequently with each other are likely to be like-minded. In dynamic situations, AI can use reinforcement learning to adaptively group individuals based on real-time observations and interactions. This can be useful for managing crowds at events or conferences. User profiles are developed by analyzing historical data and interactions. Then, groups that align with each user's interests and preferences are recommended or suggested, generating smaller, like-minded communities. Feedback is continuously collected, and the grouping algorithms are refined to ensure that the groups accurately represent the evolving interests and opinions of the crowd. When collecting and using personal data, it is important to adhere to privacy regulations and ethical guidelines to protect individuals' information and rights. In some embodiments, the AI detects and moderates content on the app. For example, hate speech, pornography, dangerous drugs, human trafficking and bullying are able to be detected using AI on the app. In some embodiments, human moderation is used in conjunction with the AI for certain situations (e.g., when the AI is unsure how the content should be moderated).

In the step 4704, user devices, including spin actions, are incorporated as signals to facilitate group formation and identification within a crowd, where devices exchange information, including spin-related data, to determine compatibility, proximity, and the level of shared interests for potential network connections.

In the step 4706, humanized language associated with location, shared interests, and spin actions is integrated to enhance user experiences within instant networks, allowing users to engage in meaningful interactions, targeted discussions, and spin-related activities with like-minded individuals.

In the step 4708, users are enabled to initiate and join instant networks through intuitive user interfaces within the application, providing options to specify preferences, interests, desired proximity, and spin-related preferences for network connections.

In the step 4710, the instant network generation capability is extended to leverage additional technologies, such as spin actions communicated between user devices on the network, further enhancing the spontaneity, responsiveness, and dynamic formation of networks within the system.

In the step 4712, seamless network expansion and adaptation within the system is facilitated by allowing users to dynamically join or leave instant networks, ensuring flexibility and continuous optimization of network composition based on user preferences, spin actions, and changing crowd dynamics.

In the step 4714, targeted advertising, personalized content delivery, and spin-related interactions within instant networks are enabled, leveraging user profiles, preferences, contextual information, and spin actions to present relevant information, promotional offers, social opportunities, and spin-related engagements to network participants. In some embodiments, fewer or additional steps are implemented. In some embodiments, the order of the steps is modified.

In some embodiments, a network is able to be built, for example, at a Cal vs. Stanford game in Berkeley Stadium. Pop up stores instantly become available to sell branded merchandise. The stores may have affiliate links. The pop up stores are able to be automatically generated based on location, places of interest and other criteria. The pop up stores are able to be for sport events, music events and/or any other event. The app that generates the pop up stores has information regarding the event that is happening and what people are at/near the event. Based on that information and other specific information about each user, the app is able to generate pop up stores which are able to provide specific information and offerings to each individual user.

For example, Group A is at a Cal game, and they form a micro group. Group B is hanging on at a pre-game party by Top Dog. Group C in the dorms. There is going to be some overlap between Groups A, B and C, although not completely, as it will depend on proximity and other factors (e.g., filters). All of the groups are within Group X which is a global group, but also within a zip code, county group or other regional group (which advertisers use to target audiences). The micro groups add a very “MICRO” proximity that would be good for an advertiser as well as the Groups A, B and C, e.g., people at the game but would like to pre-game or maybe someone wants to meet a cute girl at the game but is in the dorms.

The technology described herein possesses the remarkable capability to bring together a vast network of over 100,000 individuals within minutes. The act of spinning is an important aspect. When a person spins, the person is not merely generating a motion; the person is participating in the generation of a profound underground connectivity. This is more than just a simple connection; it is a web of interwoven spirits, each spin becoming a radiant thread in the fabric of our collective strength.

In this context, spinning is not merely a physical action; it is a symbolic gesture of unity, a beacon that signals a person’s willingness to be part of something greater than that person. It is akin to embarking on a journey through hidden passages, discovering new connections with every spin. Together, people will cultivate a network where each individual thrives as an essential part of the grander whole, bound together by the invisible ties of a shared purpose.

An important aspect of a wave/spin is that it is micro and cannot be made larger than that. A person ends up with a venn diagram that has some overlap and is all within the larger groups that X already does or advertisers already do. A micro group can grab people that are close so they can go in spend money now, not in 45 minutes when the place is now full.

In some embodiments, Google translation is used to translate the posts to English then apply moderation.

In some embodiments, a re-marketplace for Non-Fungible Tokens (NFTs) is implemented. The owner of the NFT is able to generate derivative works with the NFT and sell it in the form of a wave.

In some embodiments, instead of using GPS, geohashing is implemented so users cannot determine a precise location if an app is hacked. The denser that the crowd is, the geohashed “regions” are made smaller because the more people that are at a location, the less likely it can be determined who a specific person is. The smaller the geohashed region is, the more authentic the group is, meaning the population of a group is there for a reason.

Figure 48:
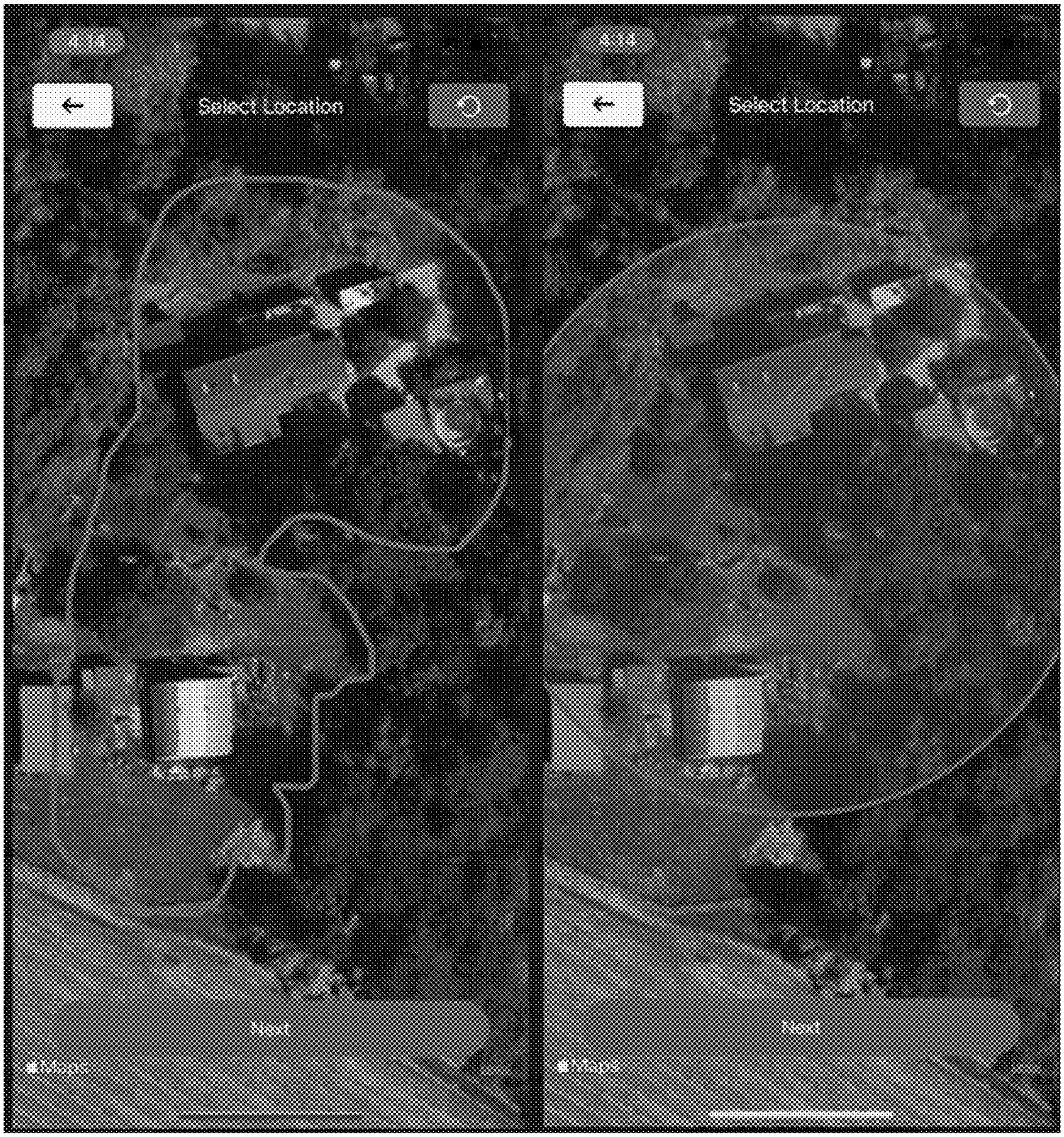
FIG. 48 shows screenshots of establishing a boundary to generate a network according to some embodiments.

FIG. 48 shows screenshots of establishing a boundary to generate a network according to some embodiments. In some embodiments, when a person finishes drawing a boundary, the boundary shape turns into a circle (e.g., when the user lifts her finger). Only people who are within the finished circle boundary are able to request to join the group or join without approval depending on the group setting.

Figure 49:
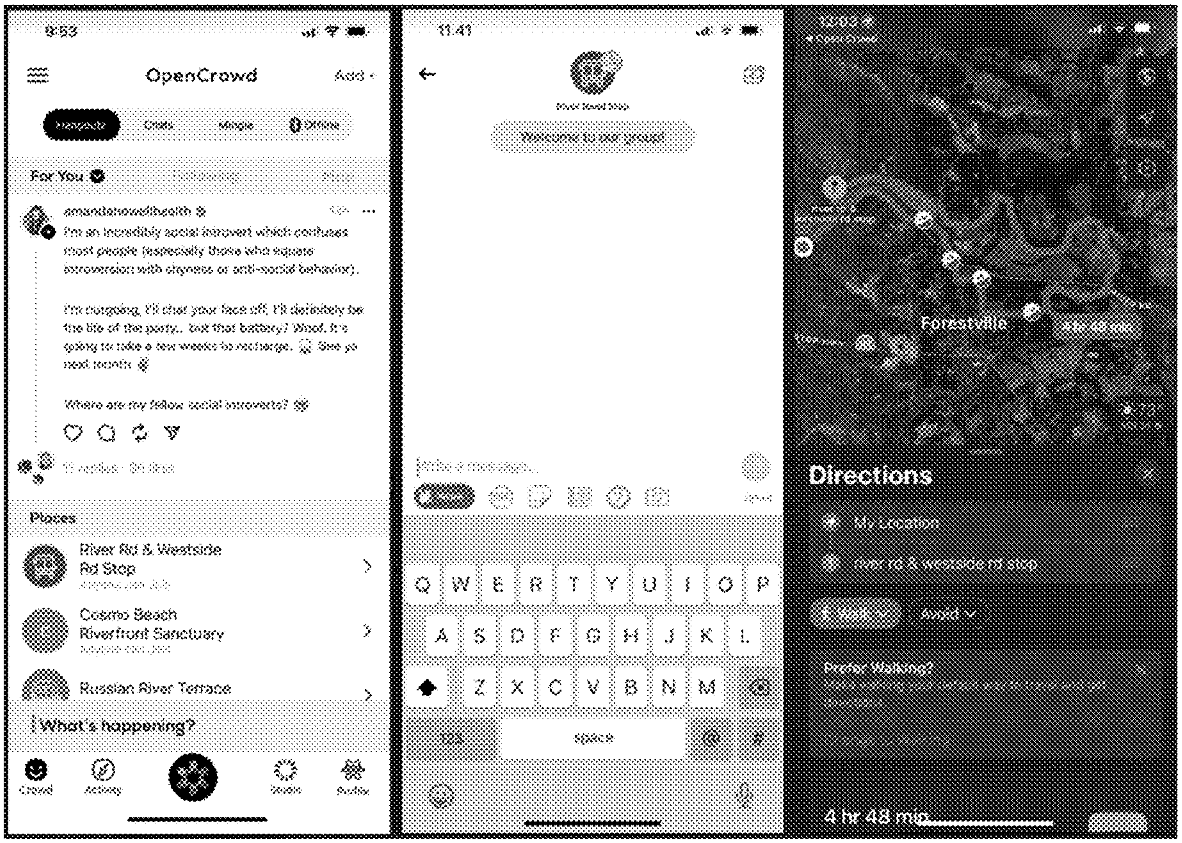
FIG. 49 shows screenshots of generating a group based on location information according to some embodiments.

FIG. 49 shows screenshots of generating a group based on location information according to some embodiments.

Figure 50:
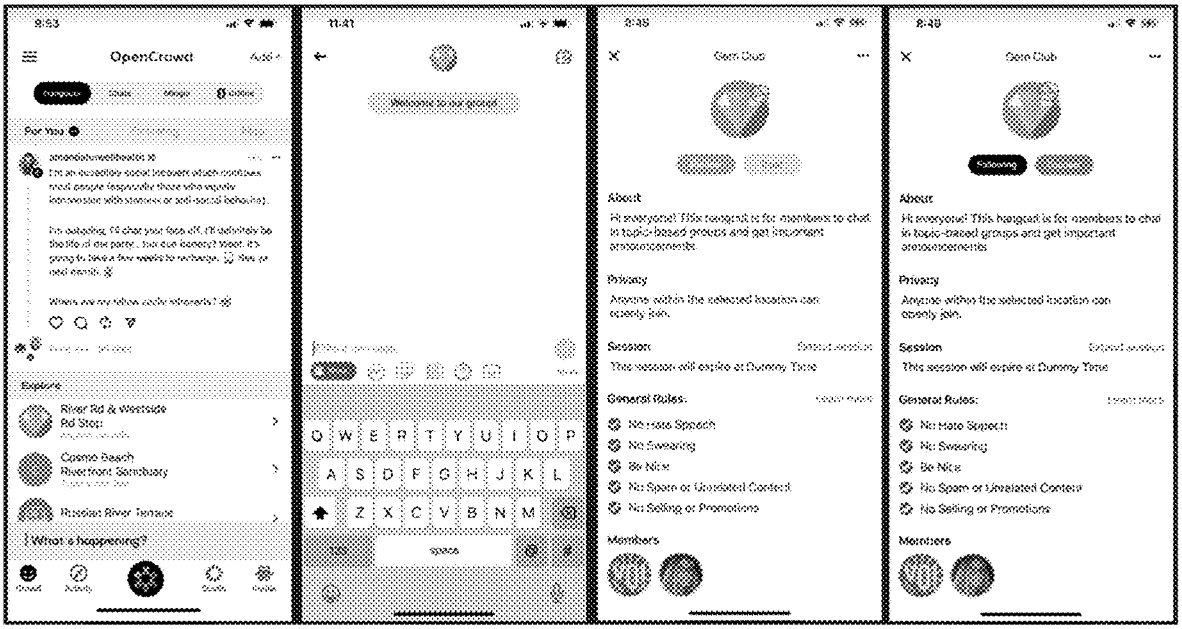
FIG. 50 shows screenshots of exploring, joining and hosting feeds on an online platform according to some embodiments.

FIG. 50 shows screenshots of exploring, joining and hosting feeds on an online platform according to some embodiments.

Figure 51:
FIG. 51 shows screenshots of waves/spins according to some embodiments.

FIG. 51 shows screenshots of waves/spins according to some embodiments. The waves are user motion-controlled that the user spins left and right in circles. The purpose of a wave is to signal that a network is being generated, and the person implementing the wave is part of the network. Waves are able to be graphics of a user’s brand, express a user’s point of view, support a user’s sports team, just for fun or any other purpose.

Figure 52:
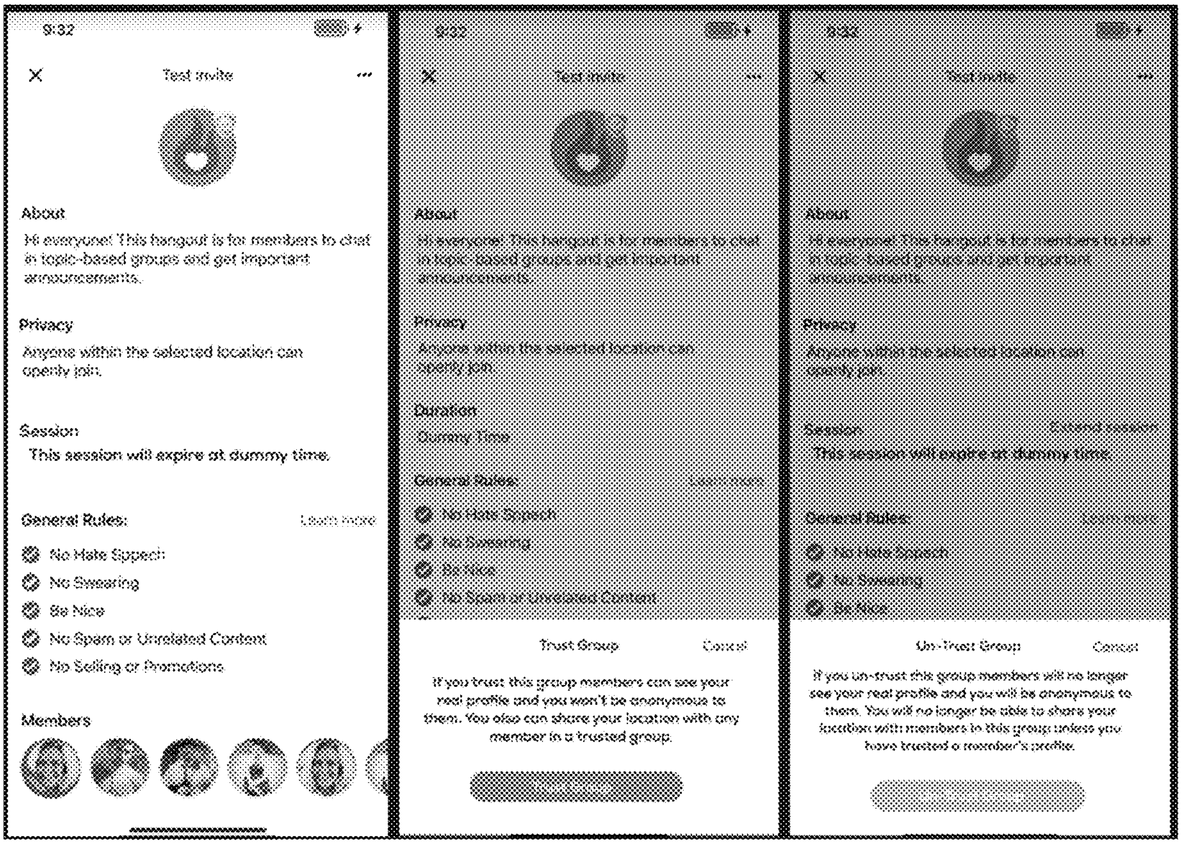
FIG. 52 shows screenshots of a hangout on a network platform for members to communicate according to some embodiments.

FIG. 52 shows screenshots of a hangout on a network platform for members to communicate according to some embodiments. The hangout is for people within a selected location. There are able to be “trust groups” and “un-trust groups,” where members in the trust group are able to see personal information (e.g., a user’s real name), and members in the un-trust group do not see the personal information.

Figure 53:
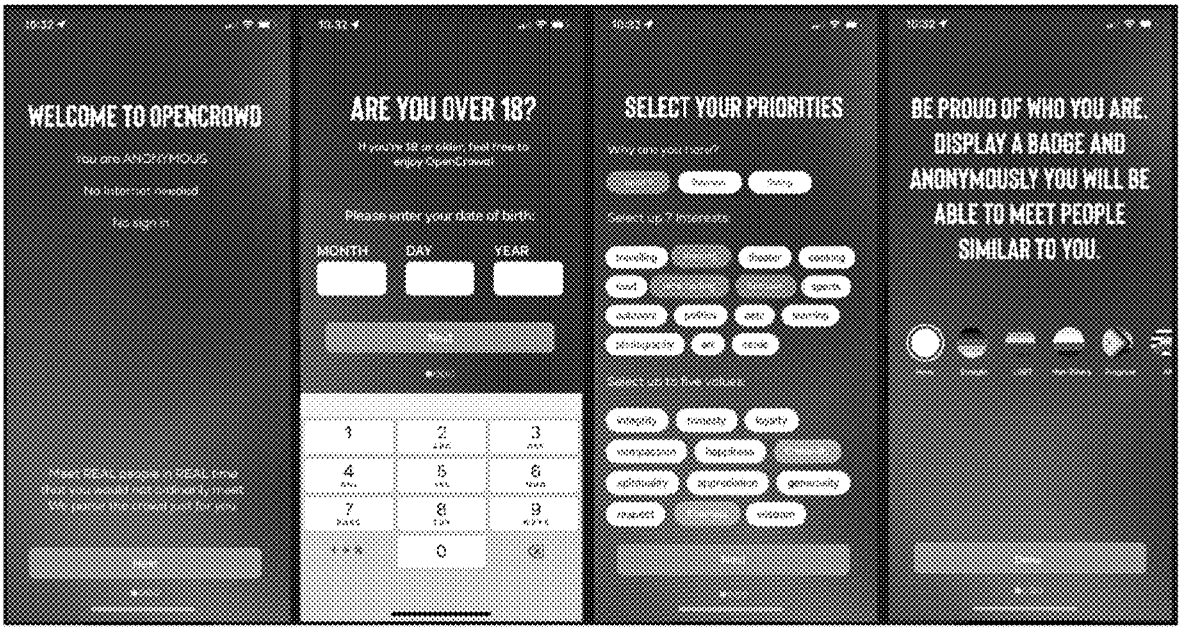
FIG. 53 shows screenshots of signing up for a network platform according to some embodiments. When signing up, a user is able to select priorities and other traits that help identify the user.

FIG. 53 shows screenshots of signing up for a network platform according to some embodiments. When signing up, a user is able to select priorities and other traits that help identify the user.

Figure 54:
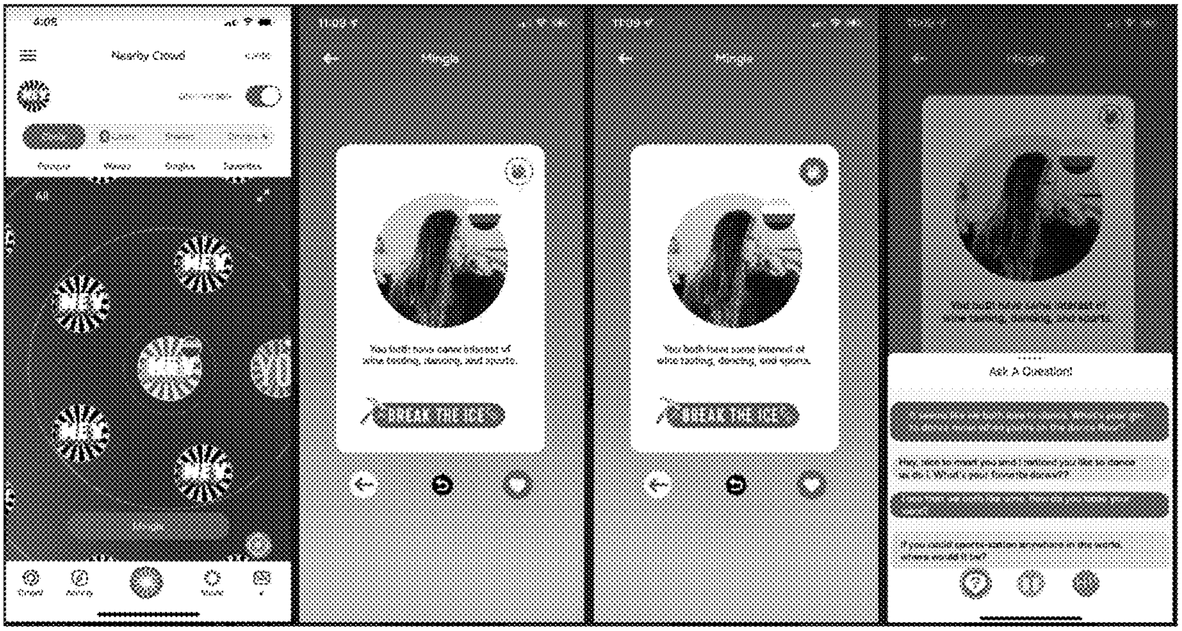
FIG. 54 shows screenshots of the network platform showing other users on the network nearby according to some embodiments.

FIG. 54 shows screenshots of the network platform showing other users on the network nearby according to some embodiments. Using AI, matches of users are able to be found, and users with common interests (e.g., wine tasting, dancing, and sports) are prompted to introduce themselves and interact.

Figure 55:
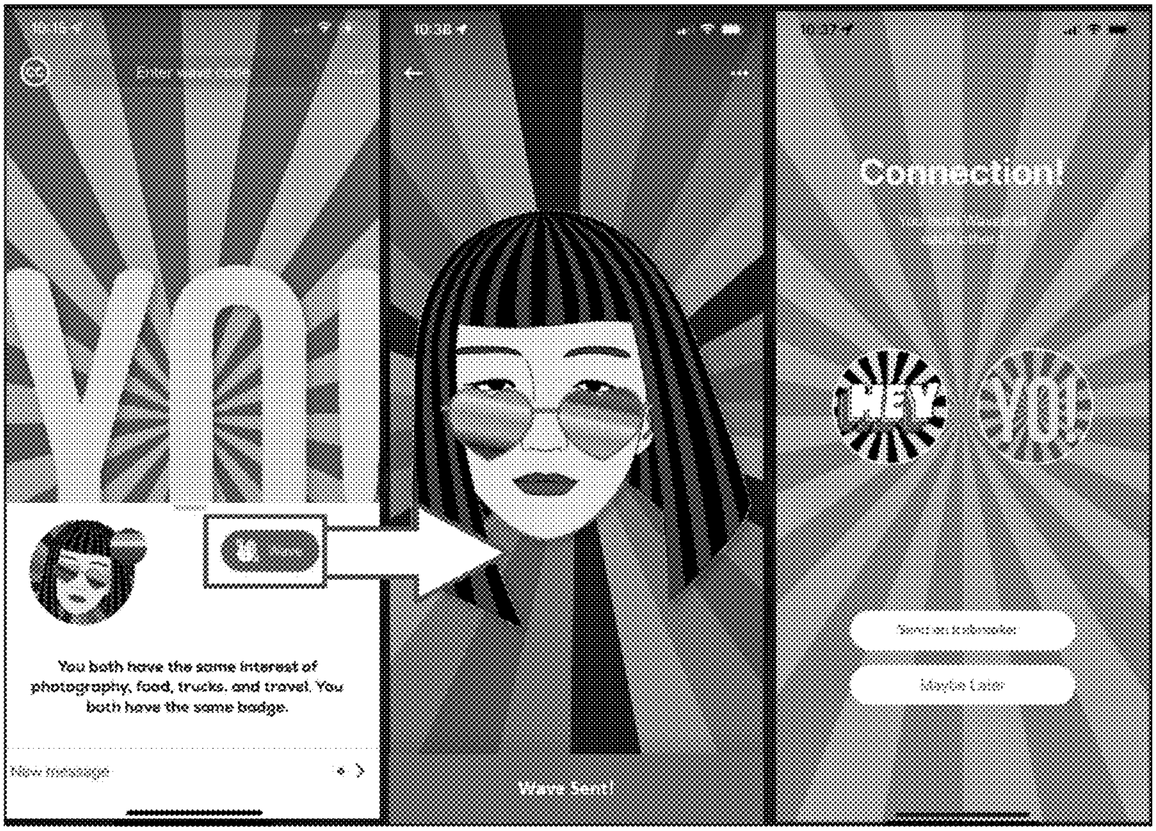
FIG. 55 shows screenshots of users with common interests sending waves/spins to each other according to some embodiments.

FIG. 55 shows screenshots of users with common interests sending waves to each other according to some embodiments. For example, two users have the same interests (e.g., photography, food, trucks and travel) and have the same badge. When each user sends a wave to the other user, then a connection is formed. Additional communications are able to be sent after forming a connection.

Figure 56:
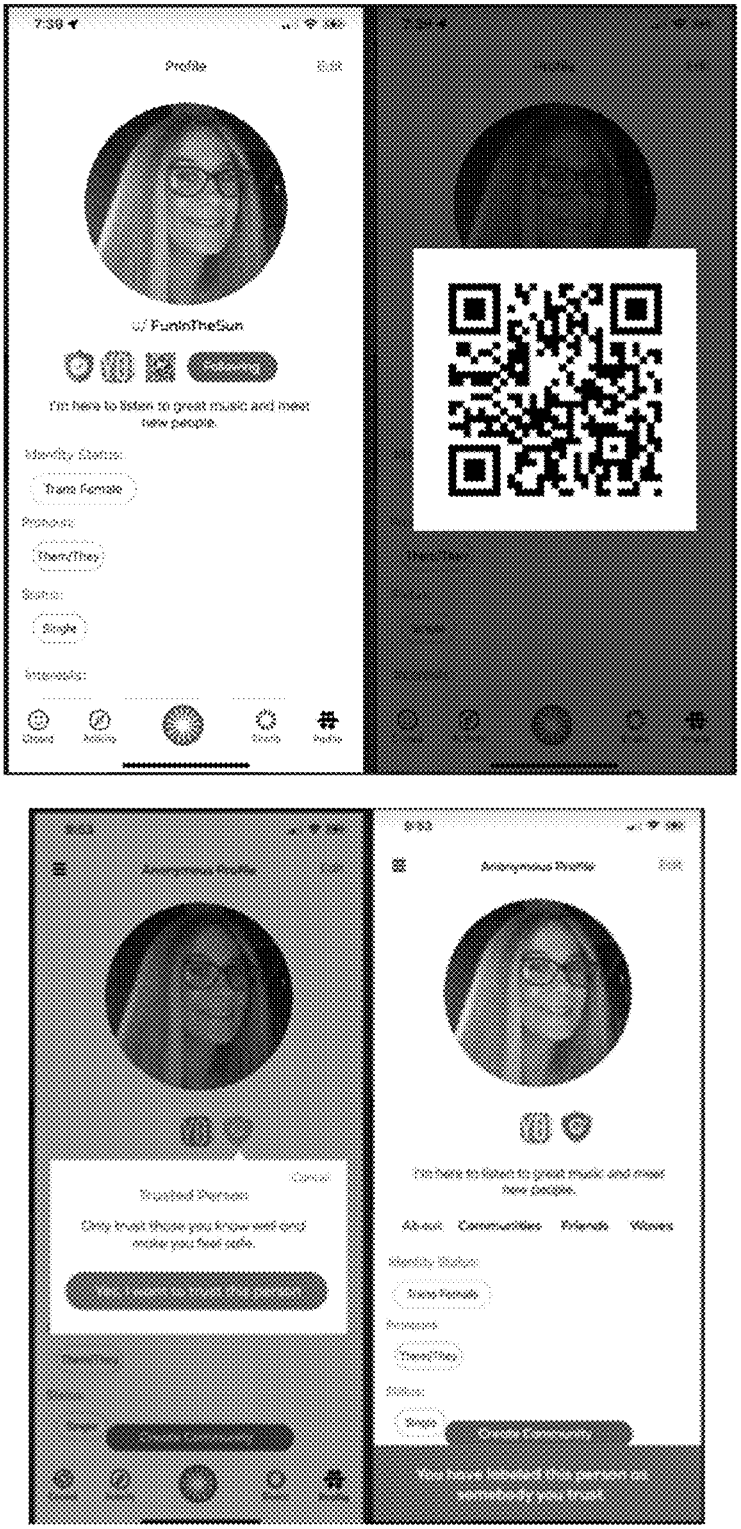
FIG. 56 shows screenshots including a QR code implementation according to some embodiments.

FIG. 56 shows screenshots including a QR code implementation according to some embodiments. The QR code are able to be used in any manner such as to provide information to another user.

Figure 57:
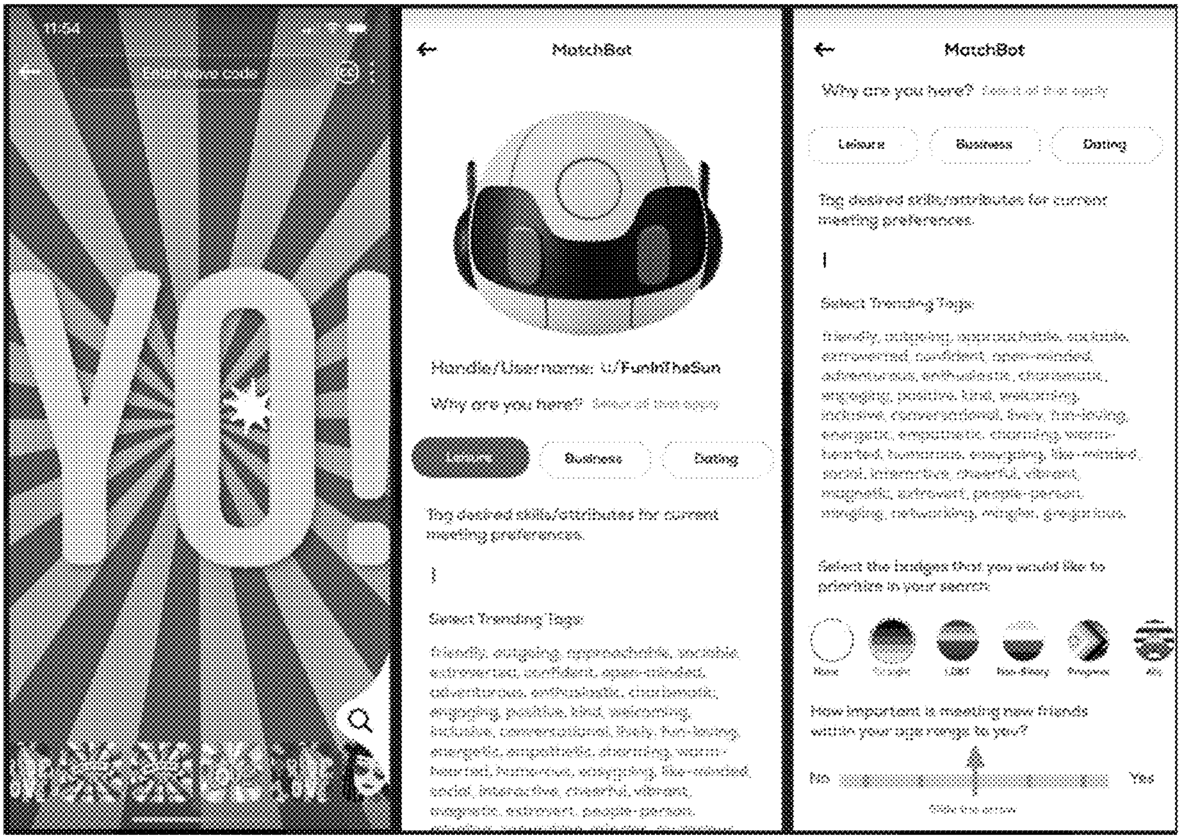
FIG. 57 shows screenshots of implementing a matching bot according to some embodiments.

FIG. 57 shows screenshots of implementing a matching bot according to some embodiments. A user may use the app for business, leisure, dating or another purpose. Depending on the user’s mindset, the AI will provide the most appropriate matches. The matches are able to be based on common interests, location, and other aspects in addition to or instead of the user’s mindset. In some embodiments, the matching bot app or system charges a user for introductions in the context of a virtual handshake. The matching bot is able to more proactively encourage a meet such as by automatically forwarding a person’s information or setting up a meeting if the match is above a threshold. For example, if User A and User B have profiles that result in a match of 95% and the threshold is 90% for automatically generating a date, then the system automatically generates a reservation for dinner based on the matching information of the users and other known information such as work schedules.

Figure 58:
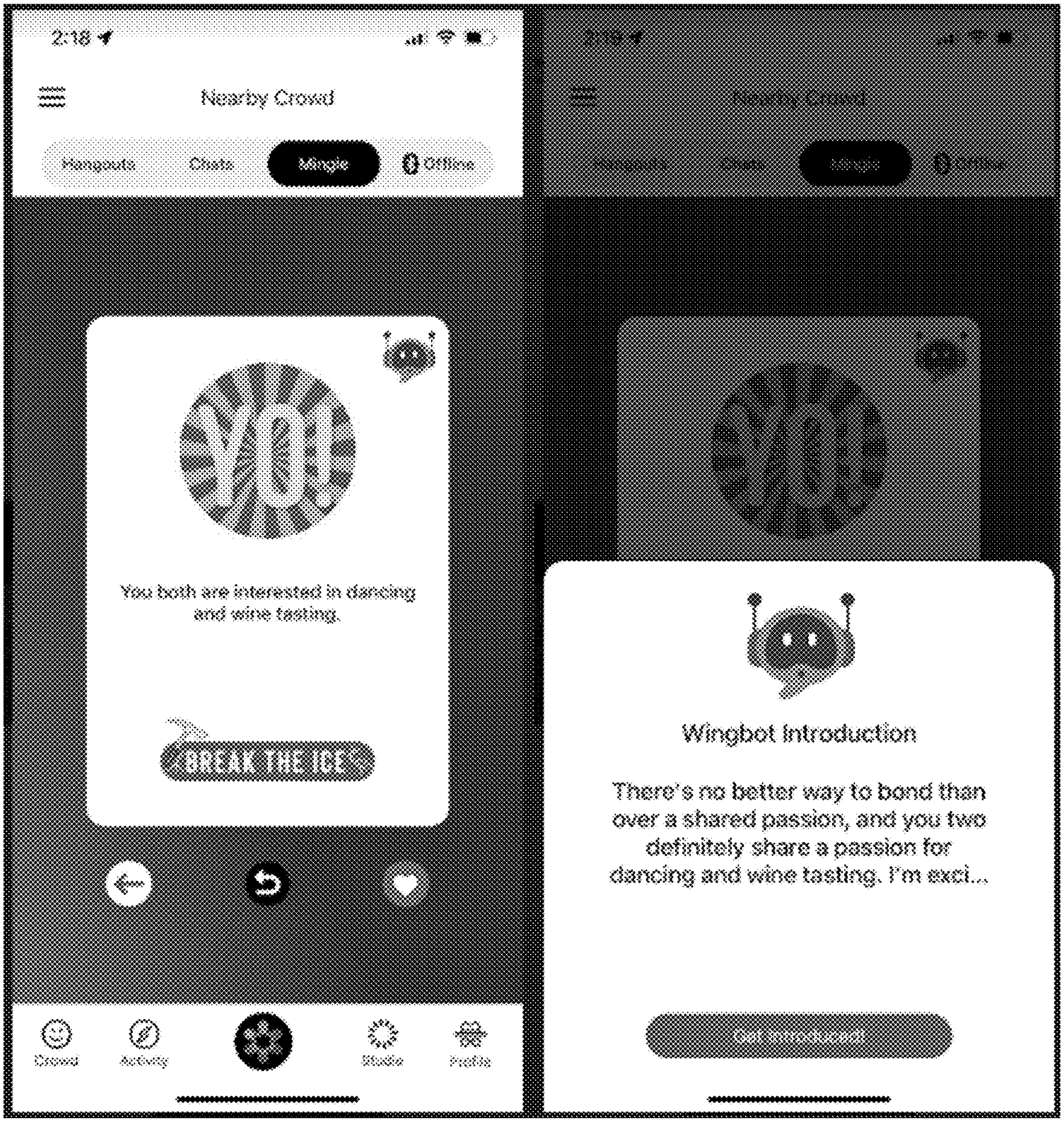
FIG. 58 shows screenshots of an introduction tool according to some embodiments.

FIG. 58 shows screenshots of an introduction tool according to some embodiments.

Figure 59:
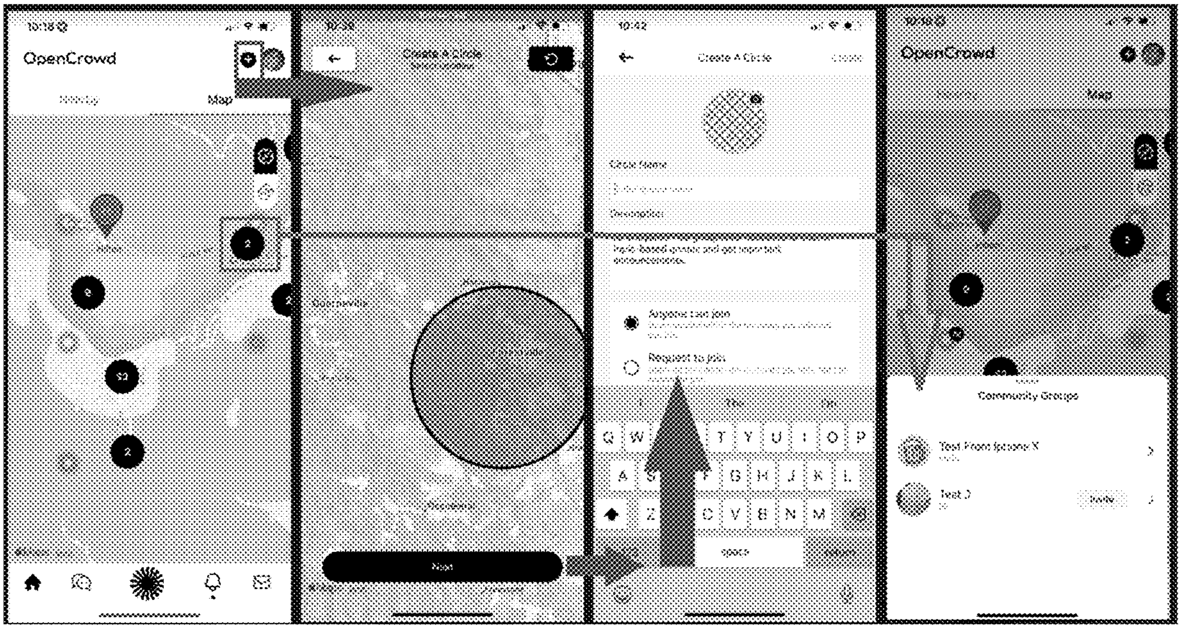
FIG. 59 shows screenshots of maps and community groups according to some embodiments.

FIG. 59 shows screenshots of maps and community groups according to some embodiments. A user is able to generate a community group by using a map by defining a location by drawing a boundary for the community group.

Geo hashing is able to be used to keep users anonymous. For example, geo hashing is incorporated with the virtual handshake.

Figure 60:
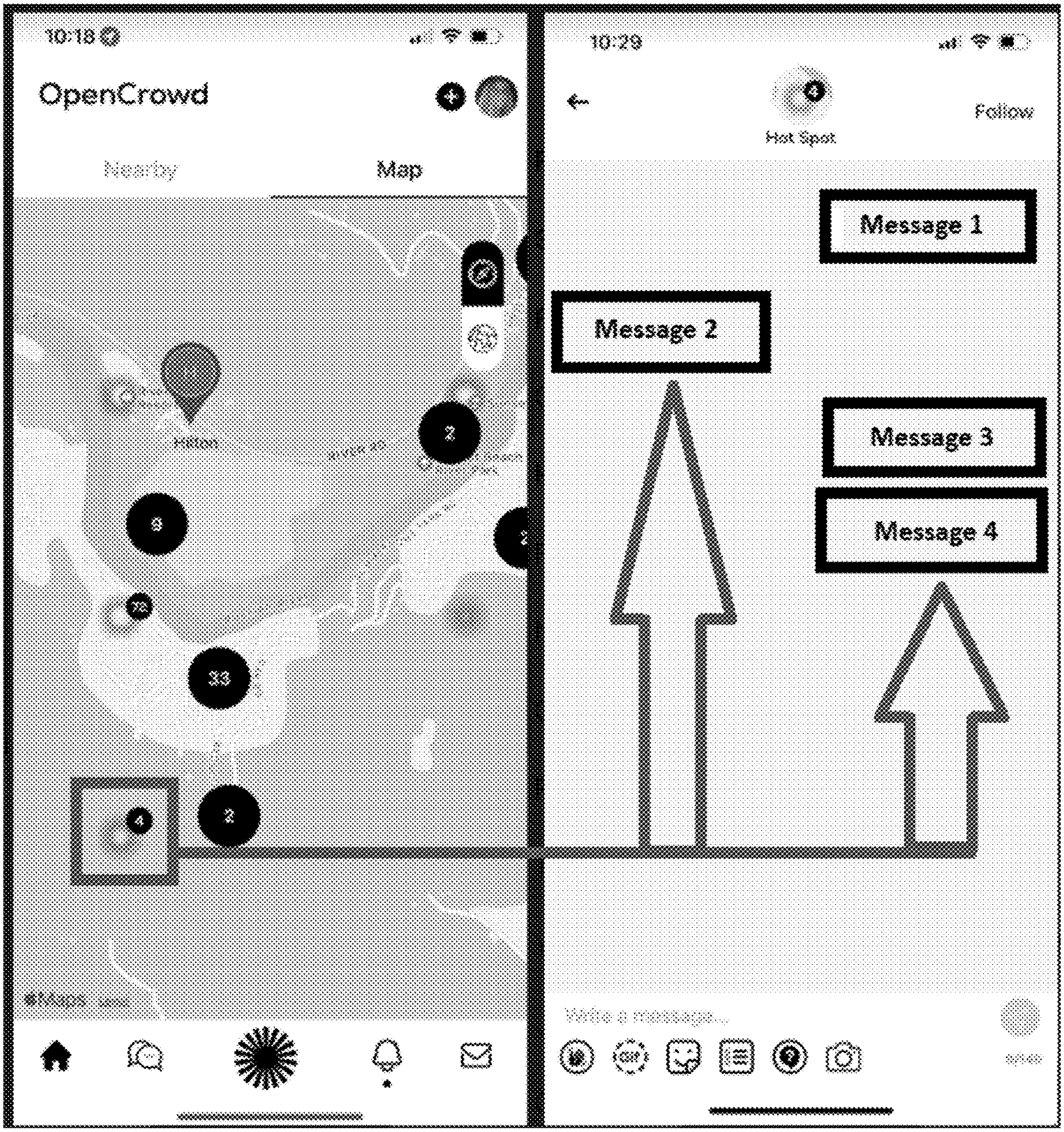
FIG. 60 shows screenshots of messages using the network platform according to some embodiments.

FIG. 60 shows screenshots of messages using the network platform according to some embodiments.

Figure 61:
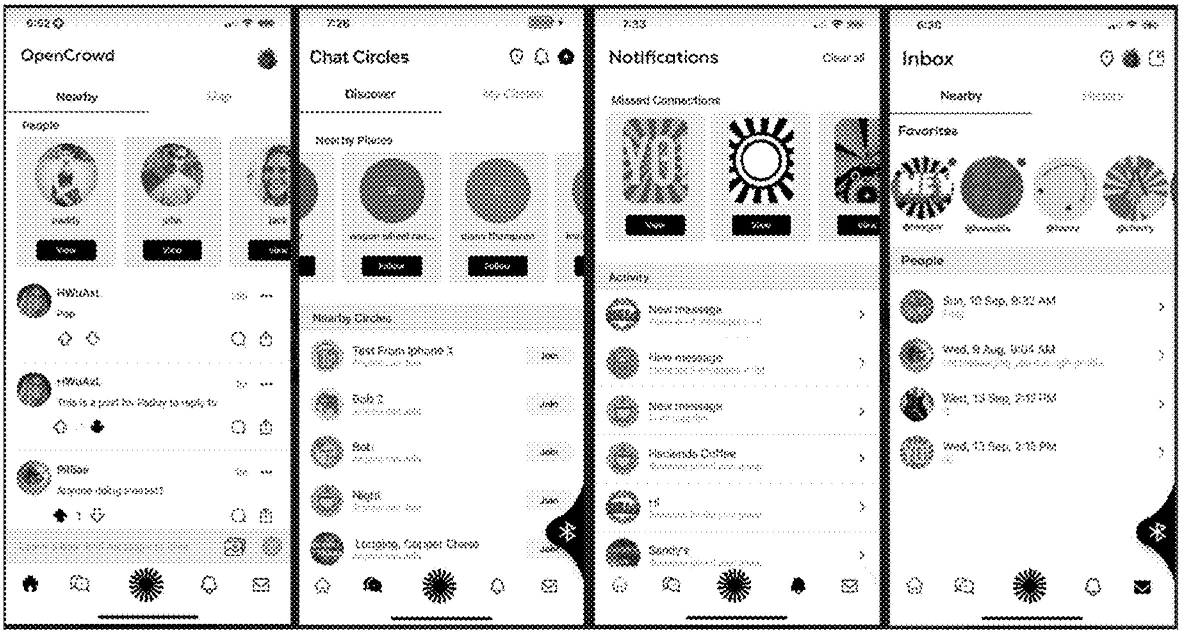
FIG. 61 shows screenshots of an online platform according to some embodiments.
Figure 62:
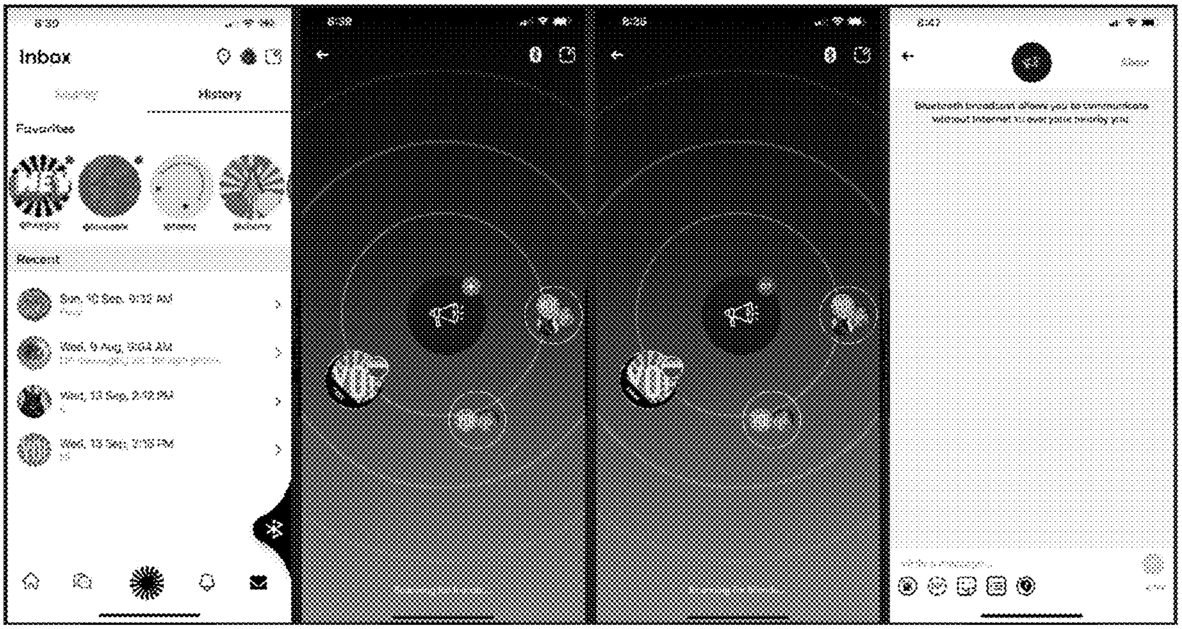
FIG. 62 shows screenshots of an online platform according to some embodiments.

FIGS. 61 and 62 show screenshots of an online platform according to some embodiments. The screenshots include showing users nearby, chat circles nearby, notifications, history, a scan for friends, and other information.

Anonymity is able to be implemented at the user-level. There are times when a user wants to be known such as when seeking to make a strong impression with a potential employer, at a networking event to build meaningful professional connections and showcase expertise, at a business conference to establish credibility and engage in industry discussions, when reconnecting with former classmates and friends at a class reunion, to receive recognition and celebrate achievements at an industry awards ceremony, while pitching a startup when presenting a business idea to potential investors, during collaborative workshop to share insights and ideas during a creative brainstorming session, at a fundraising event when advocating for a charitable cause and sharing personal stories, at a sales presentation to demonstrate product knowledge and build trust with customers, at an art exhibition when showcasing one's creative work and interacting with art enthusiasts, with a dating app meetup to foster genuine connections in the world of online dating, during a college application review when discussing academic achievements and aspirations with admissions officers, at a public speaking event to engage with an audience during a speech or presentation, during a team building workshop to foster camaraderie and cooperation within a group, during volunteer activities when working on community projects and making a positive impact, during a parent-teacher meeting to discuss a child's progress and educational development, for scientific research collaboration when sharing findings and working with fellow researchers, during a family reunion when reconnecting with relatives and sharing family stories, during a sporting event to cheer for a favorite team and celebrate victories with fellow fans, and at a book club meeting to express opinions and insights about a shared literary interest.

There are several modes or features that combine elements of incognito and anonymous modes, each with its own specific focus and purpose:

Privacy mode provides users with a range of privacy options, allowing them to choose the level of anonymity and tracking prevention they desire. Users might customize settings to balance privacy and convenience.

In selective anonymity mode, users can selectively choose which parts of their online activity remain anonymous and which do not. For example, they might remain anonymous in some conversations while using their real identity in others.

Stealth mode emphasizes the concealment of a user's online presence, making it difficult for others to track their activity or identity. It combines elements of both incognito and anonymous modes for enhanced privacy.

Safe browsing mode is focused on security, and this mode offers protection against malware, phishing, and tracking while still allowing for limited data collection to improve the browsing experience.

Customized privacy mode lets users define specific rules and parameters for privacy. Users can choose the level of anonymity and tracking they desire for each website or service.

In activity-based anonymity mode, users can switch between different levels of anonymity based on their physical activities. For example, they might be fully anonymous during social interactions but use their real identity for online shopping.

Multi-identity mode allows users to maintain multiple distinct online identities simultaneously, each with its own level of anonymity or personal information disclosure.

In contextual privacy mode, users can set their privacy preferences based on the context or website they are interacting with. For example, they might choose to be more anonymous on a social network but less so on a professional networking platform.

In some embodiments, the density of the crowd is taken into consideration in determining or suggesting a privacy mode.

In some embodiments, a social network allows users to select anonymous, real and business identities based on their contextual privacy mode. Users can set their privacy preferences based on the context or website they are interacting with. For example, the user might choose to be more anonymous on a social network but less so on a professional networking platform.

In some embodiments, users are shown a security risk level based on anonymous and real profiles, and how many people are around them. For example, the fewer people around, the higher the risk that people will find out who the person is.

On anonymous networks, a person's real identity can be exposed from an anonymous profile when the user is an area where there are very few people. The network described herein shows a person the general risk of exposure when a user's identity is set to anonymous.

An algorithm assigns a risk level based on the density of people within a defined area, and the visibility setting of either an anonymous or real profile. It allows the user to set their visible identity profile of an anonymous avatar or a real photo avatar.

Contemporary social networking platforms often overlook the dynamic and context-dependent nature of user identity and visibility. Users may wish to adopt real profiles in high-density business situations while favoring anonymity in more private or low-density settings. Existing systems rarely consider the intricate relationship between identity settings, crowd density, and security risks.

The system takes into account crowd density and business mode to assess and manage security risks associated with user identity profiles on social networking platforms. Real-time recommendations and dynamic security risk levels are provided based on the user's context and preferences regarding the use of real and anonymous profiles.

The system assists users in making informed decisions about their identity settings, especially when they are in a business mode at events or gatherings. Key features of this system include: dynamic security risk assessment. Users are provided with real-time assessments of security risks associated with their chosen identity settings, taking into account crowd density and the specific context, such as business conferences or meetings.

The system utilizes location-based data and contextual crowd density measurements to determine the most appropriate level of anonymity or visibility for the user in their current business mode.

Based on the security risk assessment and the specific context, the system offers dynamic recommendations for users to adjust their profile settings. For example, it may suggest using a real profile when the user is in a business conference to facilitate meaningful professional connections.

Users have the flexibility to set their visible identity profile to either an anonymous avatar or a real photo avatar. They can also define specific rules and parameters for privacy settings based on the context, such as business events.

The system allows users to customize their privacy settings not only based on their identity but also on the specific website, platform, or context they are engaged in. Users can choose to be more anonymous on certain platforms while using their real identity in business networking scenarios.

The system is able to manage user identity profiles on social networking platforms to provide real-time security risk assessments based on the density of people in the user's vicinity and their business mode. The system features a contextual crowd density measurement to determine the appropriateness of anonymity or visibility settings in the specific business context. The system recommends for users to adjust their identity settings based on security risk assessments and the user's business mode. The system offers users the ability to set their visible identity profile to either an anonymous avatar or a real photo avatar, with customization options for privacy settings based on the business context. The system enables contextual privacy management, allowing users to customize their privacy settings based on the specific website, platform, or context they are engaged in, especially in business-related interactions.

The social networking contextual identity and visibility system provides a pioneering solution to enhance user security and privacy on social networking platforms, taking into consideration crowd density and business mode. By offering dynamic security risk assessments, contextual recommendations, and the ability to manage online identity effectively in diverse social and business contexts, this system empowers users to make informed choices and build meaningful connections, especially in the business world.

Figure 63:
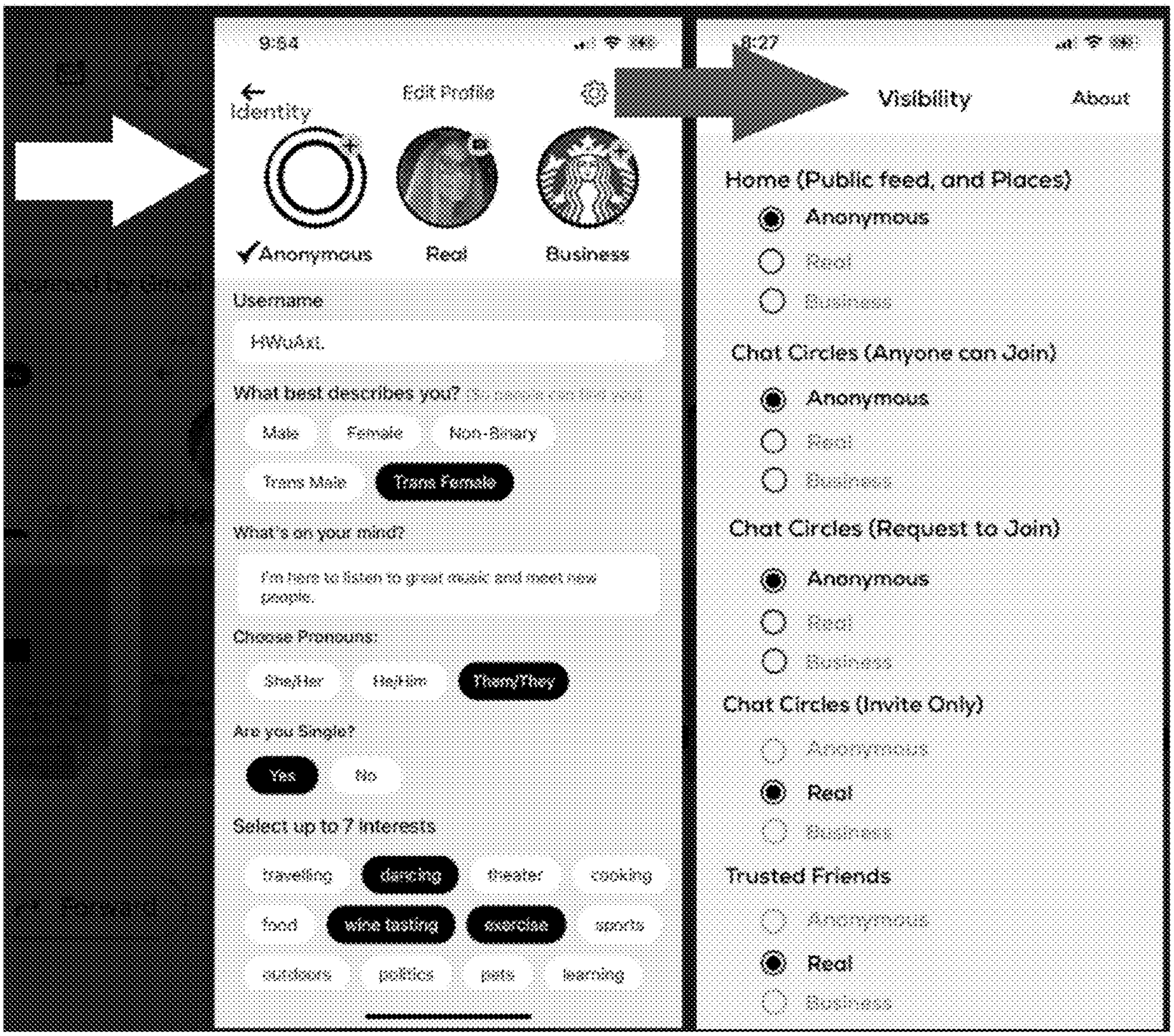
FIG. 63 shows a screenshot of a visibility implementation according to some embodiments.

FIG. 63 shows a screenshot of a visibility implementation according to some embodiments. A user is able to select how visible the user is online which determines how much personal information of the user is shown to others. For example, a user is able to select "anonymous," "real" or "business" options in terms of visibility.

Figure 64:
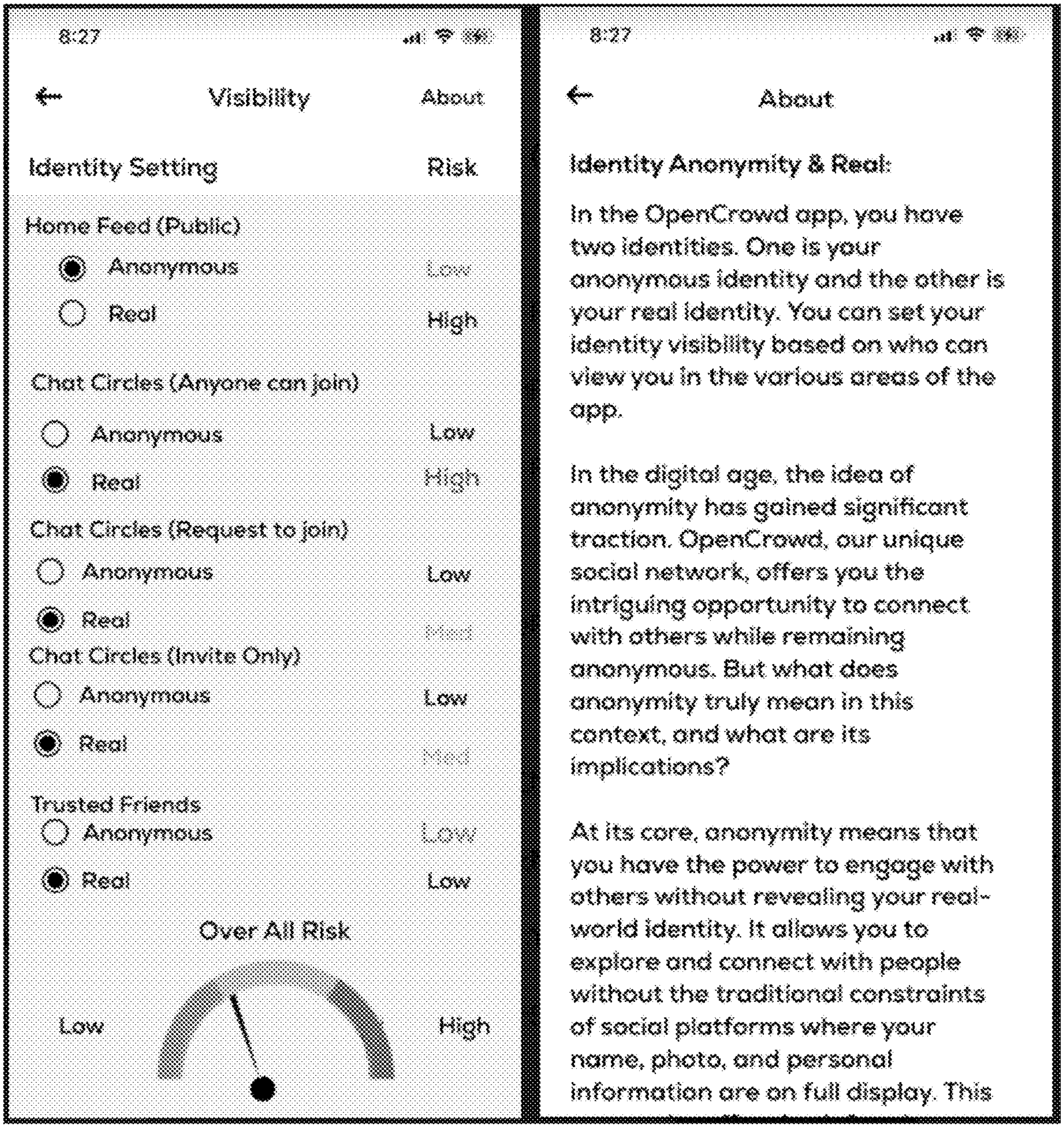
FIG. 64 shows a screenshot of a visibility implementation according to some embodiments.

FIG. 64 shows a screenshot of a visibility implementation according to some embodiments. In addition to providing the visibility options, the risk of each option is able to be displayed. An overall risk is able to be displayed as well.

Figure 65:
FIG. 65 shows screenshots of a monetization implementation according to some embodiments.

FIG. 65 shows screenshots of a monetization implementation according to some embodiments. Advertisements or other monetization implementations are able to be incorporated on the spin app. For example, an advertisement is able to be displayed in a menu or other parts of the app.

Figure 66:
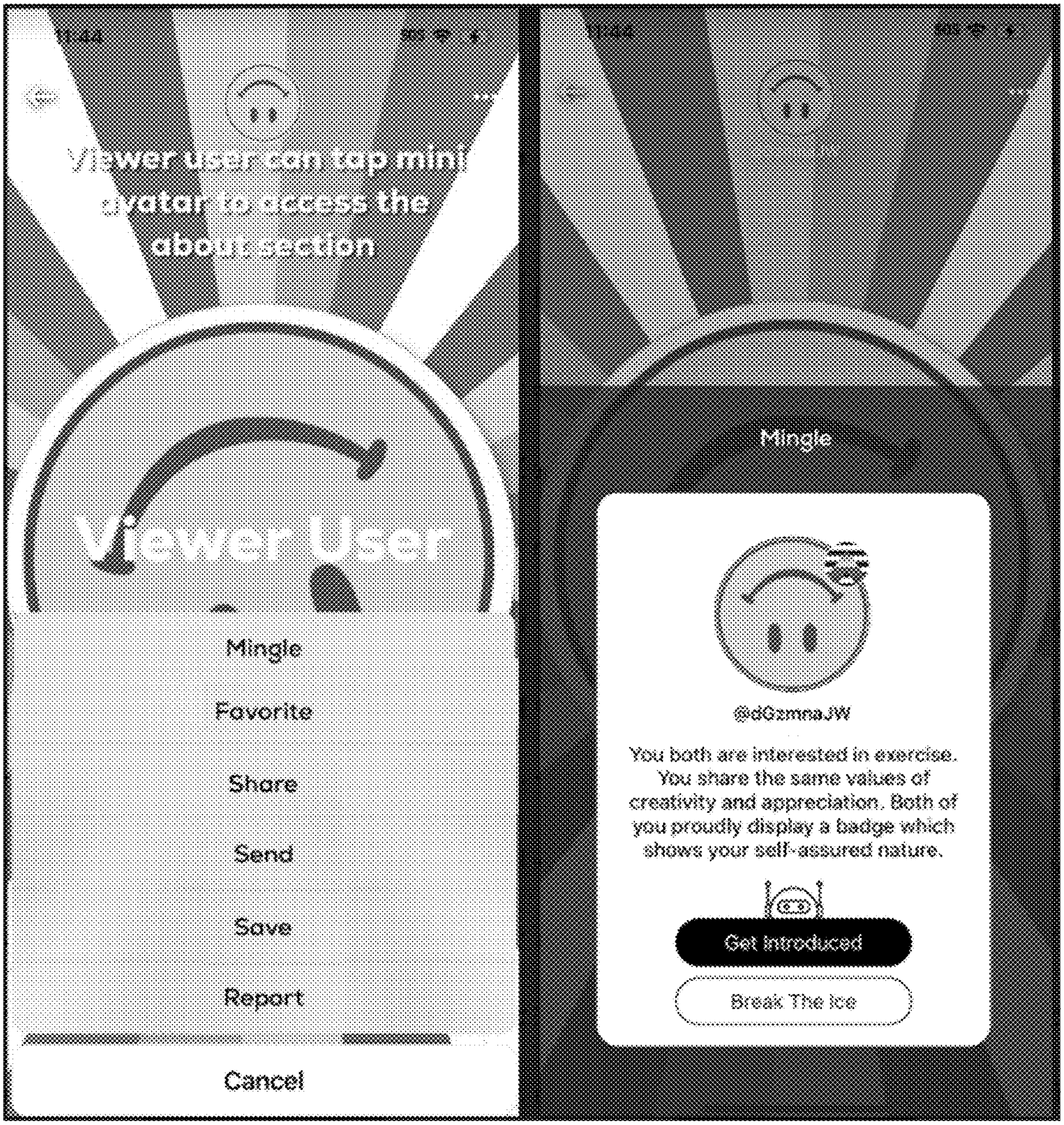
FIG. 66 shows screenshots of a menu and a mingle implementation according to some embodiments.

FIG. 66 shows screenshots of a menu and a mingle implementation according to some embodiments. The menu of the spin app is able to include various options such as mingle, favorite, share, send, save, report and cancel. By clicking "Mingle," a pop up displays a user to potentially contact. The displayed user is able to be based on similar interests (e.g., both users are interested in exercise, creativity and appreciation). The "Mingle" pop up is able to have various options such as "Get Introduced" or "Break The Ice."

Figure 67:
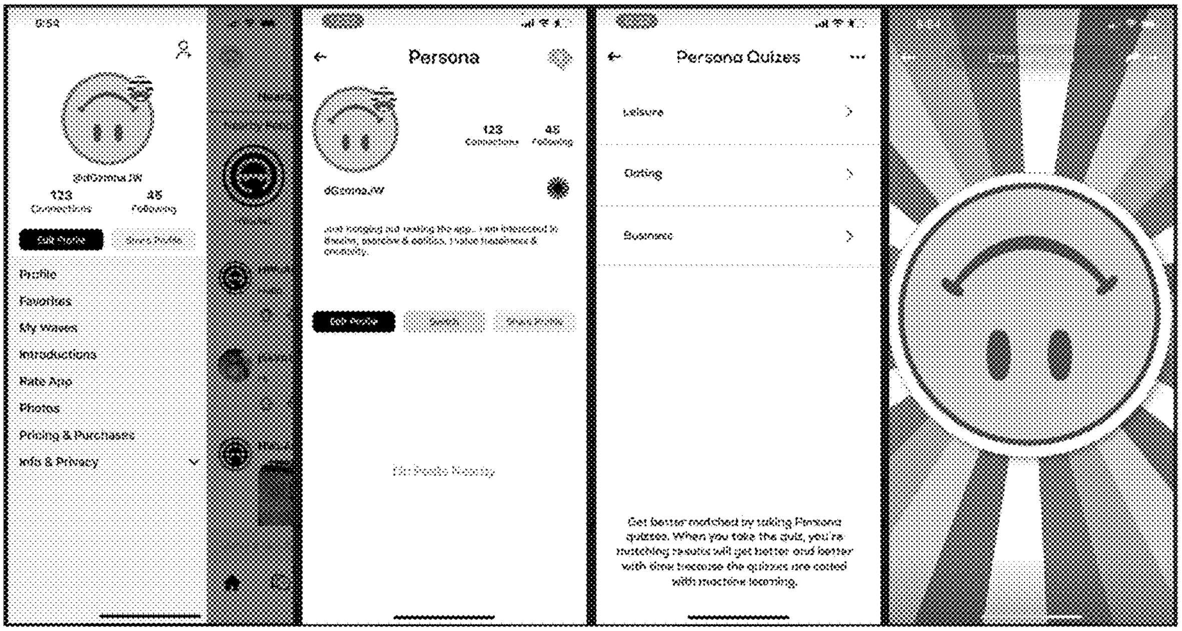
FIG. 67 shows screenshots of persona quizzes according to some embodiments.

FIG. 67 shows screenshots of persona quizzes according to some embodiments. A persona quiz enables a user to provide input which will be used to match the user with other users. The persona quizzes are able to be separated into categories such as leisure, dating and business. AI is able to utilize the quiz responses and additional information acquired using the app to perform learning and user matching.

Figure 68:
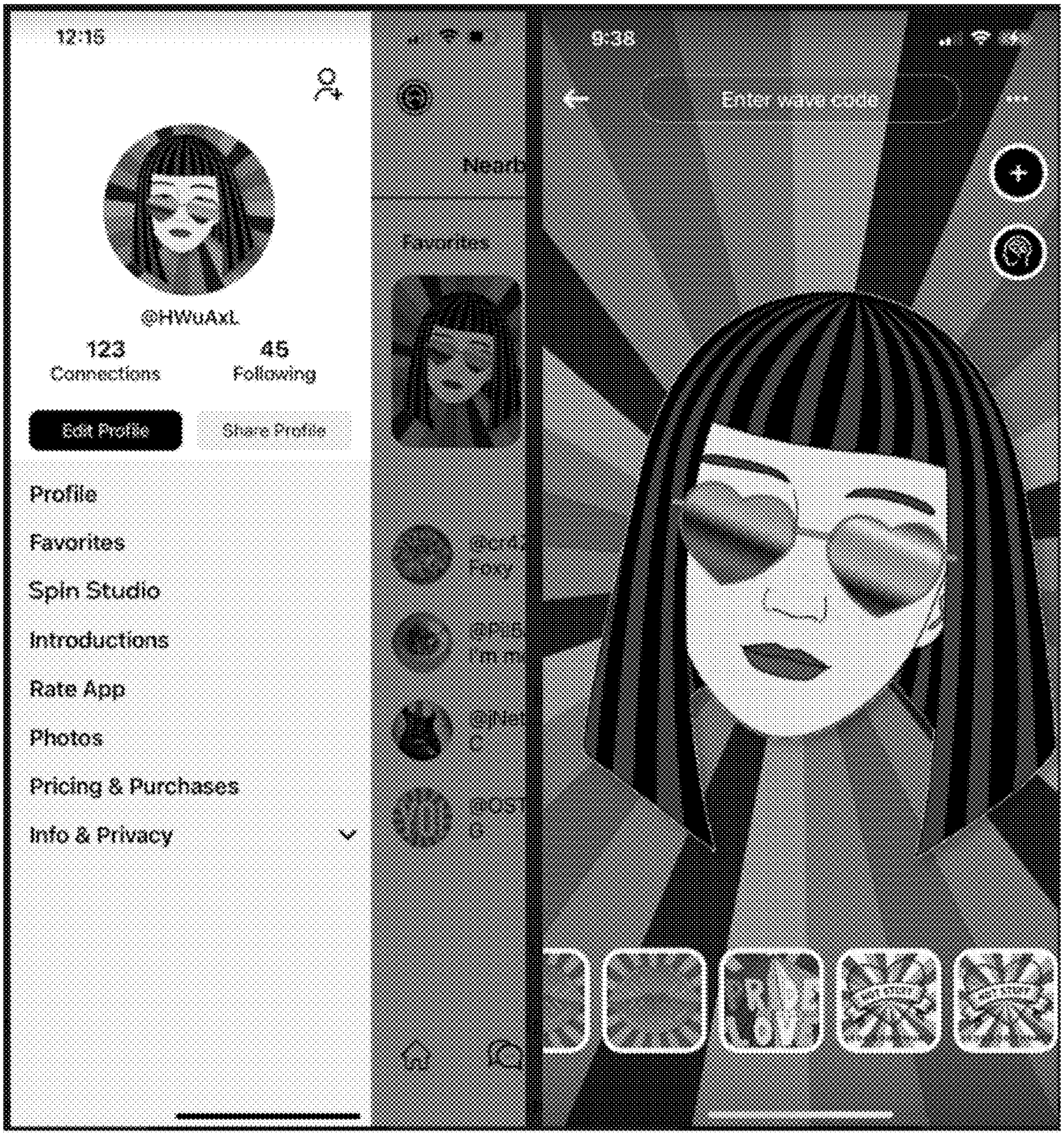
FIG. 68 shows screenshots of a menu and avatar according to some embodiments.
Figure 69:
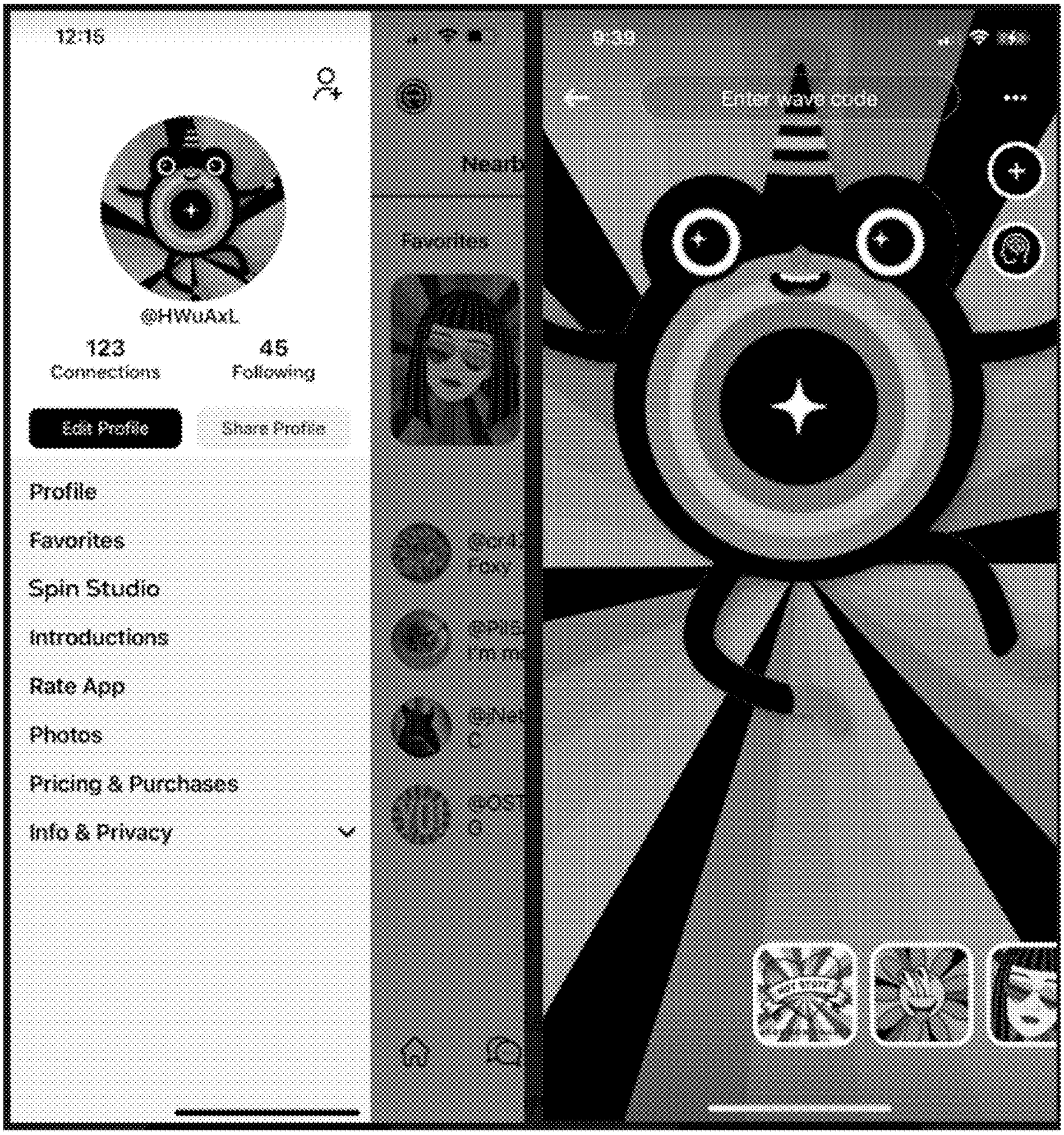
FIG. 69 shows screenshots of a menu and avatar according to some embodiments.

FIGS. 68 and 69 show screenshots of menus and avatars according to some embodiments. The menu enables users to perform various actions such as edit their profile. An avatar is able to represent a user on the app.

Figure 70:
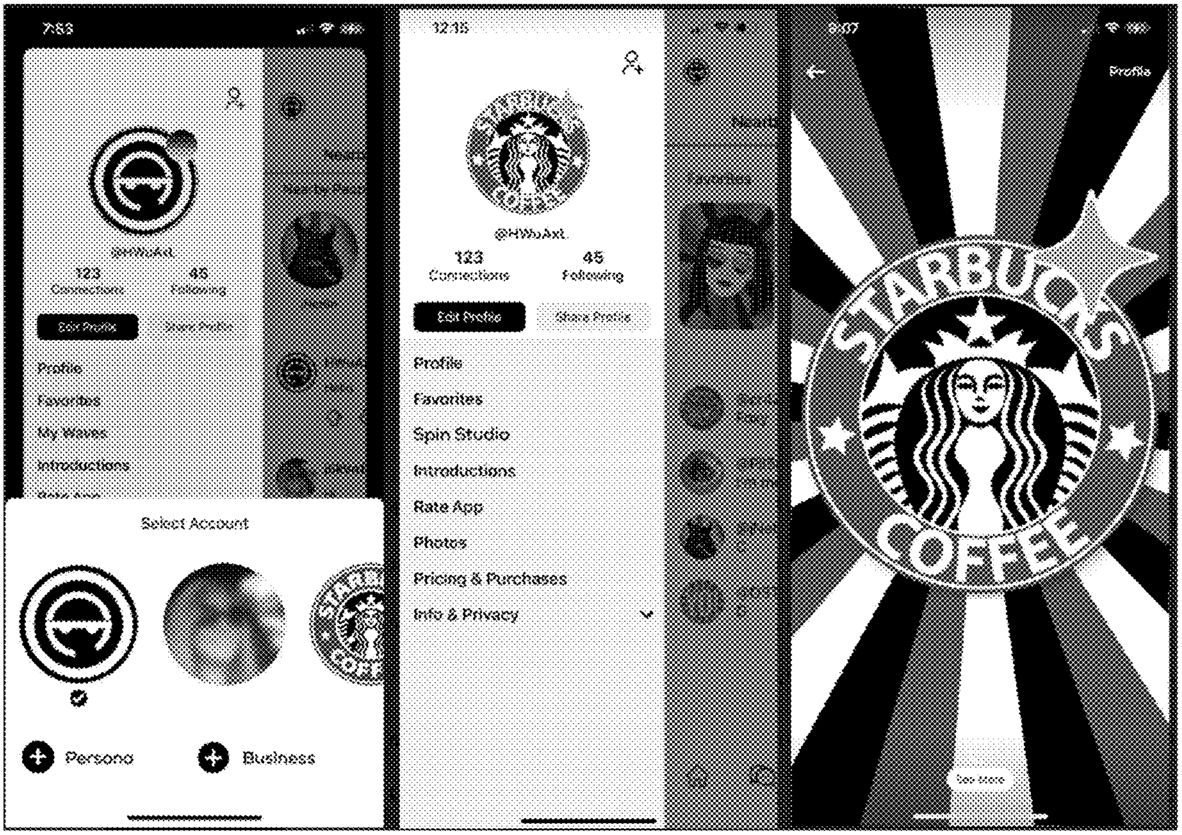
FIG. 70 shows screenshots of selecting an account according to some embodiments.

FIG. 70 shows screenshots of selecting an account according to some embodiments. Users are able to have various accounts (e.g., personal, business, dating) and select from among those accounts.

Figure 71:
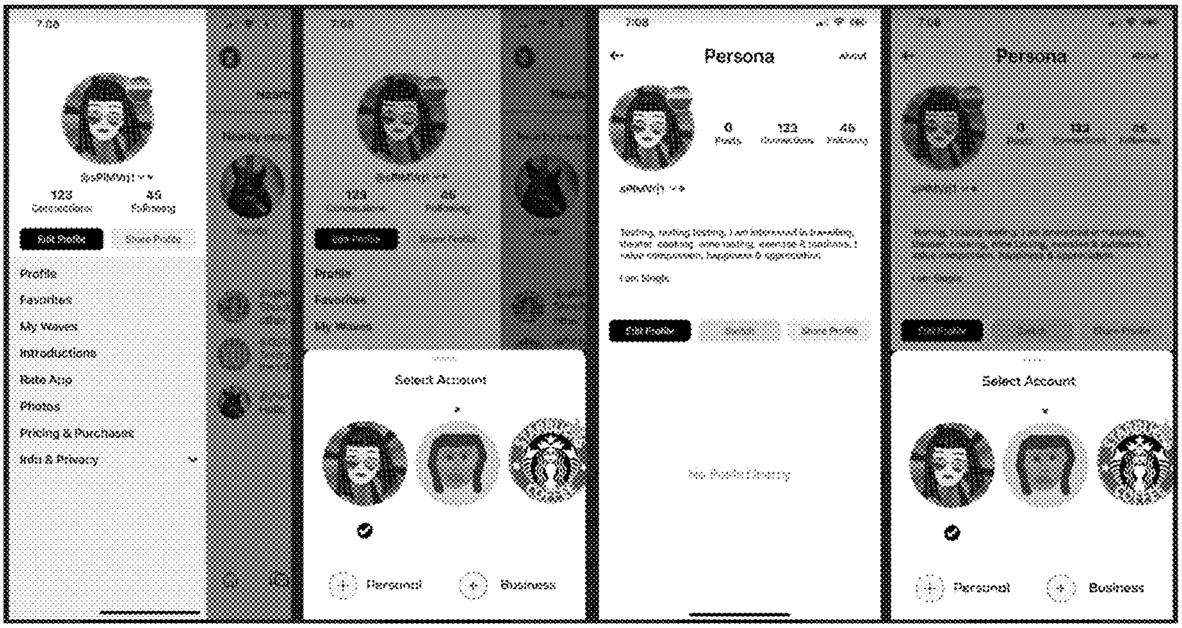
FIG. 71 shows screenshots of adding an account according to some embodiments.

FIG. 71 shows screenshots of adding an account according to some embodiments. Users are also able to add an account. For example, if the user has a personal account for when they attend events with friends, the user can also add a business account which is used for when the user attends a business conference.

Figure 72:
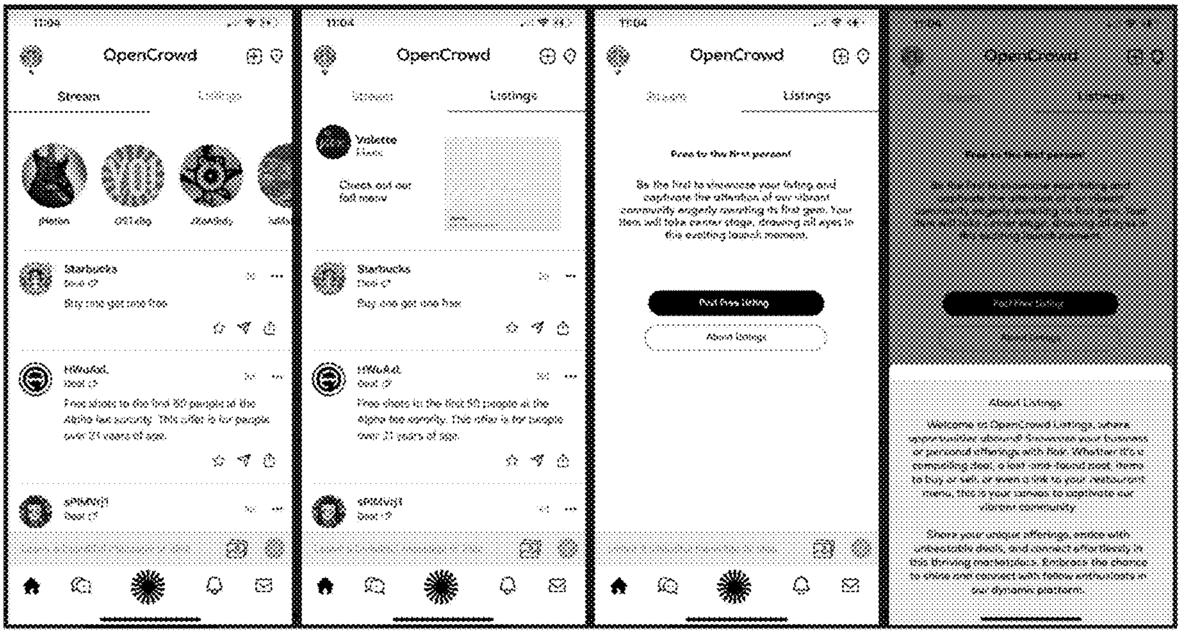
FIG. 72 shows screenshots of streams and listings on the app according to some embodiments.

FIG. 72 shows screenshots of streams and listings on the app according to some embodiments. The listings enable a user to provide business or personal offerings. The offerings are able to be shared with various users on the app.

Figure 73:
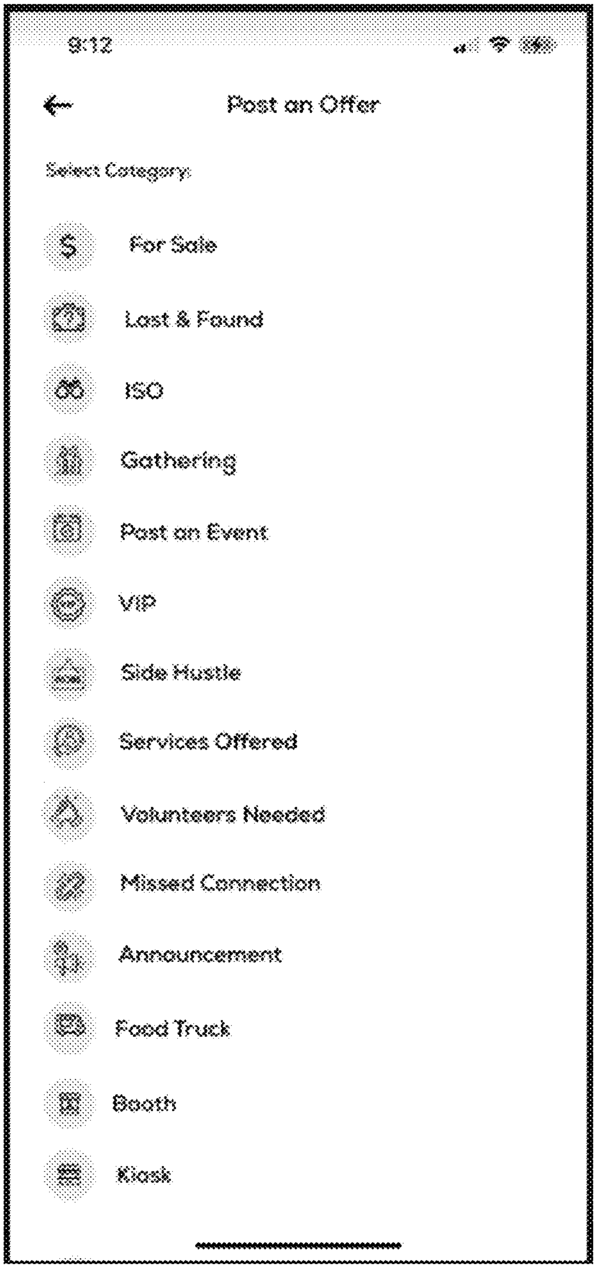
FIG. 73 shows a screenshot of posting an offer or providing a marketplace according to some embodiments.

FIG. 73 shows a screenshot of posting an offer or providing a marketplace according to some embodiments. When posting an offer, a category for the offer is able to be selected. Additional information is able to be provided for the offer through the app.

Figure 74:
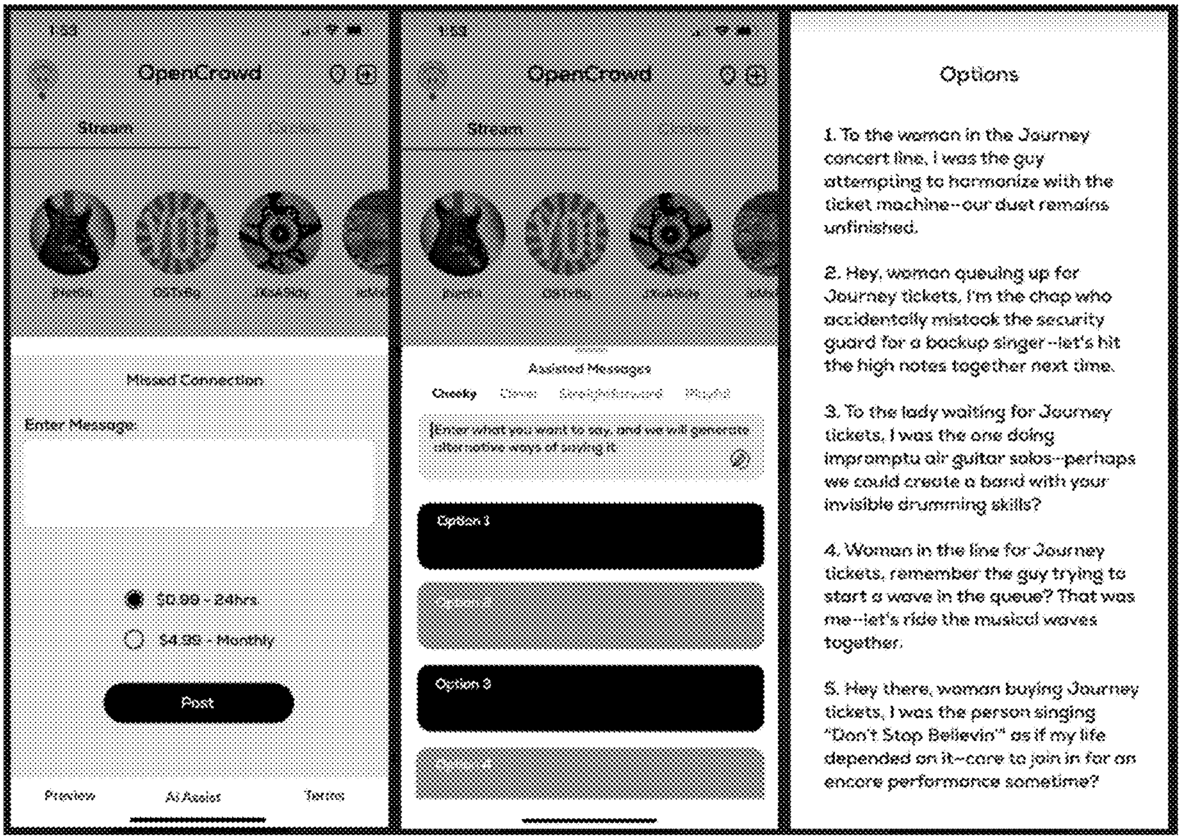
FIG. 74 shows screenshots of assisted messages offered on the app according to some embodiments.

FIG. 74 shows screenshots of assisted messages offered on the app according to some embodiments. The assisted messages are able to be generated by AI. The assisted messages are able to be classified into categories such as "cheeky," "clever," "straightforward," and "playful." In an example, five options of assisted messages are provided from which the user is able to choose.

Figure 75:
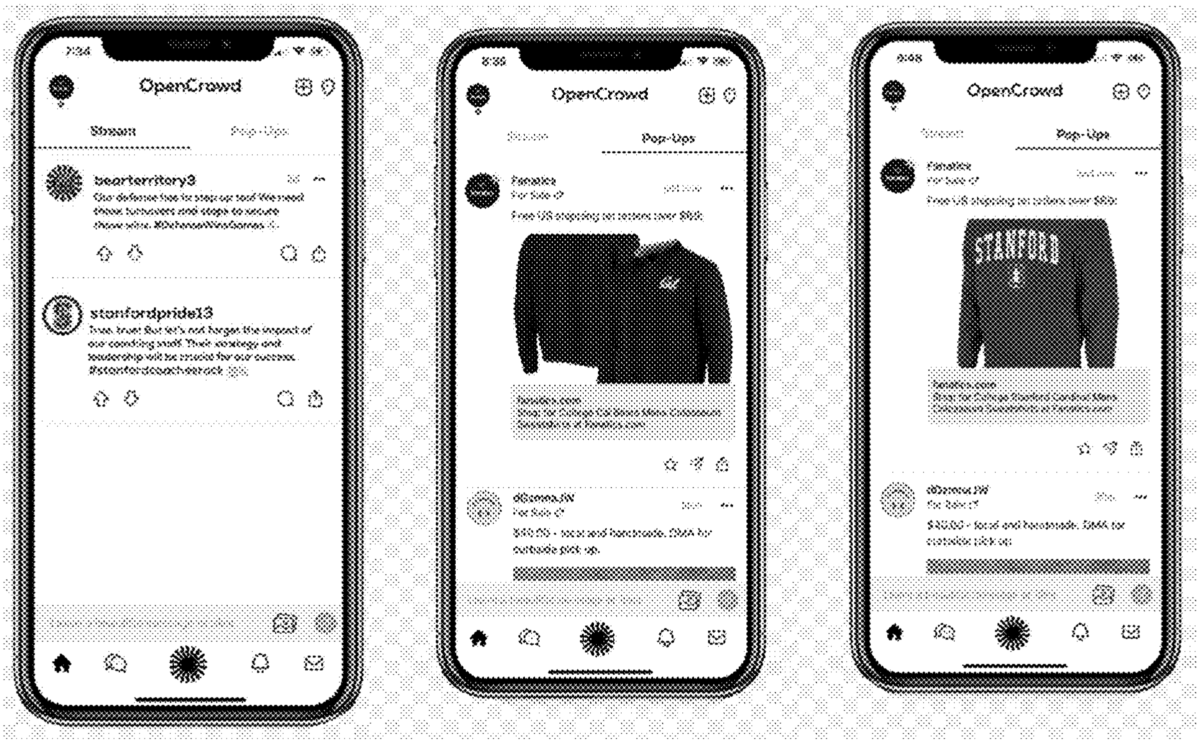
FIG. 75 shows screenshots of pop-ups according to some embodiments.

FIG. 75 shows screenshots of pop-ups according to some embodiments. A revolutionary approach to targeted advertising and selling is described herein. As described, a Proximity Intelligence™ system utilizes geolocation data and user-specific preferences to dynamically generate and present personalized advertisements or listings based on a user's immediate vicinity and preferences.

The technology involves a sophisticated algorithmic process that integrates real-time geospatial information with user-specific data. The amalgamation accurately determines a user's geographical position and their indicated preferences or historical interactions.

User context and mindset are also taken into consideration when performing a function such as generating a pop-up store. The system not only identifies a user's physical location but also analyzes contextual information such as ongoing events or situations. For instance, in the context of a Cal vs. Stanford game, the system recognizes users' presence at the event and tailors advertisements or listings accordingly. Cal fans may see merchandise or ads related to their team, while Stanford fans are presented with content aligned with their preferences, leveraging their team loyalty and physical location at the game.

The system is able to swiftly process this amalgamated data and generate targeted, relevant advertisements or listings that cater to the user's immediate surroundings and mindset. By seamlessly integrating geolocation, user preferences, and contextual understanding, the system presents an interactive and personalized experience, whether an individual supports Cal or Stanford at the sporting event.

A sophisticated Proximity Intelligence™ system redefines advertising by generating a dynamic and personalized user experience based on their immediate physical context and preferences.

Pop-up classified listings dynamically tailor their content based on the specific preferences and context of individual users. For instance, during a thrilling event like the Cal vs. Stanford game, these listings exhibit a remarkable ability to discern a user's affiliation and display merchandise aligned with their team loyalty.

In an example, a Cal fan glances at her screen and finds pop-up listings showcasing Cal-related merchandise—jerseys, hats, or exclusive fan gear. Simultaneously, a Stanford fan's screen features pop-ups highlighting Stanford-themed merchandise—perhaps cardinal red gear or exclusive team memorabilia.

The system's instantaneous recognition of the user's team allegiance and their current location at the game enable direct and targeted advertising. This tailored approach ensures that each fan is presented with content directly relevant to their team preferences, maximizing the chances of engagement and transactions in the exhilarating atmosphere of the game. This precision in showcasing merchandise amplifies user interest and prompts potential transactions in real time, aligning perfectly with each fan's devotion and enhancing their overall experience at the event. This same scenario can be played for music festivals and business events with branded merchandise.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:

detecting one or more nearby devices;

generating a network; and establishing a network connection with the one or more devices by detecting an indication of a desire to join the network on the one or more devices, wherein establishing the network connection with the one or more devices is based on proximity and one or more shared interests, wherein a spin mechanism provides a visual signal observable by users of the one or more devices, for establishing the network connection by prompting a user to open a device and join the network, wherein the network is formed by inclusion of a plurality of devices in response to a coordinated activation of the spin mechanism by the plurality of devices.

2. The method of claim 1 wherein establishing the network connection with the one or more devices is by detecting a wireless signal.

3. The method of claim 1 wherein establishing the network connection with the one or more devices is by detecting a wave action, wherein the wave action of the device includes a movement of the one or more devices including displaying a graphic on the one or more devices.

4. The method of claim 1 wherein the network is generated manually.

5. The method of claim 1 wherein the network is generated automatically using artificial intelligence based on user preferences, behaviors or location.

6. The method of claim 1 further comprising enabling targeted advertising and personalized content delivery within the network.

7. The method of claim 1 wherein generating the network comprises drawing a boundary on a map, wherein only devices within the boundary are able to connect to the network, wherein the boundary automatically becomes a circular boundary based on the drawn boundary.

8. The method of claim 1 further comprising utilizing satellite communication to establish the network connection.

9. The method of claim 1 further comprising implementing privacy settings, wherein the privacy settings take into account a number of people on the network.

10. The method of claim 1 further comprising implementing artificial intelligence to perform user matching, including adding a matched user to the network.

11. The method of claim 10 wherein the user matching is based on interests, compatible personalities, contextual personas and identities within an application.

12. The method of claim 10 wherein the user matching is based on user mindset.

13. The method of claim 10 wherein the user matching combines personality matching and contextual matching.

14. The method of claim 1 further comprising managing one or more user personas enabling a user to switch between the one or more user profiles personas.

15. The method of claim 1 further comprising implementing artificial intelligence to provide recommendations to a user.

16. The method of claim 1 further comprising employing machine learning to parse a group of people into smaller groups of people based on factors including: demographics, preferences, location data, or spin actions.

17. The method of claim 1 further comprising generating a pop up store based on a current location of the device.

18. The method of claim 1 further comprising implementing artificial intelligence for detection and moderation of hate speech, dangerous drugs, human trafficking and bullying.

19. A device comprising:

a non-transitory memory for storing an application, the application for:

detecting one or more nearby devices;

generating a network; and establishing a network connection with the one or more devices by detecting an indication of a desire to join the network on the one or more devices, wherein establishing the network connection with the one or more devices is based on proximity and one or more shared interests, wherein a spin mechanism provides a visual signal observable by users of the one or more devices, for establishing the network connection by prompting a user to open a device and join the network, wherein the network is formed by inclusion of a plurality of devices in response to a coordinated activation of the spin mechanism by the plurality of devices; and a processor coupled to the memory, the processor configured for processing the application.

20. A system comprising:

a first device configured for:

generating a network including establishing a boundary on a map;

a server device configured for hosting the network; and a second device configured for:

establishing a network connection with the first device by detecting an indication of a desire to join the network on the second device, wherein establishing the network connection with the first device is based on proximity and one or more shared interests, wherein a spin mechanism provides a visual signal observable by users of the one or more devices, for establishing the network connection by prompting a user to open a device and join the network, wherein the network is formed by inclusion of a plurality of devices in response to a coordinated activation of the spin mechanism by the plurality of devices.

* * * * *